United States Patent [19]

Drewlo

[11] Patent Number: 4,748,617
[45] Date of Patent: May 31, 1988

[54] VERY HIGH-SPEED DIGITAL DATA BUS

[75] Inventor: Kenneth G. Drewlo, Maple Grove, Minn.

[73] Assignee: Network Systems Corporation, Minneapolis, Minn.

[21] Appl. No.: 811,750

[22] Filed: Dec. 20, 1985

[51] Int. Cl.[4] .......................... H04J 3/02; G02F 1/00
[52] U.S. Cl. ........................................ 370/85; 370/94; 455/612
[58] Field of Search ...................... 370/85, 110.1, 100, 370/4, 94, 96; 375/107, 117; 455/612; 340/825.5

[56] References Cited
U.S. PATENT DOCUMENTS 4,156,112  5/1979  Moreland ............................. 370/85
4,594,708  6/1986  Servel et al. ........................ 370/100
4,606,022  8/1986  Suzuki et al. ........................ 370/85

Primary Examiner—Douglas W. Olms
Assistant Examiner—Frank M. Scutch, III
Attorney, Agent, or Firm—Orrin M. Haugen; Thomas J. Nikolai; Frederick W. Niebuhr

[57] ABSTRACT

A time-division multiplexed, data communications system allowing multiple user devices, including super computer buses configured in a local network, and other existing network hierarchies to exchange digital data over extended distances at speeds heretofore unattainable. The system includes a plurality of intelligent nodes, termed "DATApipe TM adapters", which are coupled to a fiber optic bus. The DATApipe adapters function as interface devices between the fiber optic bus and the I/O processors which are used to couple the user devices and networks to the DATApipe adapters.

17 Claims, 16 Drawing Sheets

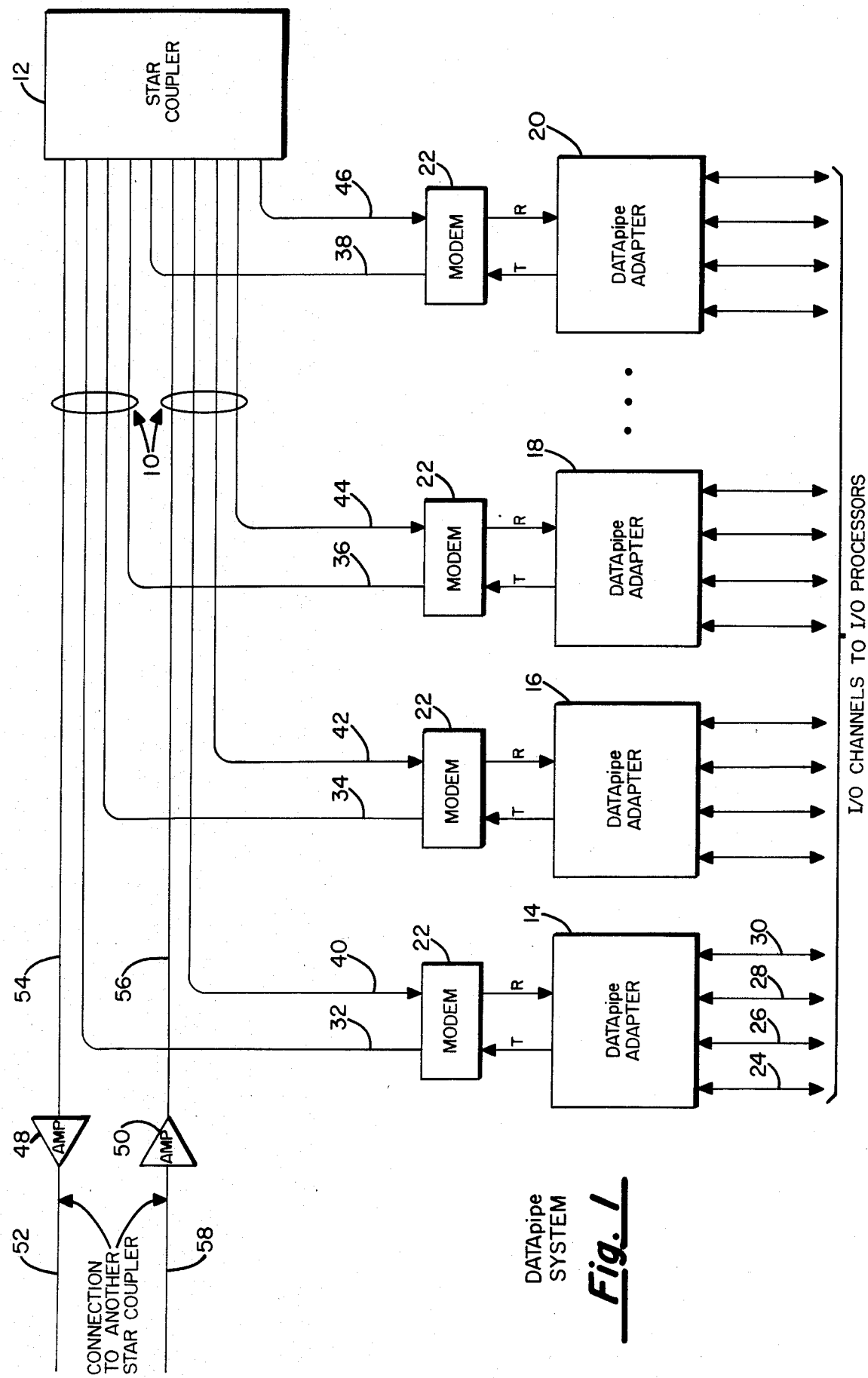

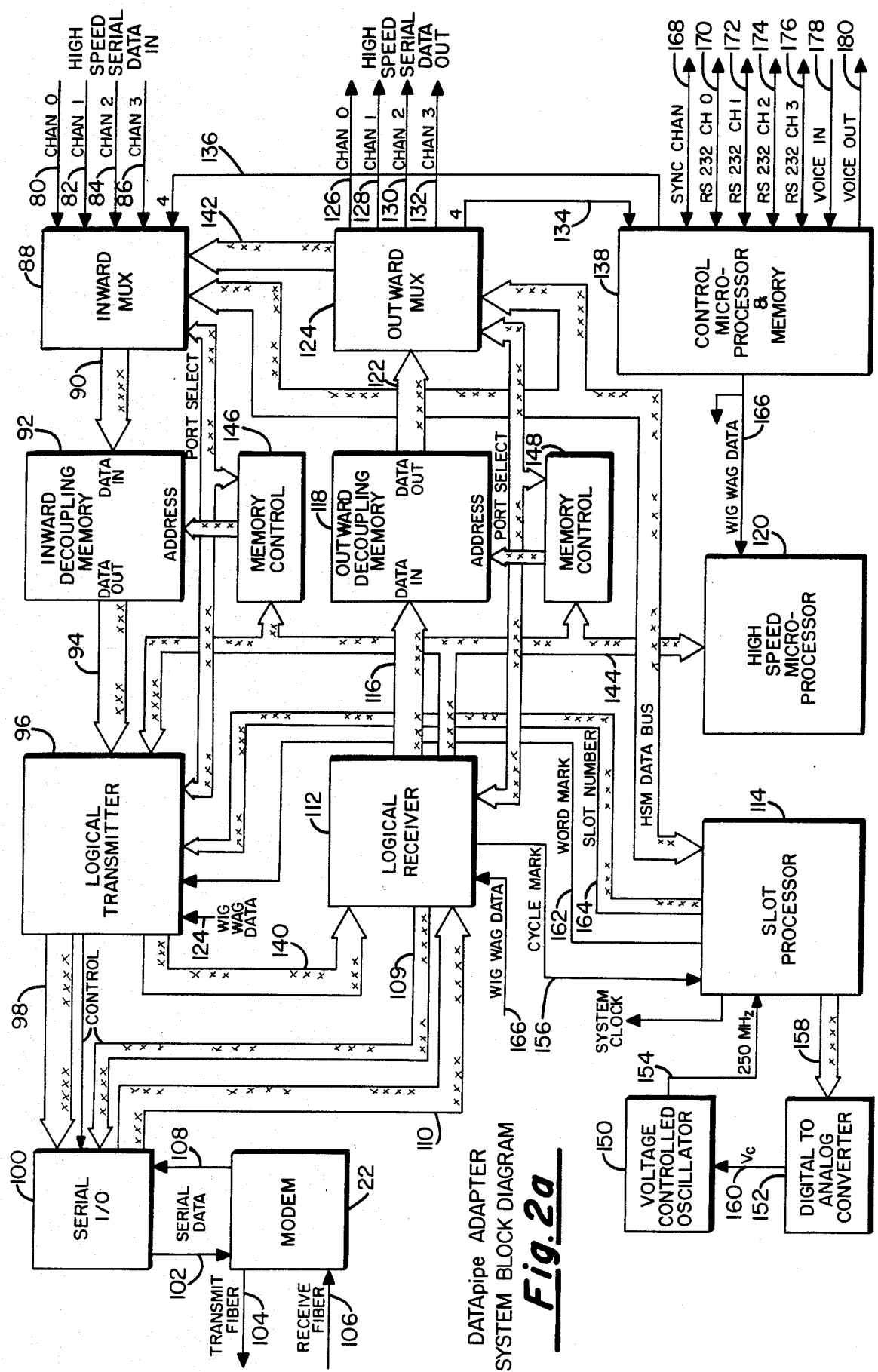

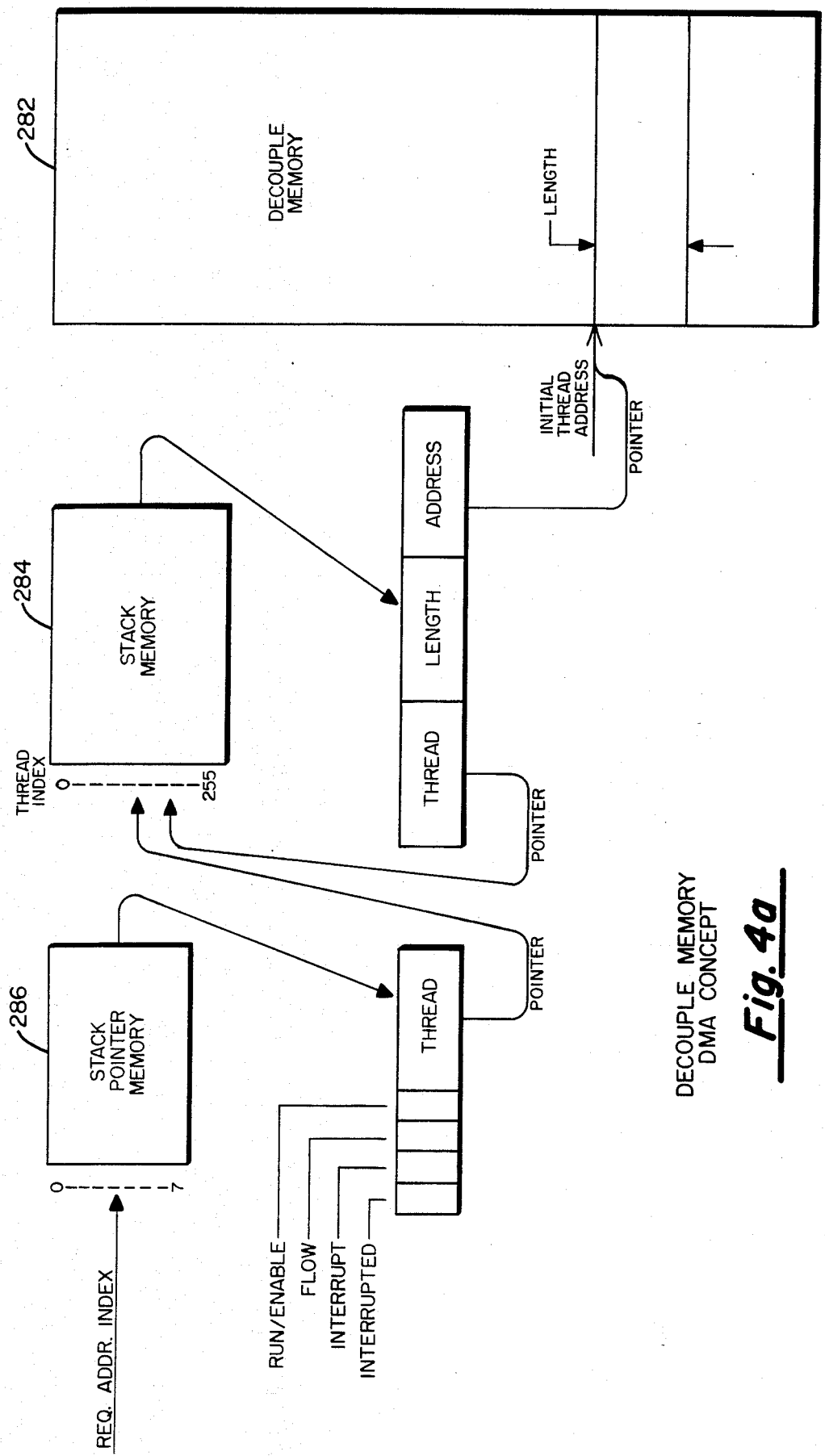
Fig. 4a DECOUPLE MEMORY DMA CONCEPT

DECOUPLING MEMORY

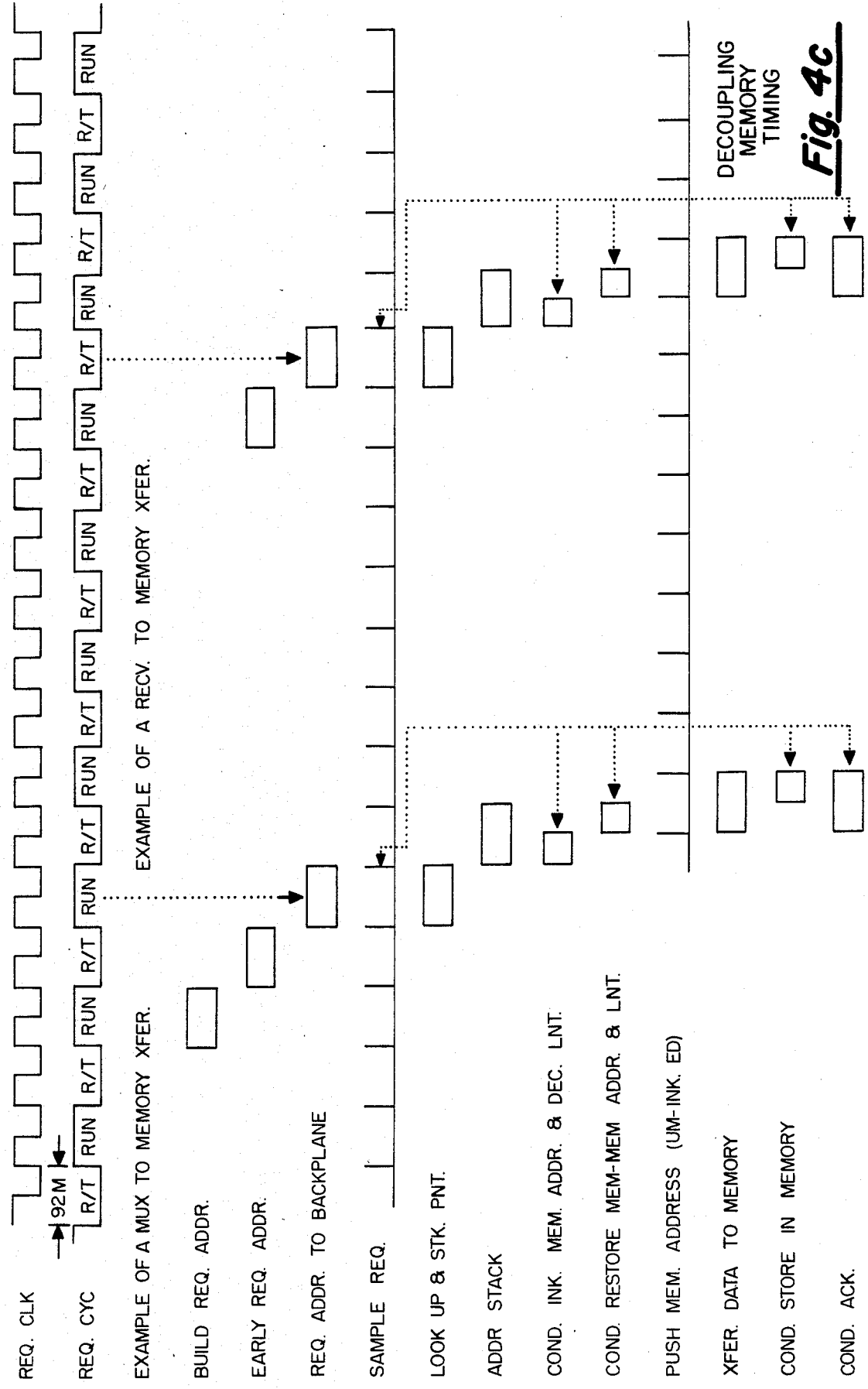

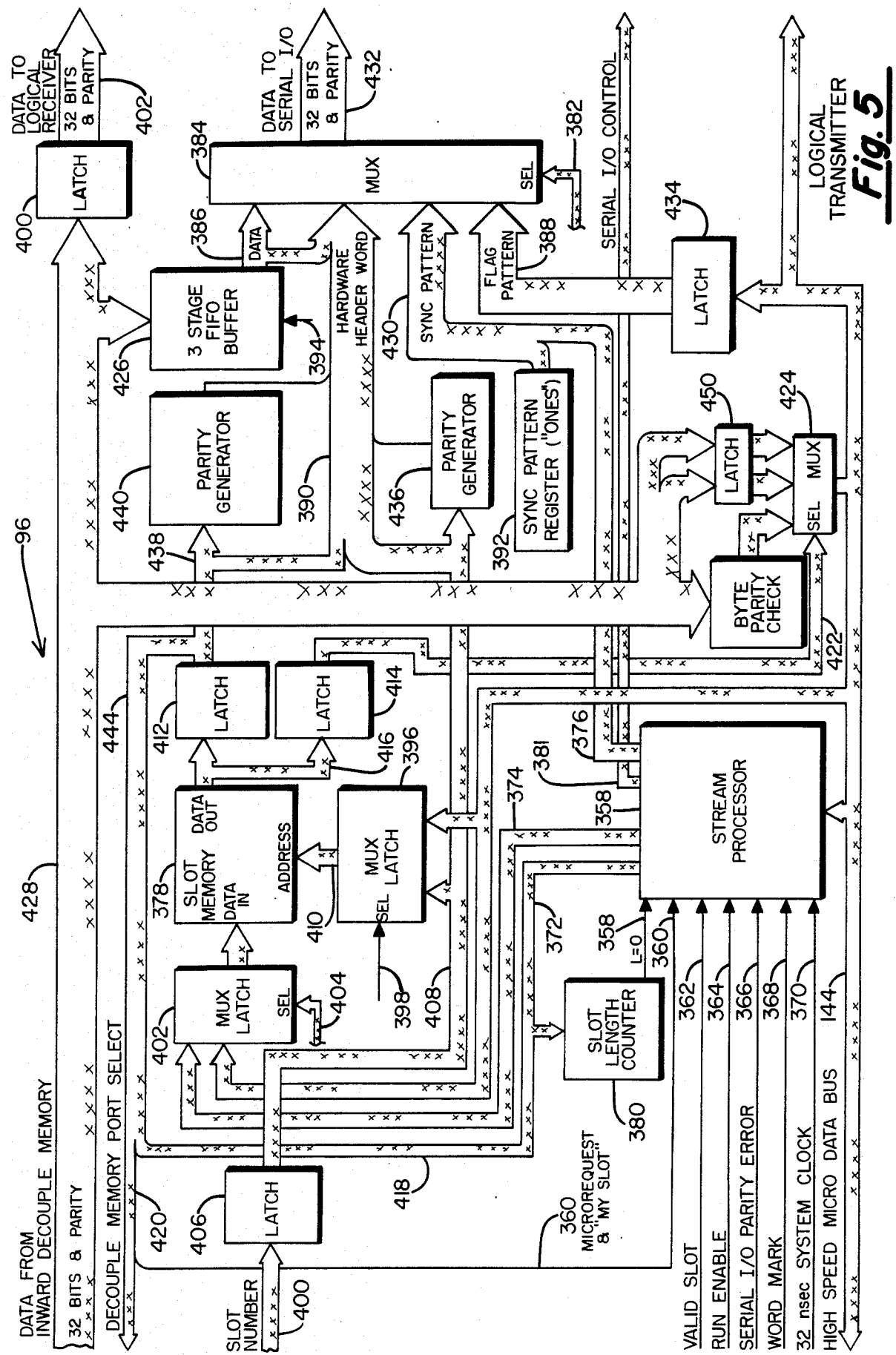

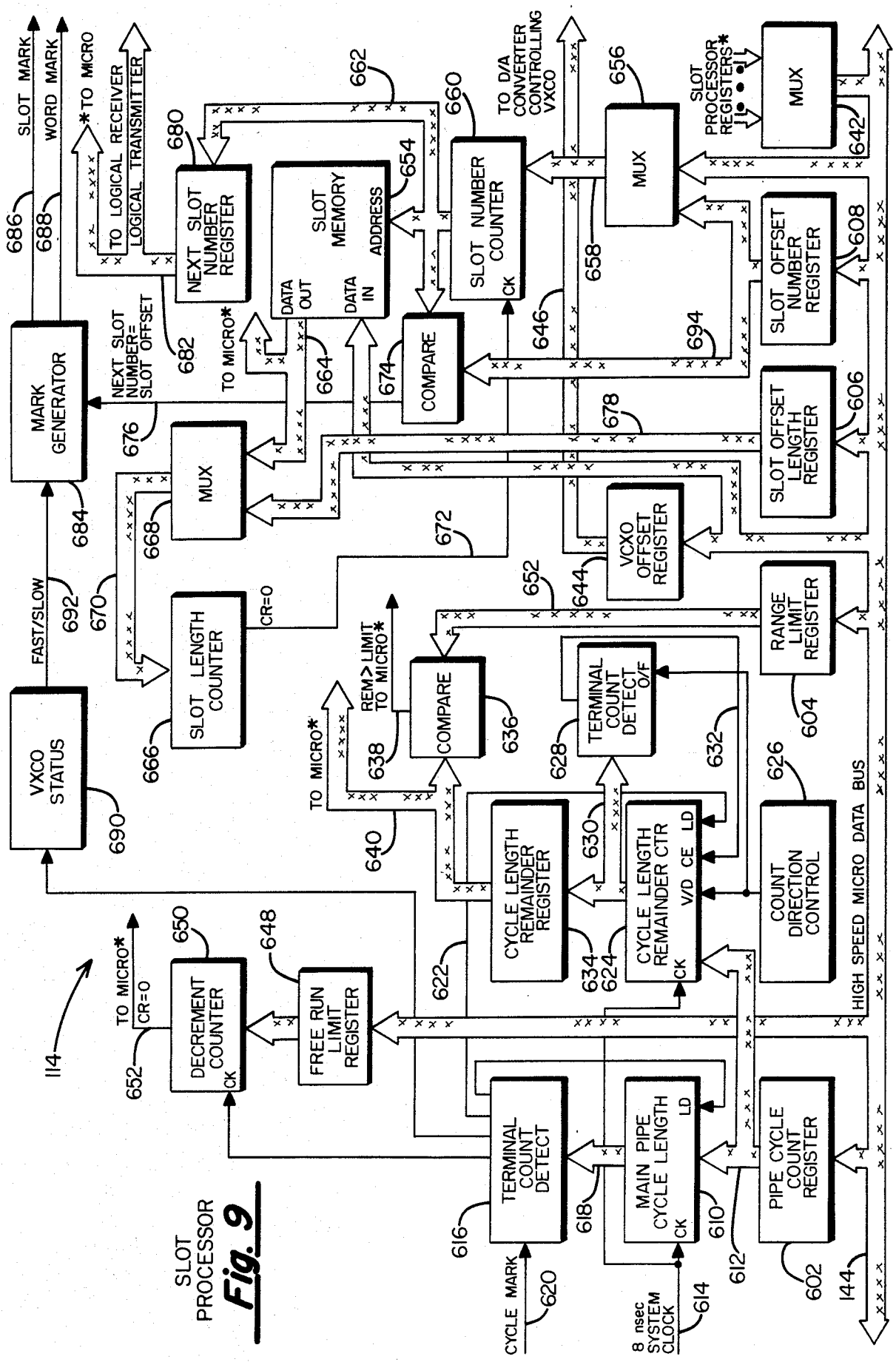

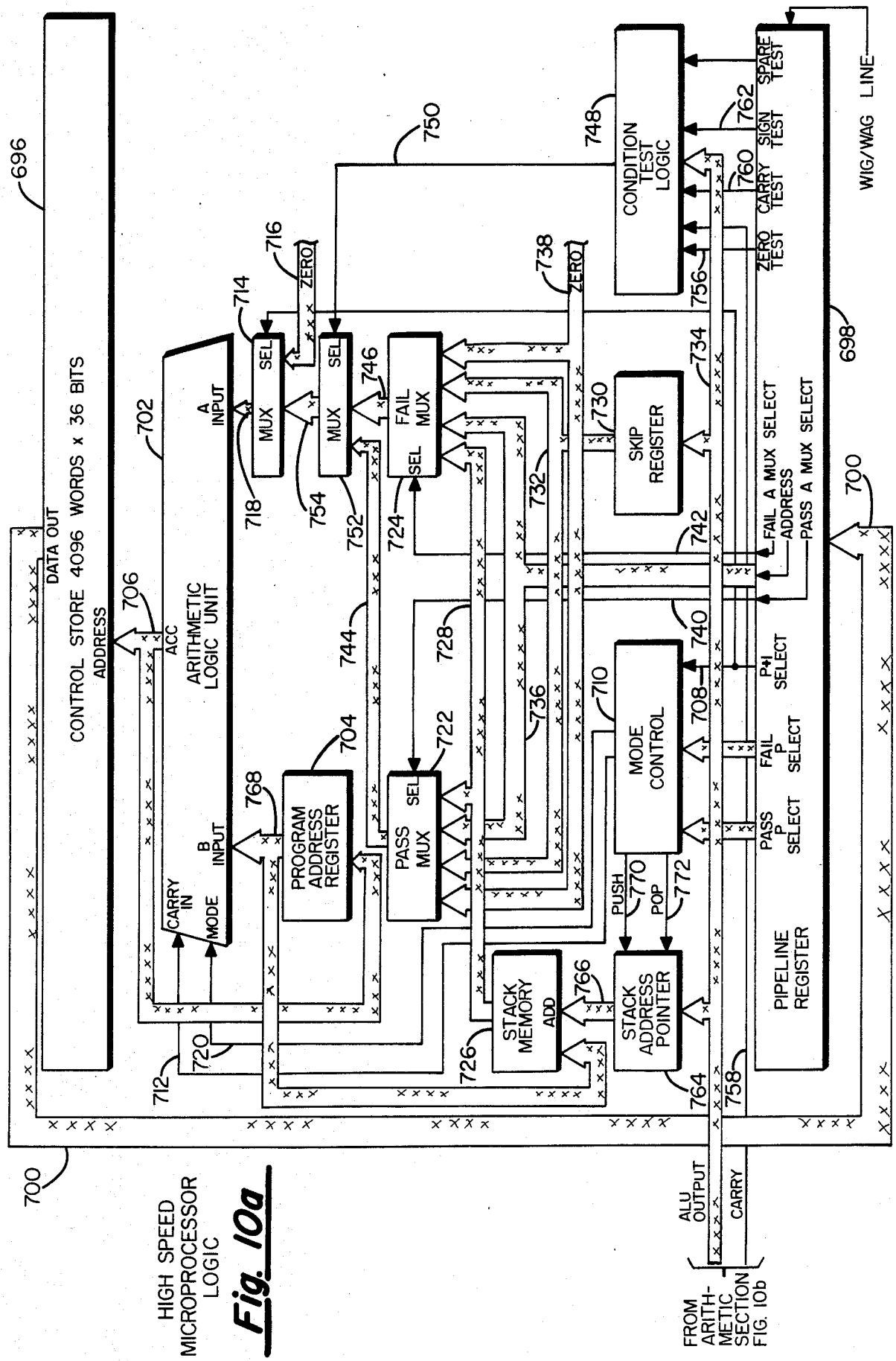

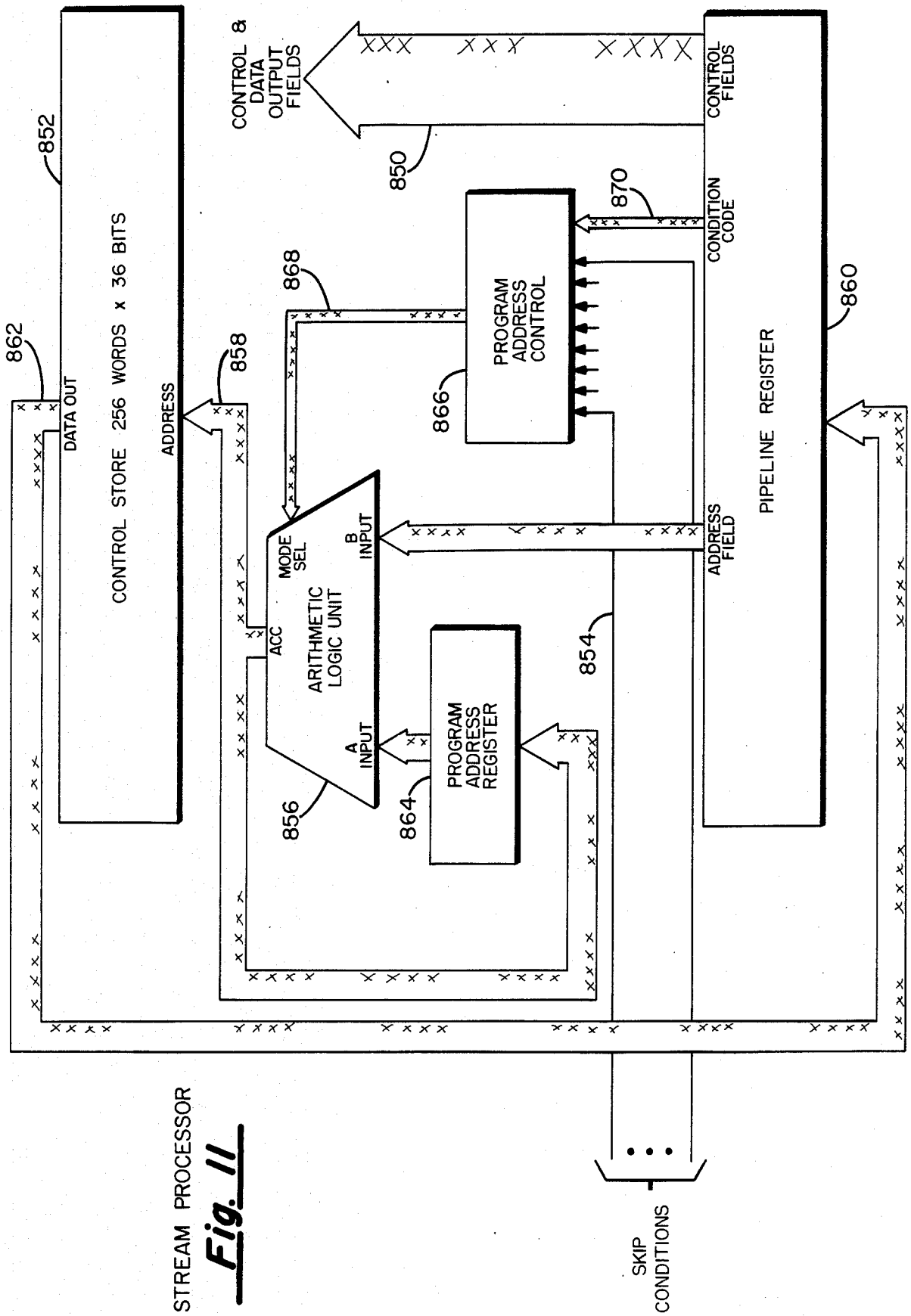
Fig. 11 STREAM PROCESSOR

VERY HIGH-SPEED DIGITAL DATA BUS

BACKGROUND OF THE INVENTION

I. Field of the Invention

This invention relates to a very high-speed, time-division-multiplexed, serial, data bus, which is capable of supporting very high data rates among a multiplicity of users over a large geographical area, and more specifically, to a system which is capable of supporting communication with up to 239 nodes distributed over a radius distance of 30 kilometers from the head end with an aggregate data rate of 500 megabits per second. Prior art approaches are not capable of this combined performance. In a more general sense, the system hardware of the present invention can transmit over a distance where the propagation time does not exceed 17 seconds.

II. Discussion of the Prior Art

Very high-speed, point-to-point data links are known in the prior art. It is also well understood in the art to have local area networks over a limited geographical distance operating at lower data rates, typically one to ten megabits per second. Such networks are comprised of a multiplicity of transmit/receive nodes which share a common transmission media. The combination of a very high data rate bus, operating over large distances, create a unique problem because of the time required for the propagation of data through the transmission media, even though such propagation may occur at a rate as high as one nanosecond per foot. Even with such high propagation rates, several hundred thousand bits of data may be suspended or latent in the transmission media at any instant in time. In prior art time division multiplexed data bus communication networks, where only one transmission source may be active, it is a common practice, when switching transmission source from a first node (node A) to a second node (node B) to allow time for the first transmission from node A to propagate to the end of the transmission media before transmission is allowed to begin on node B. The time for this to occur is an unuseable amount of time on the data bus, and thus results in a degradation of the net bandwidth or throughput of the bus. As the product of the total delay and the data rate increases, this becomes a more significant and, ultimately, a limiting factor on the performance of the bus.

Another factor limiting the performance of a digital bus is the method of bus control employed. Many techniques are well understood in the prior art and fall into one of two general categories. Either the bus assignments are (1) made on a fixed, invarient allocation, in which case, the versatility of the system suffers in that the bus cannot adapt to changing data loads between various nodes or (2) a form of dynamic bus control is implemented, which provides versatility, but at the penalty of introducing a dead-time period for bus arbitration.

One known method of bus control is referred to as Collision Sense Multiple Access (CSMA). This approach allows spontaneous contention for the bus by any of the plurality of nodes. In the event of a simultaneous attempt by more than one node to transmit on the bus, this collision is sensed and each node must wait a specified, but different, amount of time before attempting to transmit again. Eventually, with enough tries, any node can gain control of the bus. However, the access within a specified period of time is not guaranteed. As the density of message traffic increases on this bus, the probability of a collision increases and each collision is a loss of throughput on the bus. The loss of throughput increases as a function of both the distance and the data rate making this unacceptable for the class of applications contemplated by the present invention.

Another prior art method is referred to as the "token passing" method. In this case, a specific stream of data bits, called the "token", is transmitted sequentially around from node to node connected in a ring-fashion on the bus. Only the node currently holding the token is privileged to transmit. Collisions are avoided and the maximum throughput of the bus can be maintained. The penalty, however, is that the latency of the bus increases, due to the time it takes for the token to propagate around the ring. In most typical telecommunications applications, an increase in bandwidth cannot be effectively utilized without a corresponding decrease in latency. Since the latency in the token ring scheme is proportional to distance, this method is unusable for the very high speed geographically dispersed communications bus.

Another prior art method which is compatible with fiber optic bus technology is referred as the token bus. In this instance, the token does not pass sequentially from node to node but is granted to a given node through a token arbitration process. While this can reduce the problem of latency associated with the token ring, it suffers from loss of throughput as does the CSMA bus control method due to the token arbitration process and the time required to purge the network of suspended data.

Still another known digital data communication method is referred to as frequency division multiplexing. Channels are assigned different frequency bands very much like cable television. Specific nodes are then paired to transmit and receive on a specified channel. This method can achieve very high aggregate bandwidth/data rates, but at the expense of connectability. More particularly, the assignment of transmitting nodes to receiving nodes is made by the choice of frequency tuning of the transmitters and receivers at each node and once set, they are not easily changed. This is a distinct disadvantage over the time division multiplexing method in which any node can communicate with any other node connected to the bus.

OBJECTS

It is the principal object of this invention to provide a time division multiplexed bus control method which imposes a minimal throughput penalty on the bus and is yet dynamically reassignable to accommodate changes in the load pattern or message traffic.

Another object of this invention is to provide a novel method of sychronization of transmitters on the bus such that they can transmit with a minimum of dead-time between switching of transmitters.

It is a further object of this invention to provide a method of bus control which is compatible with fiber optic bus technology, particularly the passive star coupler configuration. The advantage of passive taps over active taps is that it eliminates a single source of failure which could cause the entire bus to be inoperative.

It is a further object of this invention to provide a data bus network which can serve as a backbone network interconnect in a network hierarchy in which the inputs to this system would themselves be local area networks interconnecting a multiplicity of high-speed devices and/or other local area networks, which, in turn, connect a multiplicity of lower speed devices, thereby forming a multiple tiered network. Within this network hierarchy, a multiplicity of high-speed mainframe computers, mass storage devices, a very large number of terminal entry devices, slow-speed peripheral devices, and work stations of various natures could all be fully interconnected.

It is desirable to have a high degree of intelligence in the control nodes of a data bus system, since this intelligence adds to the versatility and utility of the bus. However, in prior art systems, the addition of intelligence, i.e., decision-making capability, resulted in a reduced throughput or bandwidth for the system. It is, therefore, a further object of this invention to provide a novel combination of a multiplicity of programmable processing elements and special purpose logic to provide very high bandwidth with a high degree of versatility due to node intelligence.

Yet another object of the invention is to provide an intelligent node which serves as a physical interface to the transmission medium on one side and to input/output processors on the other side so as to accommodate transmission throughputs heretofore unrealizable.

These and other objects and advantages of the invention will become apparent to those skilled in the art from the following detailed description of the preferred embodiment, especially when considered in conjunction with the accompanying drawings.

DESCRIPTION OF THE DRAWINGS

FIG. 1 is a high level system block diagram of the communications system comprising a preferred embodiment of the present invention;

FIG. 2(a) is a general block diagram representation of the DATApipe adapters used in the system of FIG. 1;

FIG. 4(a) is a conceptual diagram showing the decoupling memory Direct Memory Access (DMA) concept;

FIG. 4(c) is a timing diagram which illustrates the pipelined timing associated with decoupling memory transfers;

FIG. 5 is a block diagram representation of the logical transmitter used in the DATApipe adapter of FIG. 2;

FIG. 9 is a detailed block diagram of the slot processor portion of the DATApipe adapter of FIG. 2;

FIG. 10(a) is a detailed block diagram of the program control section of the high-speed microprocessor;

FIG. 11 is a detailed block diagram of the stream processor employed in the logical transmitter and logical receiver.

DESCRIPTION OF THE PREFERRED EMBODIMENT

DATApipe ™ SYSTEM—GENERAL DESCRIPTION

Figure 2B:
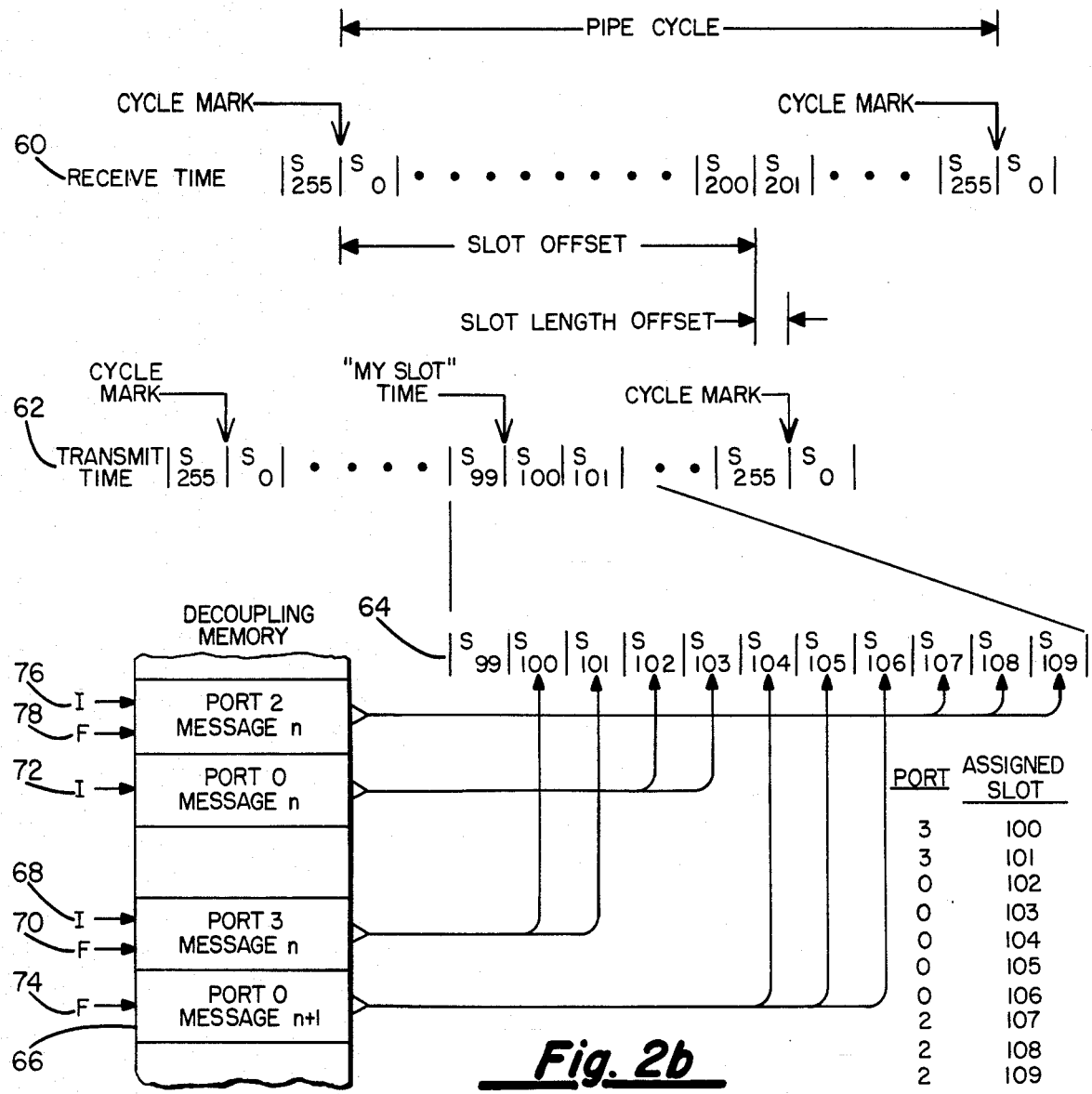
FIG. 2(b) is a timing diagram helpful in understanding the operation of the DATApipe adapter.

FIG. 1 is a high-level, system block diagram of the DATApipe communications system. In the preferred embodiment, the data bus media 10 may be a single-mode, fiber-optic cable terminated in a star coupler 12 of conventional design. Each leg of the bus may be a variable length, typically up to 30 kilometers. In a broader sense, however, the length of the transmission media may be millions of miles, such as in the case of geosynchronous satellite communication systems, the limitation being that the total propagation time of the data signals may not exceed about 17 seconds. Logical nodes 14 through 20, which will hereafter be referred to as DATApipe adapters, are representative of up to 239 such adapters which may be arranged anywhere within, for example, a 30 kilometer radius of the star coupler 12. Each DATApipe adapter is coupled to transmission media 10 by an electrical/optical modulator/demodulator (modem), exemplified by modem 22, many forms of which are commercially available from a number of manufacturers. The DATApipe adapters 14–20 are each capable of presenting an electrical transmit signal (T) to its modem 22, where it is converted to an optical signal and sent over to transmit leg of fiber-optic media 10 to the star coupler 12 located at the head end thereof. The star coupler 12 receives optical energy from the transmit leg of media 10 of each DATApipe adapter and logically OR's the optical energy of all of them and transmits the signal to each DATApipe adapter's receive leg, via media 10. In this case, the receive leg, media 40–46 is sensed by an associated modem 22, and converted to an electrical receive signal for use by DATApipe adapters 14–20. Each DATApipe adapter may include four I/O channels, such as channels 24 through 30 on DATApipe adapter 14. I/O channels 24 through 30 are each preferably asynchronous, full-duplex, serial, I/O channels, capable of supporting continuous data transfers at 50 megabits per second. Each DATApipe adapter in the system provides facilities for both (1) intracommunication between its own I/O channels as well as (2) intercommunication with all of the other DATApipe adapters connected in the DATApipe system and, in turn, with all of the other I/O channels connected each of the DATApipe adapters.

The functions of the DATApipe adapters include: (1) multiplexing of the I/O channel inputs, (2) buffering, (3) synchronization of the transmit data for the transmit protcol, (4) receipt of data transmitted from other adapters, (5) message routing, and (6) demultiplexing of the I/O channel output data.

As will be explained in greater detail below, the transmission protocol is based on the DATApipe pipe cycle. During system installation, the total length of the DATApipe pipe cycle is defined. Also defined are a specific number of slots in the particular pipe cycle and a specified length for each such slot. For each DATApipe pipe cycle, a DATApipe adapter may transmit a unit of data, hereafter referred to as a frame, for each assigned slot. At this time, the initial assignment of slots to specific DATApipe adapters is defined as is the slot number which will be the timing reference. Specific DATApipe adapters independently assign available transmission bandwitdth (slots) to I/O channels and the control processor. Also specified at this time is the particular DATApipe adapter which is to serve as the bus reference or master. This bus reference will establish the timing for the entire bus system by transmitting a specified header message in the reference slot, and each of the other DATApipe adapters will be brought into synchronism with it. All of these assignments are made by firmware and may be automatically redefined without interruption of the system to accommodate changes in the hardware or message traffic.

The particular DATApipe adapter assigned as the bus reference or master generates a unique code, which is interpreted by the other DATApipe adapters to produce the "cycle mark", a time reference for the pipe cycle. All DATApipe adapters, including the bus reference, transmit in their assigned slots in synchronism with this cycle mark by precisely adjusting the time interval between the cycle mark and the initiation of transmission. A guardband is provided between each slot to assure that, in the worst-case timing, there will be no overlapping or collision of data.

Data moving between DATApipe Adapters are moved over the DATApipe fiber in frames called "slots". The "pipe cycle" is made up of 1 to 4096 slots. The pipe cycle is the basic unit of time synchronization between each of the DATApipe adapters on the DATApipe fiber. One DATApipe Adapter is identified as being the "Master" and is responsible for identifying one particular slot as the "Master Slot"; thus every pipe cycle has one Master Slot and each Datapipe Adapter on the DATApipe fiber uses this Master Slot to synchronize the transmission of all the other slots.

Each DATApipe adapter has its own voltage controlled crystal oscillator clock (VCXO). The transmission of slots is determined solely by time since the crystal oscillator in all the DATApipe Adapters are not identical. Without occasionally adjusting (or "training") the crystal oscillator, the DATApipe Adapters may lose track of when to transmit a slot. The hardware has the capability to search for the start of a slot within a few nanoseconds either way of the actual start-of-slot. However, if the Master Slot begins to arrive too early or too late, a DATApipe Adapter will lose synchronization with the Master and will be prevented from transmitting any data. The hardware is capable of adjusting (or "training") the crystal oscillator to run faster or slower by minute amounts in order to stay in synchronization with the Master.

Each modem 22 transmits during its assigned time slots. Transmit data flows to star coupler 12, via the fiber optic transmit cables exemplified by lines 32 through 38. The transmit timing in each DATApipe adapter is adjusted such that the transmit signals converge at the star coupler 12, assembled in their respective time slots, in a time division multiplexed manner. The transmitted optical energy is equally divided among all of the receive optical fibers exemplified by lines 40 through 46. Each modem 22 thus receives the complete composite DATApipe data.

Practical design considerations limit the number of DATApipe adapters which can be accommodated by a single star coupler. To further expand the number of DATApipe adapters which can be accommodated, buffer amplifiers 48 and 50 are employed. Line 58 represents the receive signal from another coupler (not shown) which is converted to electrical energy, amplified and converted back to optical energy by amplifier 50 to provide an optical signal on line 56, which is comparable to the other transmit inputs to star coupler 12. In a like manner, buffer amplifier 48 amplifies the signal on transmit line 54 so that it can become a transmit input on line 52 to another coupler. A multiplicity of star couplers can thus be interconnected to allow expansion of the system to the maximum number of DATApipe adapters.

Although the preferred embodiment shows fiber optic media for transmission, the invention can also be practiced with conductive wire media, RF transmission or a mixture of media. As suggested earlier, with alternate transmission media much larger distances can be accommodated. In the case of RF transmission, the invention may be utilized with an RF link, via a geosynchronous satellite.

FIG. 2(b) shows a simplified timing example which is illustrative of the pipe cycle and slot concept. In this example, a total of 256 slots comprise a pipe cycle. FIG. 2(b) shows timing for the DATApipe adapter which has slots 100 through 109 assigned to it. Time line 60 shows the pipe cycle timing relative to the arrival of the signal at the receive tap of the DATApipe adapter. Time line 62 shows timing relative to the transmitter of the same DATApipe adapter. Time offset is defined as the sum of the transmit and receive delay between a DATApipe adapter and the star coupler. The cycle mark identifies the beginning of slot 0 in this particular example. It should be understood, however, that this assignment is arbitrary and can be established at the time of system installation and can be automatically re-established should the DATApipe adapter providing the cycle mark fail. In this example, this DATApipe adapter is positioned on the bus such that the time from a cycle mark on the receive time line to the next cycle mark on the transmit time line is greater than 200 slots but less than 201 slots. The integer slot length of this dealy is referred to as the "slot offset". The fractional length between the beginning of slot 201 on the receive time line and the beginning of slot 0 on the transmit time line is referred to as the "slot length offset". The sum of these two parameters is representative of the time between the receipt of the cycle mark and the beginning of the next pipe cycle relative to transmit time.

The DATApipe adapter determines the time for it to begin transmitting in slot 100 by sensing the cycle mark, counting off the slot offset, then the slot length offset and, finally, 100 slots, i.e., slot 0 to slot 99. This establishes a time referred to as "my slot", which is the beginning of transmission (BOT) time for slot 100.

Time line 64 shows an expanded portion of time line 62, which includes the slots assigned to this DATApipe adapter. As will be further explained, decoupling memory represented by block 66 is a buffer memory in the DATApipe adapter, which stores the incoming message frames accumulated from the I/O channels, each I/O channel being assigned a specific port number. When "my slot" time arrives, memory 66 is read, based on the position of memory stack pointer 68. Shown in FIG. 2(b) is the initial position (I) of this pointer for this pipe cycle, which corresponds with the final position (F) for the previous pipe cycle. A frame header is generated for slot 100, followed by the first word of data from port 3, message n. Pointer 68 is incremented, and the next data word is transmitted. When the message frame for slot 100 has been read from memory 66, the frame trailer is appended and transmission in slot 101 begins. At the end of slot 101 transmission, the port 3 stack pointer has moved to its final position indicated by pointer 70 and two frames of data have been placed on the data bus.

Pointer 72 points to the initial position for the first frame of message n from port 0. The last two frames of message n are transmitted in slots 102 and 103. When message n completes, the stack pointer for port 0 is moved to the top of message n+1, and transmission continues to pack frames in slots 104 through 106, with the stack pointer in its final position at point 74. Similarly, frames from message n, associated with port 2, are transmitted in slots 107 through 109, with the stack pointer moving from its initial to its final positions 76 and 78, respectively. If message n+1 had not been ready at its allotted time, the remaining port 0 slots would have been granted to port 2. If port 2 completes before all assigned slots have been used, the next slot is granted to port 1. Thus, port 1 is serviced, even though it does not have as assigned slot. While this simplified example implies a fixed assignment of uniform length, contiguous slots to ports and also a fixed relationship of the cycle mark to a particular slot, these parameters are in fact controlled by firmware and are dynamically re-assignable in any order.

The assignment of slots to ports establishes a priority order for message traffic which guarantees both a specified minimum bandwidth for each port based upon the number of slots assigned to it and also optimizes the overall utilization of the total pipe bandwidth by allowing lower priority channels to utilize otherwise empty slots. Further, the ability to reconfigure DATApipe cycle parameters, i.e., bus reference, slot length and slot assignment without interruption of transmission assures than any mixture of the data forms encountered in telecommunication can efficiently share the DATApipe system.

The receive process is generally the inverse of the transmit process shown in FIG. 2(b). Each DATApipe adapter reads the header of all of the frames and routes the receive data addressed to it into a decoupling memory which has buffer space.

Having described certain definitional and timing aspects of the DATApipe adapter, consideration will next be given to the hardware aspects thereof.

DATApipe ADAPTER

FIG. 2(a) shows a system level block diagram of the DATApipe adapter. The primary data path is between the serial data inputs, the transmission media, here a fiber optic data bus, and the serial data output terminals. Input data, in the form of message frames, arrive on input channels 0 through 3 identified by numerals 80 though 86, respectively. In the system of the present invention, each channel can support continuous serial data communication at rates up to 50 megabits per second. Input serial data is multiplexed on the inward multiplexer 88 and placed on data path 90. Data path 90 and all other primary data paths which are shown as a wide bus rather than a simple line in FIG. 2(a) are 32 data bits plus 4 bits of parity for a total of 36 bits wide. Data is buffered in the inward decoupling memory 92 and placed on the data output data path 94 when a slot is available for transmission.

Logical transmitter 96 controls the timing of data to be placed on the DATApipe bus. Data from the logical transmitter is passed, via data path 98, to the Serial I/O circuit 100, which converts parallel data to serial data. The serial data passes, via serial data to be transmitted line 102, to the modulator/demodulator (modem) 22. Modem 22 converts the electrical signal to a modulated optical fiber 104, which transmits the optical signal to the star coupler 12 (FIG. 1).

In the Receive mode, optical energy is sensed on "receive" optical fiber 106 and is converted to an electrical signal by modem 22 which is placed on the serial data receive line 108. Serial I/O circuit 100 converts the serial data to a 32-bit parallel word, appends the four parity bits to it and places this data on data path 110 leading to the logical receiver 112. The logical receiver 112 interrogates the frame of data coming from each slot and determines if the frame destination is that particular DATApipe adapter. If conditions are satisfied, the frame is placed on data path 116 and written into outward decoupling memory 118.

The high-speed microprocessor 120 examines the contents of decoupling memory 118 and causes stack pointers to be manipulated to establish frame routing by multiplexing the messages on data path 122. Outward demultiplexer 124 routes the frame to the addressed output channel 0 through 4 represented by lines 126 through 134, respectively. The output frames are identical to the input frames, except for several fields in the frame header which are inserted at the transmission of a frame and verifies at the reception of a frame. The DATApipe can thus be considered as a set of virtual connections between the various input and output channels.

As shown in FIG. 2(a), a number of additional data paths are also provided. Data may be routed from the outward decoupling memory 118 to the inward decoupling memory 92 to accomplish loop-back testing for maintenance and diagnostic purposes. Serial channel 4 (lines 136 and 134) provide serial communication with the control microprocessor 138. This enables the control microprocessor to communicate with the high-speed microprocessor 120 and to transmit and receive data in the DATApipe system for both operational and diagnostic purposes. Data can be moved from inward decoupling memory 92 to outward decoupling member 118, via data path 94, logical transmitter 96, data path 140, logical receiver 112 and data path 116. This enables intra-channel communication on user devices connected to a common DATApipe adapter to be accomplished without using DATApipe bandwidth. Data can be moved from outward decoupling memory 118 to the inward decoupling memory 92, via data path 122, outward demux 124, data path 142, inward mux 88 and data path 90. This allows the DATApipe adapter to be tested in a loop-back mode from another DATApipe adapter connected to the fiber-optic bus.

Data can be written from the high-speed microprocessor 120 to inward decoupling memory 92, 16 bits at a time, via data bus 144, outward multiplexer 124 and over data path 142 through inward multiplexer 88 and over data path 90. Data can be read, 16 bits at a time, from inward decoupling memory 92, via data path 94, logical transmitter 96 and data bus 144. Data can also be written, 16 bits at a time, from microprocessor 120 to decoupling memory 118, via the high-speed micro (HSM) data bus 144, logical receiver 112 and data path 116. Data can be read from outward decoupling memory 118, 16 bits at a time, via data path 122, outward demultiplexer 124 and the HSM data bus 144.

The movement of data through inward decoupling memory 92 is controlled by memory control circuit 146. A novel feature of this circuit is that it accomplishes a complex form of memory management in high-speed hardware in contrast to prior art systems which perform this kind of function using much slower sequential software program control.

Memory control circuit 148 is a circuit identical to control circuit 146 which performs the comparable function for outward decoupling memory 118. Table I below shows a typical assignment of memory cycles for both memory control 146 and memory control 148.

TABLE I

| MEMORY CYCLES | PORT | REQUEST ADDRESS |
| --- | --- | --- |
| 00 | Receive/Transmit | 7 |
| 01 | I/O CH.0 | 6 |
| 02 | Receive/Transmit | 7 |
| 03 | Memory-Memory | 1 |
| 04 | Receive/Transmit | 7 |
| 05 | I/O CH.1 | 5 |
| 06 | Receive/Transmit | 7 |
| 07 | High Speed Micro | 0 |
| 08 | Receive/Transmit | 7 |
| 09 | I/O CH.2 | 4 |
| 0A | Receive/Transmit | 7 |
| 0B | I/O CH.3 | 3 |
| 0C | Receive/Transmit | 7 |
| 0D | Memory-Memory | 1 |
| 0E | Receive/Transmit | 7 |
| 0F | CONT PROC | 2 |
| 10 | Receive/Transmit | 7 |
| 11 | High Speed Micro | 0 |
| 12 | Receive/Transmit | 7 |
| 13 | Maintenance | 7 |

Each of the memory controls 146 and 148 executes the same sequence of memory cycles, although not in synchronism, since each control is independently synchronized to its respective data source. The column labeled "Memory Cycles" in Table I indicates the memory cycle number in hex code format. The port identification identifies the source or destination of the data, i.e., inward decoupling memory 92 will transmit to logical receiver 96 or outward decoupling memory 118 will receive from logical receiver 112. On memory cycles 01, 05, 09 and 0B, data is transferred between decoupling memory and I/O channels 0 through 3 respectively. On memory cycles 03 and 0D, data is transferred between the inward decoupling memory 92 and the outward decoupling memory 118. On memory cycles 07 and 11, data is transferred between the decoupling memories and the high speed microprocessor. Memory cycle 0F is used for transfers between decoupling memory and the control microprocessor while memory cycle 13 is reserved for maintenance functions. All even numbered memory cycles 0-12, inclusive, transfer data To/From the logical transmitter/receiver 96 or 112, depending upon whether the control memory is the inward control memory 146 or the outward control memory 148. In the system being described, each memory cycle requires 32 nanoseconds. Thus, each I/O channel is serviced every 640 nanoseconds to transfer a 32-bit word, resulting in a maximum data rate of 50 megabits per channel. For the transmit or receive channels, a 32-bit word can be transmitted or received every 64 nanoseconds, which supports a maximum rate of 500 megabits per second on the DATApipe bus.

All of the frames on the DATApipe fiber optic cable 10 are received by each DATApipe adapter 14–18 (FIG. 1). The logical receiver 112 sorts incoming frames, such that only those frames addressed to the local channels on a given DATApipe adapter are routed to the outward decoupling memory 118 of that DATApipe adapter. The remainder of the frames are simply disregarded. Routing of frames from the outward decoupling memory 118 to their addressed output channels is accomplished by the high-speed microprocessor 120 which loads the pointers in the memory control 148 to point to the correct frames for outward transmissions.

Summarizing the data flow, then, serial data flows into inward multiplexer 88 asynchronously from an I/O channel 80-86 where it is buffered by the inward decoupling memory 92 and read out in precise synchronism to be transmitted in a time division multiplexed mode with data from other DATApipe adapters coupled to the fiber-optic bus. The data present on the DATApipe bus which is intended for a given receiving DATApipe adapter is read into outward decoupling memory 118, where it is sorted, and the frames addressed specifically to specified channels are routed to its addressed high-speed serial output channel leading to a user system (not shown). The user system typically include I/O processors which interface the DATApipe adapters to any one of a number of commercially available computers or other networks, such as HYPERchannel or HYPERbus networks manufactured by Network Systems Corporation, the assignee of the present application.

The synchronization of this communication process requires precise information regarding a physical or logical cycle mark of the pipe cycle and the location and time of the slot and word boundaries. This information is provided by the slot processor 114, which also cooperates with voltage-controlled crystal oscillator (VCXO) 150 and digital-to-analog converter 152 to form a novel form of control loop, analogous to a phase-locked loop, which maintains clock synchronization with the referenced DATApipe adapter.

Digital values representative of the pipe cycle length, slot number, and slot length offset are loaded into slot processor 114 by high-speed microprocessor 120, via the HSM data bus 144. In the system of the preferred embodiment, the output of VCXO 150 is a 250 megahertz clock signal on line 154. This provides basic clock timing to the slot processor 114 as well as to the rest of the DATApipe adapter.

The cycle-mark time is established by the bus reference or master DATApipe adaptor which transmits during the slot specified to be the cycle-mark slot. While this was shown to be slot 0 in FIG. 2(b), it can in fact be any arbitrary slot. When logical receiver 112 detects a transmission from the bus reference DATApipe adaptor in the slot designated to be the cycle-make slot, it determines that this is the cycle mark time and generates a pulse on line 156 to the slot processor. When VCXO 150 is running at the correct frequency, the time of arrival of the cycle-mark will be coincident with the time predicted by the pipe cycle length count. If the cycle-mark occurs before the pipe cycle length timer has timed out, it is indicative that the VCXO 150 is running too slowly. Similarly, a cycle-mark occurring after the pipe cycle length counter has timed out is indicative that the VCXO is running too fast.

The time of arrival of the cycle-mark relative to the pipe length parameter thus provides error correction information which the slot processor communicates to the high-speed microprocessor, via data bus 144. When the correction information exceeds acceptable limits, the high-speed microprocessor computes an updated value of digital-to-analog converter 152, which is transmitted, via data bus 144 and data path 158. This changes the control voltage on line 160 to the VCXO 150 to restore synchronism.

With the VCXO 150 of each DATApipe adapter running at essentially the same frequency as the oscillator in the DATApipe adapter designated as the temporary master or reference, each slot processsor can count clock cycles or "clicks" to establish the word boundaries and slot boundaries. Each word time generates a word-mark pulse on line 162. Each slot time increments the slot number on data path 164.

The high-speed microprocessor (HSM) 120 provides real-time, high-speed control for all of the modules comprising the DATApipe adapter. The functions of decoding the incoming messages and maintaining clock synchronization have already been described. In addition, this processor provides the following functions:

Communications with Control Microprocessor 138
Provides a pool of buffers to accommodate incoming frames
Controls direction of memory-to-memory transfer
Controls "Flow" status.

Control microprocessor 138 provides supervisory control over the DATApipe adapter. It contains a non-volatile EEPROM memory which holds all of the system's initialization data, e.g., pipe-cycle length, slot-lenth, and initial slot assignments. Also, in user selected EEPROM or PROM, the control microprocessor memory stores the program for the control processor, the high-speed microprocessor, the logical transmitter, and the logical receiver. Upon system power-up, the HSM program is transmitted, via serial data link "WIG/-WAG DATA" 166, to high-speed microprocessor 120. The logical receiver and transmitter programs and the initial data base are sent from the control microprocessor 138 to the HSM 120, via channel 4, line 136, inward mux 88, data bus 90, inward decoupling memory 92, data bus 94, and the logical transmitter 96 on the HSM bus 144. During normal operation, the HSM provides status information to the system's operator and manages dynamic reassignment of DATApipe parameters. Via serial input/output connections 136 and 134, Wig/Wag line 166, and programs loaded to the HSM, it can completely test the DATApipe adapter in an off-line mode. It also provides an ancillary communication facility to various low-speed serial devices.

Synchronous channel 168 provides a bi-directional 1.5 mega Baud serial communication path. Lines 170 through 176 provide four channels of RS232 data for communication with a plurality of compatible devices connectable thereto. Lines 178 and 180 provide an analog voice input and voice output channel, which allows voice communication between two remote DATApipe adapters during maintenance.

Control microprocessor 138 preferrably comprises a Motorola 68010, which is a 16-bit microprocessor chip as well as various standard microprocessor support chips. Random logic in the control microprocessor 138 and control microprocessor memory is constructed using standard TTL-type integrated circuits. The high-speed interface between the control microprocessor 138 and multiplexors 88 and 124, as well as all of the other logic circuitry in the DATApipe adapter, is preferably constructed using high-speed ECL logic typified by the Motorola 10K and 10KH and Fairchild 100K families.

MESSAGE PROTOCOL

It is envisioned that any type of telecommunications device or network hereinafter referred to as "user devices" could be interfaced to the DATApipe via I/O processors (not shown in FIG. 1) connected to channels 0–3 of the DATApipe adapters. Such user devices could include main frame computers, super computers, optical disks, printers, video and voice transceivers, trunk communication lines and high bandwidth data collection devices, e.g., seismic recorders. Various networks, such as the presently available HYPERchannel or Ethernet, Wangnet or IBM Token Ring, might be interfaced to a specific I/O channel 0–3. In all instances, data communication is via an I/O processor which communicates over the I/O channel with the DATApipe adaper in a uniform protocol.

In the preferred embodiment, I/O channel communication is managed in a full-duplex mode employing a 40-bit word comprised of 32 bits of data, 4 bits of parity and 4 bits of control information. Two of the four control bits are used to indicate the status of "Flow" and "End-of-Transmission" (EOT). The flow of data across the I/O channel must be modulated to assure that neither of the buffer memories 92 and 118 in the DATApipe adapter nor the buffer memory in the I/O processor (not shown) are overrun. Specifically, when the I/O processor sends a word with the Flow bit closed, it indicates to the DATApipe adapter that there is buffer memory space available to receive one more frame of data in the I/O processor. Likewise, the DATApipe adapter sends words with its Flow bit closed when it can accommodate one more frame of data from the I/O processor. The "Flow =Closed" condition allows channel flow control in an orderly fashion on a frame boundary under hardware control. The "Flow=Open" indicates that data frames may be sent at will. When either the DATApipe adapter or the I/O processor sends a word with the EOT bit set, it signals the end of the last word of the block of data. The next long word sent begins the next data frame.

TABLE II

| BYTE | TITLE | SOURCE |
|---|---|---|
| | DATApipe header and data stream in bytes: | |
| −8 | sync pad | hardware |
| −7 | sync pad | hardware |
| −6 | sync pad | hardware |
| −5 | sync pad | hardware |
| −4 | Start Of Header | hardware |
| −3 | SOH | hardware |
| −2 | SOH | hardware |
| −1 | SOH | hardware |
| | | start CRC generation |
| 0 | reserved 0 | decoupling memory |
| 1 | physical TO | decoupling memory |
| 2 | reserved 1 | decoupling memory |
| 3 | physical From | decoupling memory |
| 4 | to/from chan | decoupling memory |
| 5 | format | decoupling memory |
| 6 | cont/supr | decoupling memory |
| 7 | message seq. | decoupling memory |
| 8 | ack. seq. | decoupling memory |
| 9 | message type | decoupling memory |
| A | M.S. data Int. | decoupling memory |
| B | L.S. data Int. | decoupling memory |
| C | reserved | decoupling memory |
| D | reserved | decoupling memory |
| E | reserved | decoupling memory |
| F | reserved | decoupling memory |
| 10 | M.S. slot # | hardware |

TABLE II-continued

DATApipe header and data stream in bytes:

| BYTE | TITLE | SOURCE |
|------|-------|--------|
| 11 | L.S. slot # | hardware |
| 12 | CSL | hardware (Comp. Slot Length) |
| 13 | flag byte A | decoupling memory |
| | | *stop CRC generation* |
| 14 | pad | hardware |
| 15 | pad | hardware |
| 16 | pad | hardware |
| 17 | pad | hardware |
| 18 | CRC | hardware |
| 19 | CRC | hardware |
| 1A | CRC | hardware |
| 1B | CRC | hardware |
| 1C | pad | hardware |
| 1D | pad | hardware |
| 1E | pad | hardware |
| 1F | pad | hardware |
| | | *start CRC generation* |
| 20 thru | CSL data | decoupling memory |
| | pty. pad | hardware |
| | pty. pad | hardware |
| | pty. pad | hardware |
| | pty. pad | hardware |
| | | *stop CRC generation* |
| +1 | pad | hardware |
| +2 | pad | hardware |
| +3 | pad | hardware |
| +4 | pad | hardware |
| +5 | CRC | hardware |
| +6 | CRC | hardware |
| +7 | CRC | hardware |
| +8 | CRC | hardware |
| +A | pad | hardware |
| +B | pad | hardware |
| +C | pad | hardware |
| +C | pad | hardware |

Table II above shows the format for one DATApipe frame in the preferred embodiment. Bytes −8 through −1 are generated by hardware in the DATApipe adapter. This includes a synchronization pad, which is used by the receiving modem 22, to recover the embedded clock signal and a Start-Of-Header (SOH), which is used by the receiving DATApipe Serial I/O module 100, to establish word boundaries.

At the end of the SOH, a cyclic redundancy check circuit (CRC) is enabled. Byte 1 contains the number of the DATApipe adapter which is the message destination, while byte 3 defines the DATApipe adapter number which originated the message. During normal message traffic, bytes 1 and 3 are generated by an I/O processor. Alternatively, these bytes can be generated by the DATApipe adapter to permit communication directly between DATApipe adapters, via the DATApipe medium. The most significant nibble of byte 4 defines the destination I/O channel number while the least significant nibble of byte 4 defines the origin channel number. Byte 5 allows a multiplicity of data formats to be identified. Control and supervisory information is conveyed in the most significant and least significant nibbles of byte 6, respectively. The message sequence and acknowledge sequence of bytes 7 and 8 provide a means for I/O handshaking to assure that all frames transmitted are actually received. Bytes A and B (hex) define the number of bytes in the data field. Bytes 10 and 11 define the slot number that the frame will be transmitted on. This number is provided by the slot processor 114 in the transmitting DATApipe adapter and is checked by the logical receiver 112 in the receiving DATApipe adapter. Byte 12 is the compressed slot length. It is representative of the actual slot length in powers of 20 long words. It is generated by the logical transmitter 96 of the originating DATApipe adapter and is used by the logical receiver 112 of the destination DATApipe adapter to define the end of the data field. At the end of byte 13, CRC generation is disabled. Bytes 18 through 1B are the cyclic redundancy check (CRC) remainder, which is checked by the receiving DATApipe adapter to assure that there are no errors in the frame header. At the end of byte 1F, CRC generation is again enabled and the data field bytes 20 through the value contained in byte 12, i.e., the compressed slot length, are transmitted. This is followed by the cyclic redundancy check code for the data field.

Since the DATApipe may be the backbone of a hierarchical interconnect system, the data field of this format may, in fact, contain other header information necessary for communication at lower levels in the hierarchy.

During normal message traffic, bytes 0 through 13 (exclusive of slot number and compressed slot length) and bytes 20 through the compressed slot length (CSL) are generated by the originating I/O processor and are transmitted to the destination I/O processor. This allows each I/O processor to establish a variety of message protocols independent of the DATApipe system which best suit unique communication needs.

Having described the overall structural configurations of the DATApipe adapter, consideration will now be given to a more detailed description of the various modules shown in FIG. 2(a).

INWARD MULTIPLEXER

Figure 3:
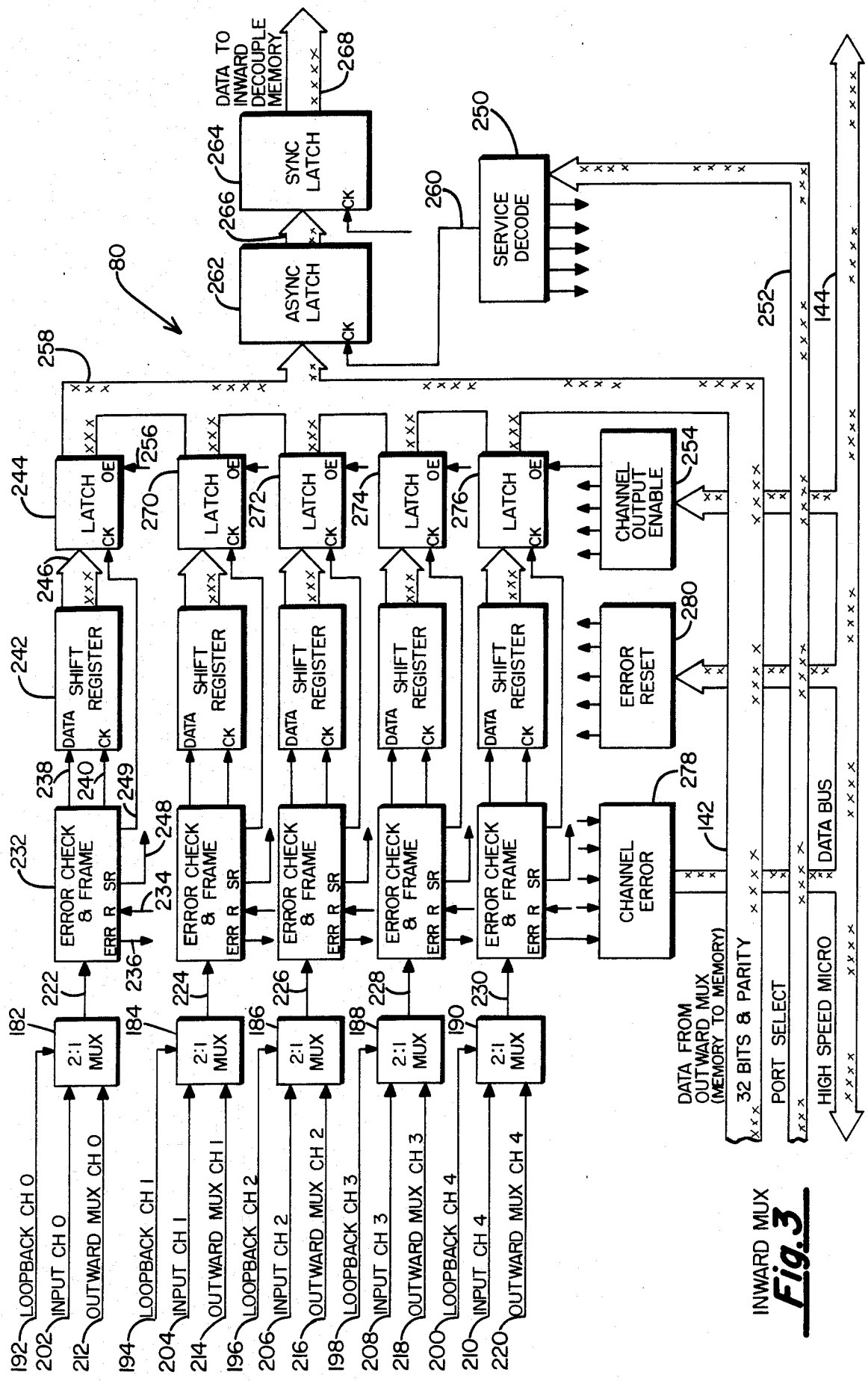
FIG. 3 is a detailed block diagram of the Inward Multiplexer portion of the DATApipe adapter.

FIG. 3 is a detailed block diagram of inward multiplexer 88 of FIG. 2. It accommodates four channels of serial data input. Two-to-one multiplexers 182 through 190 select the source of the input data as determined by the state of loopback control signals on lines 192 through 200. In normal operation, the input source is the external input channel lines 202, 204 . . . 210. For diagnostic purposes, however, the data from the outward mux can be looped-back to the inward mux via lines 212, 214 . . . 220. In either event, the resulting data for channels 0 through 4 appears on lines 222 through 230, respectively. Although for simplicity the aforementioned signal lines are shown diagrammatically as a single line, each is actually comprised of three conductors, namely, a data line, a clock line and a violation signal or timing line. Via input channel 0 (line 202) data is shifted into error check and framing circuit 232 by a clock signal included in the data on line 222. Circuit 232 checks for errors in the transmission. A violation or timing signal from mux 182, in the event of any error condition, generates an error signal on line 236. Data is passed on, via data and clock lines 238 and 240, to shift register 242. The violation or timing signals establish framing boundaries for each 36-bit word (32 data plus 4 parity bits). When a complete 36-bit word has been shifted into shift register 242, the framing circuit 232 generates a "load" pulse on line 249 to latch the shift register's parallel data into latch 244, via data path 246. Subsequent to this clock pulse, a service request is generated on line 248 which goes to service decode circuit 250. When the port select code corresponding to channel zero appears on port select bus 252, the channel output enable circuit 254 generates an output enable for latch 244 on line 256, presenting the parallel data word on data bus 258. The coincidence of this port select code with service request 248 causes line 260 to go active, latching the data in the asynchronous latch 262. A separate, second, synchronous latch 264 is clocked at a time period synchronous with the decoupling memory 92 timing, causing the data to pass from latch 262 to latch 264, via data path 266, and thus be presented on the data path 268, which is data from the inward multiplexer 88 to the inward decoupling memory 92. This combination of latches is thus tolerant of timing jitter between the DATApipe adapter and the I/O processor.

Since the port corresponding to channel 0 is selected every 20 decoupling memory cycles, corrsponding to 0.64 microseconds, the data is guaranteed to be sampled from latch 244 before the next word is clocked in. In the same manner, input data for channels 1 through 4 appear on lines 204 through 210, causing data to be periodically clocked into latches 270, 272, 274 and 276. The contents of each of these registers will be transferred to latch 262 as the corresponding port is selected via port select on bus 252. When the port select code is 01 (See Table I), data from the outward multiplexer is impressed on data bus 258 and is latched into register 262 to provide the memory-to-memory and HSM to memory data path.

An error on any channel will cause an interrupt to be sent to the high-speed microprocessor (HSM) 120, via the channel error/sense circuitry 278 and the HSM data bus 144. When such an error interrupt has occurred, the number of the channel generating the error can also be sensed by the HSM 120 via this path. The HSM generates an error reset by the way of HSM data bus 144 and error reset circuitry 280.

DECOUPLING MEMORY

Figure 4B:
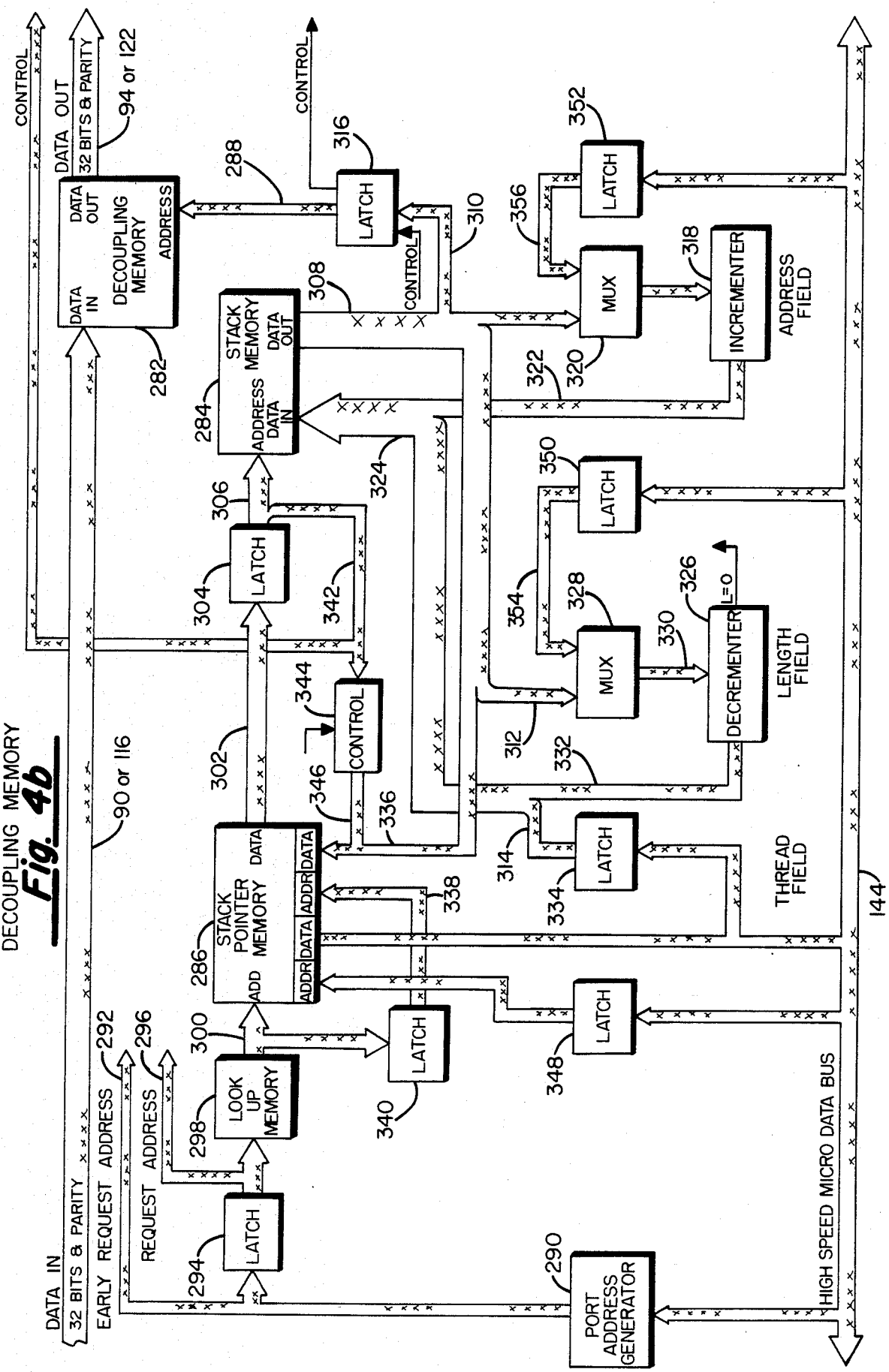
FIG. 4(b) is a detailed block diagram of the decoupling memories used in the DATApipe adaptor of FIG. 2.

Referring to the detailed block diagram of the decoupling memory of FIG. 4(b), decoupling memories 92 and 118 of FIG. 2(a) are substantially identical and are illustrated as being high-speed multi-port memories which provide direct memory access (DMA) operation. The inward and outward decoupling memories 92 and 118 are identical circuits. They operate as inward or outward only on the basis of the physical position they occupy in the DATApipe adapter. The assignment of ports and request addresses to decoupling memory cycles are shown in Table I.

This assignment provides a 50-megabit bandwidth to each of the I/O channels, a 100-megabit bandwidth for memory-to-memory transfers, a 100-megabit bandwidth for high-speed micro access, and a 500-megabit bandwidth to receive or transmit communication with the DATApipe. It is possible to change bandwidth assignments by changing the port address generator 290 should the need arise.

For each memory cycle, the DMA hardware determines the correct address for the decoupling memory 282 (FIG. 4(b)) and controls the transfer of data between that addressed memory cell and the requesting port. The generation of the decoupling memory address is accomplished with two additional memories, i.e., the stack memory 284 and the stack pointer memory 286.

The manner in which the decoupling memory address is generated is shown conceptionally with the aid of the data flow diagram of FIG. 4a. The request address code from Table I is used to point to the word in the stack pointer memory 286 which corresponds to the port to be serviced. As is illustrated, in that word is a thread field and four single-bit fields which are used to control memory operation.

If the run/enable bit of the stack pointer word is cleared, the memory transfer will be inhibited. If the Flow bit of that word is cleared on the inward decoupling meory, the Flow "off" will be passed to the data source and data transfer will stop after this block and will resume only when the flow bit is again set. The Interrupt and Interrupted bits are used by the high-speed microprocessor to determine the status of threads. The thread field of the stack pointer word from the stack pointer memory 286 points to the address of the stack memory 284 which contains the current stack entry for the requesting port. As is indicated in FIG. 4(a), the stack entry has three fields labeled "thread", "length" and "adress". The address field of the stack memory points to the address in 32-bit word units in decoupling memory 282 which will be the site of the current memory transfer. Conditional on the state of the "run/enable" bit, the memory transfer will be accomplished, the address field will be incremented, the length field will be decremented and the modified stack entry word will be restored in the stack memory 284.

On the next cycle, a different port will address a different stack pointer memory work pointing to yet another stack entry so that the address generated for the decoupling memory 282 will correspond to the next sequential address required by that port. In this manner, each stack entry of the stack memory 284 controls the transfer of a block of data between a given port and a buffer region of decoupling memory where the initial address of that buffer is determined by the initial address field of the stack entry and the length of the buffer is determined by the "length" field. When the "length" field on a given stack entry has decremented to 0 and/or the data source sends an EOT, the "thread" field of the stack entry is stored into the thread field of the stack pointer memory 286 at the address specified by the request address. The next time that this port is serviced, the thread field of the stack pointer memory entry will be the thread field from the previous stack pointer memory entry. The stack pointer is now pointing to a new stack entry for the stack memory 284 which will control the continuation of memory transfer, but in a different buffer in a different region of the decoupling memory space. It can thus be seen that the "thread" field provides the linkage of stack entries together, such that this linked set can maintain continuous buffering of data transfer for a given port. As the stack entries complete, i.e., the "length" field goes to 0, they are accessed by the high-speed micro and reinitialized so that they are threaded back to the end of the stack entry thread. The management of stack entries and threads will be covered in a detailed discussion of the high-speed micro.

Referring once again to the detailed block diagram of FIG. 4(b), data is written into decoupling memory 282 from either the inward mux 88 or the logical receiver 112 corresponding to data paths 90 or 116 in FIG. 2(a), respectively. Data output from the decoupling memory goes to either the logical transmitter or the outward multiplexor on data paths 94 or 122. The remainder of the circuitry in FIG. 4(b) functions to provide the correct address on address bus 288 for each memory transfer.

Port address generator 290 generates memory request addresses per Table I. On memory cycle 20, the maintenance cycle, port address generator 290 generates a code provided by the high-speed micro, via data bus 144. The output of the port address generator provides the early request address on data path 292. The output of latch 294 generates the request address on data path 296 one 32-nanosecond clock cycle after the early request address. Lookup memory 298 translates the request address into an address for stack pointer memory 286. The stack pointer memory is a three port memory of eight words by twelve bits. Any port may asynchronously access any word. In normal operation, the address on data path 300 generates the stack memory address on data path 302, which is latched in latch 304. The output of latch 304 on data path 306 is the address of the current stack entry in stack memory 284. The data output word on path 308 of the stack memory 284 contains the address field on bus 310, length field on bus 312, and thread field on bus 336.

The address field is captured in latch 316 and presented as an address to decoupling memory 282, via data path 288. The address field is also presented to incrementor 318, via multiplexor 320. The output of incrementor 318 forms the new address field on bus 322 of the stack memory input data word bus 324. The length field of the stack memory data output word is presented to decrementor 326, via data path 312, the multiplexor 328, and data path 330. The new length field on bus 332 also forms a portion of the data input word on path 324. Finally, during maintenance operation, the output of latch 334 provides the thread field on path 314 and carries a part of data input word on path 324.

In normal operation, the address field is incremented, the length field is decremented and these two modified fields are written back into stack memory 284, via data path 324. However, the thread field is left unchanged, i.e., the write enable for the thread field bits is not activated at this time. When decrementor 326 reaches 0, the L=0 or EOT signal causes the thread field from the stack memory data path 336 to be written into the stack pointer memory 286. The address for this write on data path 338 has been delayed one clock cycle by latch 340 so that the data is written into the same stack pointer memory word that originally generated the stack entry. This action, which occurs one cycle after the actual decoupling memory cycle, provides the threaded linkage of stack entries, i.e., each stack entry points to its successor.

The stack pointer memory control field, i.e., "write enable", "flow", "interrupt", and "interrupted", are shown as data path 342. These control bits are conditionally modified by control circuitry 344 to reflect a change in status and written back into the stack pointer memory, via data path 346, in the same manner that the thread field was written. Write enables for the thread field and the control field are separate so that these actions may be done independently.

As stack entries empty, they must be rewritten by the high-speed micro to provide a continuous thread of stack entries. This is accomplished via data bus 144. To create a new stack entry, the high-speed micro sequentially latches the thread field, the length field and the address field in latches 334, 350 and 352, respectively. The port address associated with the new stack entry is latched into port address generator 290. On the next maintenance cycle, input 354 is selected for the length field multiplexor 328, and the input 356 is selected for the address field multiplexor 320. Latch 334 is for the thread field. The write is enabled for all three fields into stack memory 284, and a new stack entry for the selected port is thus provided.

To maintain continuous word transfers every 32 nanoseconds, it is necessary to pipeline the decoupling memory control operations. The details of this overlap or pipeline timing are shown in FIG. 4(c). This diagram shows the timing for two difference memory accesses. On the left of the figure is a "write" from the multiplexer to memory, and on the right is a logical receiver "write" to memory. The memory accesses are divided into 32 nanosecond pieces.

LOGICAL TRANSMITTER

Figure 6:
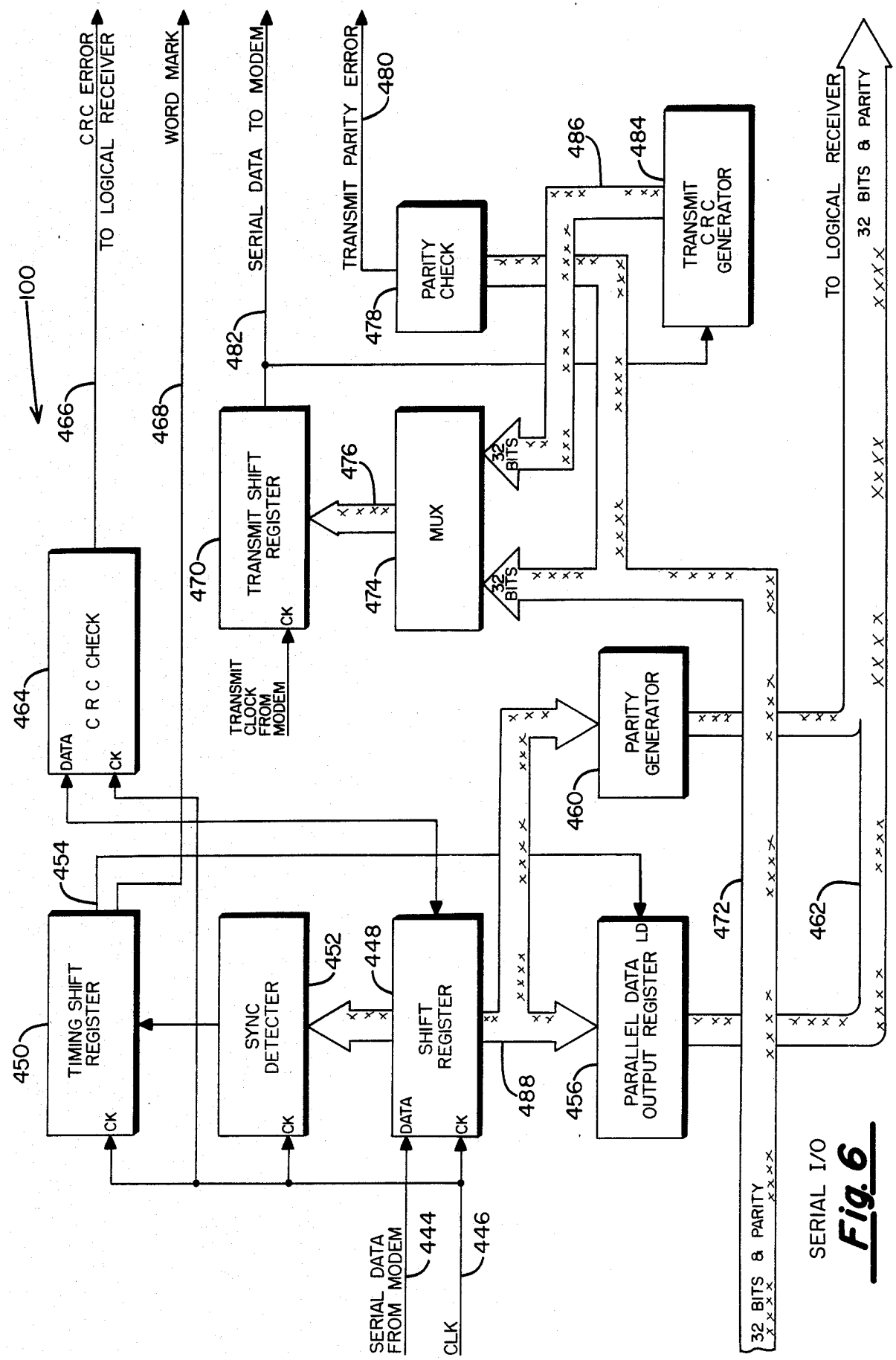
FIG. 6 is a detailed block diagram of the serial I/O section of the DATApipe adapter of FIG. 2.

FIG. 5 is a detailed block diagram of the logical transmitter 96 of FIG. 2(a). The primary function of the logical transmitter is to route frames from the inward decoupling memory 92 to the DATApipe media 10. The movement of data through the logical transmitter is controlled by stream processor 358, which is a special-purpose high-speed microprogrammable controller. It operates in synchronism with the movement of data in that is executes one micro instruction during the 64-nanosecond period in which a word is transmitted to the Serial I/O module (FIG. 6). The stream processor's instructions can be programmed to branch, depending upon the state of the various input conditions present on lines 359 through 368. At each instruction time, the particular program branch taken causes control lines represented by buses 372, 374 and 376 to be selectively activated to control the flow of data. The logical transmitter stream processor 358 employs a 36-bit instruction word, the format of which is shown in Table III.

TABLE III

LOGIC TRANSMITTER INSTRUCTION WORD FORMAT

| 0 | 1–3 | 4 | 5, 6 | 7 | 8 | 9 | 10 | 11, 12 | 13 | 14 | 15 | 16 | 17 | 18–21 | 22, 23 | 24–26 | 27 | 28–35 | L.S.B. |
|---|-----|---|------|---|---|---|----|--------|----|----|----|----|----|-------|--------|-------|----|-------|--------|

- 28–35: Program Address
- 27: Sync Pattern Parity
- 24–26: Lower 3 bits of sync
- 22, 23: Slot Length Counter Mode
- 18–21: Lower Slot Length
- 17: Clear Slot Mark Interrupt (if = 0)
- 16: Write to Slot Memory (if = 0)
- 15: Read Slot Memory

TABLE III-continued
LOGIC TRANSMITTER INSTRUCTION WORD FORMAT

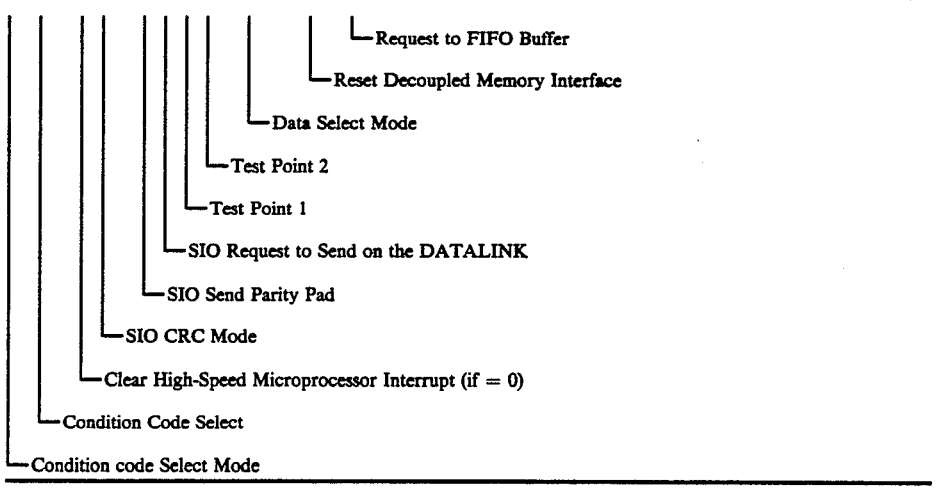

The state of bit positions 4 through 35 determines the specific actions which will be taken by the stream processor during the current instruction cycle. Assuming a 500 megabit rate on the DATApipe, each 64 nanoseconds, a new instruction is fetched from the stream processor control store and a new combination of control actions are initiated. The address of the control store for the next instruction is determined by the state of bits 0 through 3 on the current instruction. The instruction word format has been chosen such that the program running in from the stream processor control store memory can effect all of the actions required to route data to the decoupling memory.

As an aid to understanding the functioning of the stream processor, a detailed description of each field of the instruction word format follows.

BIT 0-CONDITION SELECT MODE

Bit 0 determines which one of three different instructions to jump to depending upon whether the selected Condition Code (CC), (Bits 1-3) passes or fails. The current instruction word is pointed to by the "P" register. The instruction following the current P-register is "P+1". If there is a jump to a Control Store (C.S.) address whose value found in the instruction being executed, then the next instruction to be executed would be defined as P=C.S. Specifically then:

If bit 0=0 and the Condition Code Passes, the P=P+1 (i.e., the instruction following the current instruction is executed if CC passes).

If bit 0=0 and the Condition Code Fails, then P=P (i.e., the same instruction is executed over and over until executed the Condition Code passes).

If bit 0=1 and the Condition Code Passes, then P=C.S. (i.e., the instruction whose address is found in bits 28-35 of this instruction is executed if CC is pass).

If bit 0=1 and the Condition Code Fails, then P=P+1 (i.e., the instruction following the current instruction is executed if CC fails).

BITS 1-3—CONDITION CODE

There are eight possible condition codes, numbered 0 through 7. If the selected condition exists at the start of the instruction, then the condition code passes. If the condition does not exist at the start of the instruction, then the condition code fails. The value of bit 0, the condition code select mode, determines which instruction is to be executed next. However, regardless if the CC passes or fails, all of the operations selected in the instruction word are performed before the next operation is started. Each condition code is explained in detail in the following sections:

CONDITION CODE 0—MICRO REQUEST

If the Slot Descriptor Table entry of slot memory 378 for this slot address has bit 3 set (Micro request), then the Condition code passes. If not, the CC fails.

CONDITION CODE 1—SLOT LENGTH COUNTER=0.

If the slot length counter 380 containing the Slot Length (USL) decrements to zero during an output operation to the SIO circuit, then the Condition code passes. If not, then the CC fails.

CONDITION CODE 2—INTERRUPT FROM THE HSM

If the HSM has set bit 8 in register C001, then a HSM interrupt has occurred, and the Condition code passes. If not, then the CC fails.

CONDITION CODE 3—SLOT PROCESSOR MARKS A "VALID" SLOT

When the Slot Processor determines that the slot identified by the slot number sent to the logical transmitter has "arrived" and/or that it is time to transmit on that slot, then the Slot Processor sends the valid slot signal on line 362 and the Condition code passes, If not, then the CC fails.

CONDITION CODE 4—UNCONDITIONAL PASS

This Condition Code always passes, and all operations are performed.

CONDITION CODE 5—"MY SLOT"

If the Slot Descriptor Table entry of Slot Memory 378 for this slot address has bit 4 set (line 360), then this slot belongs to this DATApipe adapter and the logical transmitter must transmit during this slot and the Condition code passes. If not, then the CC fails.

CONDITION CODE 6—RUN ENABLE

If the Run enable bit from the selected port of the Inward Ducoupling Memory is set (line 364), then there is data to send on this slot and the Condition code passes. If not, then the CC fails.

CONDITION CODE 7—SIO PARITY ERROR

If there was a parity error indication from the SIO board (line 366) which actually transmits the data, then the Condition code passes. If not, then the CC fails.

BIT 4—CLEAR MICRO INTERRUPT

If the High Speed Micro has set bit 8 in register C001 (which can be detected by Condition Code 2), then this interrupt bit can be cleared if bit 4=0. (NOTE: Bit 4=ZERO clears the bit.) If bit 4=1, then the interrupt is not cleared, and the interrupt is enabled.

BITS 5-6—SELECT SIO CRC MODE

When headers or user data is being sent to the DATApipe bus, it is necessary to calculate and append a 32-bit CRC code to the end of the header and/or data. Bits 5 and 6 (Serial I/O control 380) allow the logical transmitter to initialize the CRC count, (CRC.INI) to zero; in later instructions to Generate the CRC as data is moving out of the SIO, (CRC.GEN); and to temporarily halt the generation of the CRC, (CRC.HLD), without reinitializing the count.

BIT 7—SIO TO SEND A PARITY PAD

If there was a parity error in the data transfer starting from the last sync pad, this bit commands the SIO board, via Serial I/O control 381, to alter bit 31 of the sync of the parallel data which serves as a flag to the DATApipe receiver that a transmission parity error occurred.

BIT 8—REQUEST TO TRANSMIT DATA ONTO THE DATApipe BUS

When bit 8 is set, a "Request-to-Send" signal is generated in Serial I/O control 381. This signal may be used to turn on a transmitting laser diode.

BIT9—TEST POINT 1

This bit defines a test point which can be used to debug the hardware with the use of test equipment. Test point 1 is connected to an LED, and may be programmed to show when data is actually moving over the DATApipe bus.

BIT 10—TEST POINT 2

This bit defines a test point which can be used to debug the hardware with the use of test equipment. Test point 2 is also connected to a LED, and may be programmed to indicate any operation.

BITS 11-12—DATA SELECT

Bits 11 and 12 (line 382) select the input of multiplexor 384 that is to be sent to the SIO board and thus over the DATApipe bus. When bits 11 and 12=3, (DTA.SPP), then bits 24-26 and bit 27 (Sync pattern plus parity) are also used. Specifically, the values for bits 11-12 are:

Bits 11,12=0= DTA.FIF=Send FIFO data to SIO. FIFO data is data from Decoupling Memory, via data path 386.

Bits 11,12=1 means send the High Speed Micro Selectable flag pattern, via data path 388.

Bits 11,12=2= DTA.HHW means send the Hardware Header Word data to SIO, via data path 390.

Bits 11,12=3= DTA.SPP means send the Stream Processor Sync Pattern data to SIO. The Sync pattern is a 32-bit value. Bits 24 through 28 of this pattern are forced to ones, from sync pattern register 392, and bits 29-31 are obtained from bits 24-26 of this instruction word, via data path 376. This method allows different "flags" to be sent using the sync field. The value of these flags are Start of header (DTA.SPP.SOH), Parity Error detected (DTA.SPP.P/E), and No error detected, (DTA.SPP.NOE). Bit 27 is also used when Bits 11,12=3. (See definition of bits 24-26 and bit 27).

BIT 13—RESET DECOUPLING MEMORY

When set, this bit will allow the FIFO registers to be loaded with the data from the Decoupling Memory port (FIFO control lines 394).

BIT 14—FIFO REGISTERS TO ADVANCE DATA DURING TRANSFER

When set, this bit requests the FIFO registers to pull another word from Decoupling Memory during data transfer involving DM (FIFO control lines 394).

BIT 15—REQUEST TO SLOT DESCRIPTOR TABLE

This bit controls the selection of multiplexor latch 396, via select lines 398. When this bit is a zero (0), it is a request to the slot descriptor table to read a location from the table into a holding register. The address to read is provided by the Slot Processor, via data path 400, and is actually the slot number. This request should only come after a slot mark interrupt ("valid" slot) from the Slot Processor.

BIT 16—WRITE TO SLOT DESCRIPTOR TABLE

This bit controls the selection of multiplexor latch 402, via Select line 404. When this is a zero (0), the Logical Transmitter 96 will Write data to the slot descriptor table. This data is usually ending status and the data bits 0-3 of the Slot Descriptor Table is written from bits 18-21 of this instruction word, via data path 374.

BIT 17—CLEAR SLOT MARK INTERRUPT

When this bit is a zero (0), the Slot mark interrupt detected by the Condition Code 3 will be cleared. This can be done any time after it is set, e.g., any time during the transmission of the slot. When set to a 1, this bit will enable the slot mark interrupt.

BITS 18-21—SLOT STATUS OR LOWER SLOT LENGTH

BITS 22-23—LOWER SLOT LENGTH COUNTER MODE

The slot descriptor table contains an "Upper Slot Length", which is the upper 8 bits of a 12-bit slot length. The instruction itself contains the remaining lower 4 bits of the slot length (Lower Slot Length) in bits 18-21 of the instruction word. Together, any multiple of 1 to 4095 32-bit words can be sent over the DATApipe bus. The lower slot length can be manipulated further by this field. The lower slot length can be initialized during an instruction, (LSL.INI=0) decremented during an instruction, (LSL.DEC=1), or need not be changed (Held) during an instruction, (LSL.HLD=2).

BITS 24-26 AND BIT 27, SYNC PATTERN (Used with Data Select (bits 11-12)

When bits 11,12=3, then the Stream Processor Sync pattern is to be sent to the SIO, via data path 376. Which pattern is sent depends upon the value in bits 24-27. Bit 27 is the Parity bit for bits 24-26 and is included in this description. The Sync pattern is a 32-bit value. Bits 0, 6, 12, 21 and the parity bits for bytes 1 and 2 (designated P01, P02), are zero. All the rest of the bits through bit 28 of this pattern are forced to ones, and bits 29-31 are obtained from bits 24-26 of this instruction word. This method allows different "flags" to be sent using the sync field. The value of these flags are Start of header, Parity Error detected, and No error detected. Each of these values is assigned a mnemonic. These values are:

Bits 24-27=1= DTA.SPP.SOH means send the Sync Pattern of Start-of-Header.

Bits 24-27=2= DTA.SPP.P/E means send the Sync Pattern of Parity error.

Bits 24-27=4= DTA.SPP.NOE means send the Sync Pattern of No error.

BITS 28-35—PROGRAM ADDRESS

If the Condition Code Select Mode (bit 0)=1 and the Condition Code passes, then the program continues at the instruction whose address is found in bits 28-35 of this instruction.

Having described the Micro Instruction format for the stream processor 358, next to be discussed is the sequence of events involved in routing a frame of data through the logical transmitter 96.

Recall from the discussion of FIG. 2(b) that the logical transmitter has been assigned to transmit data on the DATApipe bus in specified time slots from decoupling meory. The logical transmitter must, in real-time, determine the occurrence of its assigned time slots and fetch the appropriate data words from the inward decoupling memory. It must also generate certain of the fields required for the frame header.

In prior art systems, the number of sequential logical decisions required to do this is large relative to the word fransfer interval. A novel arrangement of circuitry in the logical transmitter allows a complex decision to be made upon each stream processor instruction cycle, i.e., each word transfer time. It is the ability of the logical transmitter to operate in this mode, which enables the DATApipe system to achieve the high data rates indicated earlier herein.

The operation of the logical transmitter to generate a DATApipe frame format corresponding to Table III will now be described. The operation of the logical transmitter is determined by the program running in stream processor 358. Prior to the generation of a frame, the serial I/O transmit cyclic redundancy code circuitry (CRC) is initialized and placed in a "Hold" mode, via serial I/O control signals 381. The stream processor is initially in a "wait" loop, where it repeatedly tests the state of valid slot signal 362 coming from the slot processor. The slot processor activates this line to identify the beginning of a slot assigned for the logical transmitter to transmit in. When a valid slot is identified, the stream processor captures the slot number available from the slot processor, via data path 400, in latch 406. It then generates a request to the slot descriptor table, which causes the multiplexor select line 398 to route the slot number on data path 408, through multiplexor 396, to data path 410, thereby providing the slot number as an address to slot memory 378. The data read out of slot memory 378 is captured in latches 412, via data path 416. The entire word from the slot memory is latched and contained in latch 412. This is comprised of an 8-bit field on path 418 which defines the compressed slot length, a 3-bit field on path 420 which defines the decoupling memory port and two control bits on line 360 which are identified as "Micro Request" and "My Slot". Only the high-speed microprocessor requested data is captured in latch 414. The output of this on data path 422 provides selection to multiplexor 424.

Next, the slot length counter is placed in the initialize mode, causing the compressed slot length, field 418, to be loaded into the upper eight bits of the 12-bit counter while the lower four bits are provided, via data path 372 from the stream processor. The value contained in the compressed slot length field is one less than the actual compressed slot length. Thus, by means of data path 372, the stream processor can initialize the slot length counter with a count which is a specified number less than the actual slot length. Next, the stream processor 358 tests the state of the "run enable" line 364 from the decoupling memory. This will be active only if the decoupling memory has a buffer ready to send for the port specified by the field on path 420. If the "run enable" line is not active, transmission for this slot is aborted and the stream processor goes back to testing for the next valid slot. If the run enable line is active, the stream processor clears the reset decoupling memory interface bit to enable data transfers from the decoupling memory into the three-stage FIFO buffer 426, via control line 394. When enabled, the FIFO buffer 426 automatically generates memory requests to the inward decoupling memory. Data is transferred from the inward decoupling memory to the FIFO buffer, via data path 428, on each transmit cycle until the FIFO buffer is filled. The decoupling memory port select, field 420, identifies which of the decoupling memory buffers are to be transferred.

Next, a "Request-to-Send" signal is activated and sent to the Serial I/O, via Serial I/O control lines 381. This signal is logically combined with the Serial I/O error signal and a request-to-send signal from the control processor. The result is a "Request-to-Send" signal which is transmitted to the modem to enable the transmitting laser diode only if there is no Serial I/O error pending, the control processor has not detected an error nor has the stream processor detected any errors. This greatly minimizes the possibility of a collision on the DATApipe, causing spurious transmissions which would compromise the operation of the entire DATApipe network.

The logical transmitter is now ready to begin transmitting the frame. On the next cycle, the sync pattern word is formed on input 388 of multiplexor 384. Latch 434 is loaded from the high-speeed microprocessor, via data bus 144, which can thus provide any programmable pattern desired. Mux select control lines 382 are set so that the sync pattern is placed on data path 432 and sent to the serial I/O to form bytes −8 through −4 of Table II, the sync pad. On the next cycle, multiplexor input 430, the output of latch 434, is selected and transmitted to the serial I/O to provide bytes −4 through −1, i.e., the Start-Of-Header. The first 28 bits of the sync pattern are derived from a static sync pattern register 392 while the remaining four bits, plus parity, are developed by the stream processor and placed on data path 376. On the next cycle, the "transmit CRC generation" is enabled, via Serial I/O control lines 381, and the data input 386, multiplexor 384 is selected, via select lines 382. The first word is read out of FIFO buffer 426 to form bytes 0 through 4 of the frame. This process is repeated in the next four cycles to generate bytes 0 through F (Base Hex—Table II).

On the next cycle, hardware header word input 390 to multiplexor 384 is selected. This word is comprised of the slot number provided by data path 408, its associated parity provided by parity generator 436, the compressed slot length provided by data path 438 and its associated parity provided by parity generator 440 and, finally, flag byte A and its associated parity provided from FIFO 426, via data path 442. This is sent to the Serial I/O, via path 432, to provide bytes 10 through 13.

On the next cycle, the transmit CRC generator is placed in a "hold" mode and a parity pad generated. On the next cycle, the Serial I/O is commanded to transmit the CRC remainder, which provides the CRC code for the header (bytes 0–1F) and corresponds to bytes 18 through 1B. If a parity error occurred when the header was transferred, the SIO is instructed to alter or destroy the header's CRC byte, via line 381. After another pad word, corresponding to bytes 1C through 1F, transmit CRC generation, is again initialized. On successive cycles, data is transmitted from FIFO 426. Each time a word is transferred out of the FIFO, the decoupling memory is read on the next available cycle to refill it. The transmission of the data proceeds automatically without intervention by the stream processor. Thus, the stream processor may, at this time, do other housekeeping functions, including communication with the high-speed microprocessor. When any pending housekeeping tasks have been completed, the stream processor repeatedly tests the state of line 359, which is activated when the slot-length counter decrements to a count of zero. When this condition is sensed, the stream processor must bring the transmission cycle to an orderly conclusion.

Recall that the stream processor set the value of the slot-length count to a specific number less than the actual slot length. This provides several cycles to accomplish this orderly termination. First, the reset decoupling memory interface bit is set to inhibit further data transfers from the decoupling memory. FIFO 426 is emptied out to complete the data transmission. Next, follows a one-word parity pad after which CRC generation is put on "hold", followed by another parity pad word. Finally, a Serial I/O is enabled to transmit the CRC remainder in bytes +5 through +8, followed by another pad word, which concludes the transmission of the frame. At any time, the high-speed microprocessor may alter the contents of the slot memory 378 to effect a change in slot assignments or slot length. To accomplish a slot memory write, the high-speed micro places the address to be written into on data bus 144 and causes it to be latched in multiplexor latch 396. Next, the data to be written into the slot memory is placed on bus 144 and is latched into multiplexor latch 402, the HSM sample busy bit in C000. When the hardware clears "Busy", the operation is complete.

Provision is also made for the high-speed micro to read data latched in latch 450 from bus 428 to do an inward decoupling memory to HSM transfer. The output of latch 414 provides a selection to multiplexor 424 to place either the upper 16 bits, the lower 16 bits or the parity bits of data path 428 on the 16-bit high-speed micro data bus 144.

SERIAL I/O

FIG. 6 shows a detailed block diagram of the serial I/O 100 of FIG. 2(a). Modem 22 recovers the clock and data signals from the optical signal sensed on receive fiber 52. The data signal appears on line 444 while the clock signal appears on line 446. Serial data is continuously shifted into shift register 448. On each clock cycle, the parallel output of shift register 448 is latched into sync detector 452. When a specific sync pattern, i.e., a pattern of ones and zeros is present, the sync detector 452 initializes timing shift register 450. A single "1" will be continously circulated through timing shift register 450 such that three clock pulses after sync detection and every subsequent 32 clock pulses, a load pulse will be generated on line 454.

The unique sync pattern thus provides the necessary framing information so that the continuous serial data stream can be framed into 32-bit words. On each load pulse on line 454, a 32-bit word from shift register 448 is latched into the parallel data output register 456, via data path 458. The output of register 456 is provided to parity generator 460, which generates a parity bit for each byte of the 32-bit word. The 32-bit data word and its associated parity bits are combined in data path 462, which goes to the logical receiver.

Serial data is concurrently shifted into the cyclic redundancy code (CRC) check circuit 464. Each data frame header and its associated block of data is appended with a computed CRC block check code such that, at the end of that code, the state of the CRC register will be zero unless there is an error in the transmission of the data. A non-zero result at the conclusion of the block check code for either the header or the data block will result in a CRC error signal on line.

Timing shift register 450 also generates a word mark pulse on line 468 which is resynchronized to the 32-nanosecond system clock that occurs at a time when the data is known to be stable in output register 456. This signal can thus be used to latch the received data word by the logical receiver.

During transmission, data is continuously shifted out of transmit shift register 470 by the transmit clock provided by the modem. For each 32 clock cycles, in synchronism with the transmit clock, a new 32-bit word is presented to the transmit shift register 470 from the logical transmitter, via data path 472, the multiplexer 474 and the data path 476. Parity is checked on each word transmitted by parity checker 478, which will generate a transmit parity error signal on line 480 for any odd number of bit errors in the transmitted word. Serial data output on line 482 is presented to the transmit CRC generator 485, which generates a block check code for each block of data. At the end of each block of data, the output of the CRC generator 484 is transmitted, via data path 486, multiplexer 474 and data path 476.

LOGICAL RECEIVER

Figure 7:
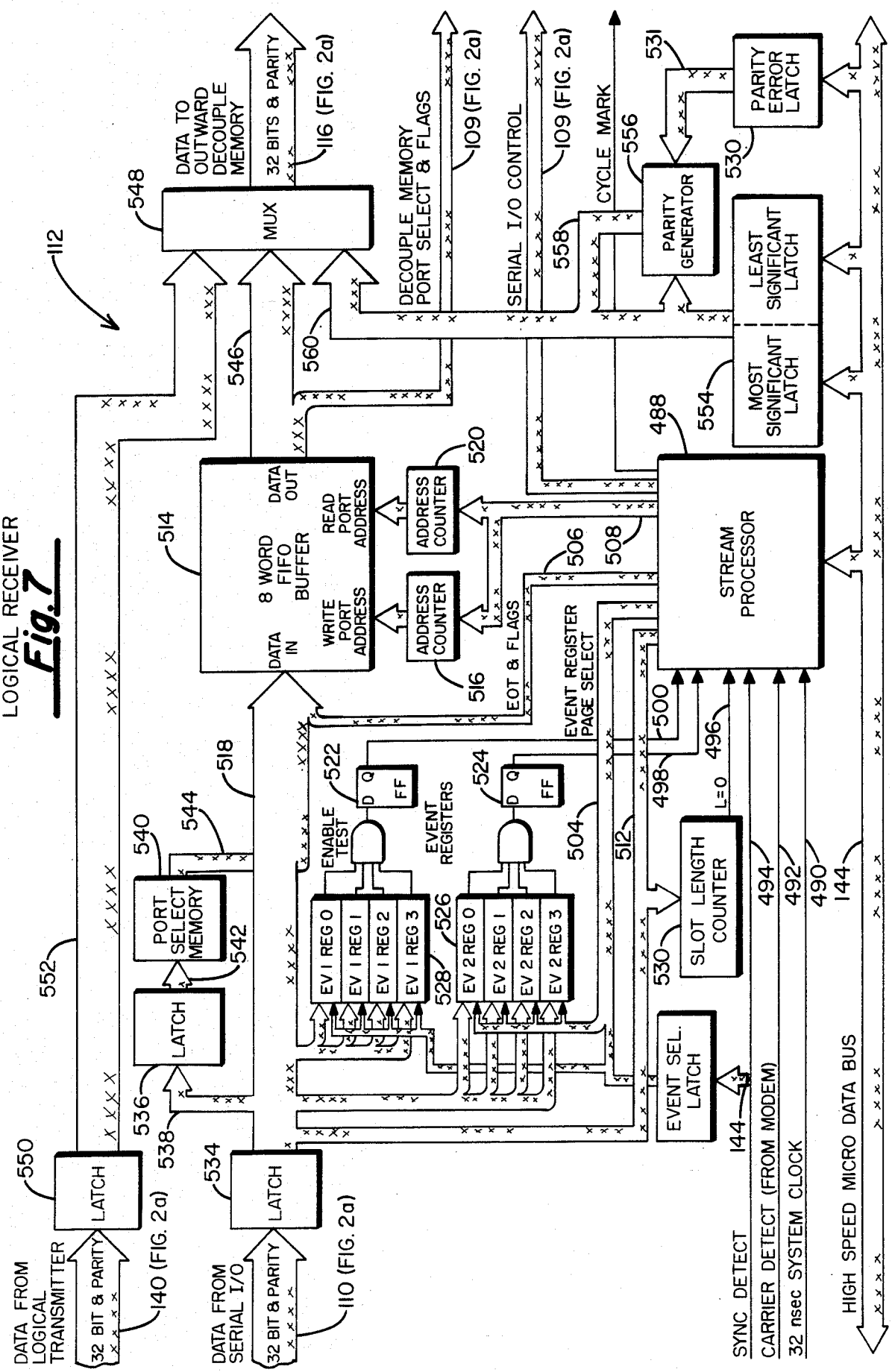
FIG. 7 is a detailed block diagram of the logical receiver portion of the DATApipe adapter of FIG. 2.

FIG. 7 is a detailed block diagram of the logical receiver 112 of FIG. 2(a). The primary function of the logical receiver is to route frames of data from the DATApipe bus to the outward decoupling memory.

The movement of data through the logical receiver is controlled by the stream processor 488, which is a special-purpose, high-speed, microprogrammable controller. It operates in synchronism with the movement of data in that it can execute one micro-instruction during the 64-nanosecond period in which a word is being transmitted from the Serial I/O (FIG. 6), again assuming a 500 megabit data rate on the DATApipe. The stream processor's instructions can be programmed to branch depending on the state of the various input conditions present on lines 490 through 500.

At each instruction time, the particular program branch taken causes control lines represented by buses 502 and 504 through 512 to be selectively activated to control the flow of data. The logical receiver stream processor 488 employs a 36-bit instruction word, the format of which is shown in Table IV.

has been chosen such that the program running in from the stream processor control store memory can effect all of the actions required to route data to the decoupling memory.

As an aid to understanding the functioning of the stream processor, a detailed description of each field of the instruction word format follows.

BIT 0—CONDITION CODE SELECT MODE

Bit 0 determines which one of three different instructions to jump to depending upon whether the selected Condition Code (CC) (Bits 1-3) passes or fails. The current instruction word is pointed to by the "P" register. The instruction following the current P-register is "P+1". If there is a jump to a Control Store (C.S.)

TABLE IV

LOGICAL RECEIVER STREAM PROCESSOR
INSTRUCTION WORD FORMAT

Bit Position

| 0 | 1-3 | 4 | 5,6 | 7 | 8 | 9 | 10 | 11 | 12 | 13 | 14 | 15 | 16 | 17 | 18 | 19-22 | 23,24 | 25,26 | 27 | 28-35 |
|---|-----|---|-----|---|---|---|----|----|----|----|----|----|----|----|----|-------|-------|-------|----|-------|

— FIFO address
— Lower Slot Len
— Program address
— EOT to FIFO
— FIFO Address ptr mode
— Slot Length counter mode
— Event 1 Memory addressing
— Event 2 Memory addressing
— Event 1 Enable test
— Event 2 Enable test
— Enable Event 2 & arm events
— Reset memory side FIFO
— Enable memory side FIFO
— Unused
— Test Point 2
— Test Point 1
— Cycle Mark
— Unused
— SIO Free-Run mode
— SIO CRC mode
— Write Enable to FIFO
— Condition Code Select
— Condition Code Select mode The state of bit positions 4 through 35 determines the specific actions which will be taken by the stream processor during the current instruction cycle. For a pipe rate of 500 megabits, each 64 nanoseconds, a new instruction is fetched from the stream processor control store and a new combination of control actions are initiated. The address of the control store for the next instruction is determined by the state of bits 0 through 3 on the current instruction. The instruction word format address whose value is found in the instruction being executed, then the next instruction to be executed would be defined as P=C.S. Specifically then:

If bit 0=0 and the Condition Code Passes, then P=P+1 (i.e., the instruction following the current instruction is executed if CC passes).

If bit 0=0 and the Condition Code Fails, then P=P (i.e., the same instruction is executed over and over until the Condition Code passes).

If bit 0=1 and the Condition Code Passes, then P=C.S. (i.e., the instruction whose address is found in bits 28-35 of this instruction is executed if CC is pass).

If bit 0=1 and the Condition Code Fails, then P=P+1 (i.e., the instruction following the current instruction is executed if CC fails).

BITS 1-3—CONDITION CODE

There are eight possible condition codes, numbered 0 through 7. If the selected condition exists at the start of the instruction, then the condition code passes. If the condition does not exist at the start of the instruction, then the condition code fails. The value of bit 0, the condition code select mode, determines which instruction is to be executed next. However, regardless if the CC passes or fails, all of the operations selected in the instruction word are performed before the next operation is started. Each condition code is explained in detail as follows.

CONDITION CODE 0—UPPER SLOT LENGTH COUNTER EQUALS 0

If the state of line 504 is 0, indicating that the count contained in slot length counter 530 is 0, the condition code passes. If the slot length count is not 0, the condition code fails.

CONDITION CODE 1—INTERRUPT FROM THE HIGH-SPEED MICRO

If the high-speed microprocessor has set a specific bit, via data bus 144, which is indicative of an interrupt, the condition code passes. If not, then the condition code fails.

CONDITION CODE 2—EVENT 2 DETECTED

If a 1 is sensed on line 498, indicating the Event 2 has been detected, the condition code passes. If not, then the condition code fails.

CONDITION CODE 3—EVENT 1 DETECTED

If a logical 1 is sensed on line 500, indicating that Event 1 has been detected, the condition code passes. If not, then the condition code fails.

CONDITION CODE 4—UNCONDITIONAL PASS

This condition code always passes and all operations are performed.

CONDITION CODE 5—CARRIER DETECTED

If a carrier detect signal is present on line 492, the condition code passes. If not, then the condition code fails.

CONDITION CODE 6—SYNC DETECT

If a sync detect signal is present on line 494, the condition code passes. If not, then the condition code fails.

CONDITION CODE 7—CRC OR PARITY RESULT

If there was a parity error indication from the CRC field in the message received, then the condition code passes. If not, then the condition code fails. The transmitting DATApipe adapter sets this bit in the sync pattern following the data field.

BIT 4—WRITE ENABLE TO FIFO

This bit controls the writing of data from the serial I/O into FIFO 514, via control lines 508 and address control circuitry 516. When this bit is set, data present on bus 518 is written into the FIFO buffer 514. If this bit is cleared, the word is skipped.

BITS 5 and 6—SELECT SERIAL I/O CRC MODE

Combinations of these two bits establish the serial I/O CRC mode, which is transmitted to the serial I/O, via data path 109 (FIG. 2). Specifically, these three modes are CRC initiate, which causes the CRC shift register to be initialized to a preset value. CRC check which causes the CRC to run in its normal checking mode or CRC hold which causes a temporary halt in the generation of CRC without reinitializing the count. Normally, the CRC checking is halted to skip a pad word and then checked against the next word received, which is the CRC word the transmitter calculated. The result of the last check or computation should produce a 0 result if the CRC compares.

BITS 7—SERIAL I/O FREE-RUN

Recall that the Serial I/O establishes word boundaries by detecting a specific sync pattern at the beginning of a slot. After this sync pattern has been detected by the SIO board, the SIO will start assembling 32-bit words and, until the next slot, there is no longer any need to search for the sync pattern. In fact, if the data in the message matches the sync pattern, actual word sync may be lost so it is necessary to disable the SIO's search for sync pattern. Bit 7, when set, commands the SIO to enter this free-run mode.

BIT 8—UNUSED

BIT 9—CYCLE MARK FOUND

This bit, when set, informs the slot processor that the master slot has been found.

BITS 10 AND 11—TEST POINTS

These bits may be programmed to provide test point information useful in diagnostics and, in that regard, have LEDs associated therewith to aid in observation.

BIT 12—UNUSED

BIT 13—ENABLE MEMORY SIDE FIFO

When set, this bit causes a memory write request to be generated for the outward decoupling memory such that the data present on data path 546, i.e., data out of FIFO buffer 514, is written to the decoupling memory.

BIT 14—RESET MEMORY SIDE FIFO INTERFACE

When set, the bit causes address control circuitry 520 to generate an initial read port address, which points to the first valid data word, to be sent out from FIFO 514.

BIT 15—ENABLE BOTH EVENTS AND ARM BOTH EVENTS

When set, this bit will cause flip-flops 522 and 524 to be set.

BIT 16—TEST FOR EVENT 2

When set, the Event logic will test for Event 2.

BIT 17—TEST FOR EVENT 1

When set, the Event logic tests for Event 1.

BIT 18—EVENT 2 REGISTER ADDRESSING

This bit selects between the 0 or 1 page of the Event 2 registers 526, via control path 504.

BITS 19 THROUGH 22—EVENT 1 REGISTER ADDRESSING

These four bits select one of 16 pages of Event 1 registers 528, via control path 504.

BITS 23 AND 24—SLOT LENGTH COUNTER MODE

These two bits define the mode of the slot length counter 530. Control is provided, via data path 512. Specifically, the three modes are: (1) "initialize" in which the slot length counter 530 is set to a value determined by the combination of data provided over data path 512 and data provided from data path 518; (2) "hold" in which counting is suspended; and, (3) "decrement" in which the counter is decremented for each word transfer or instruction.

BIT 25 and 26—FIFO ADDRESS POINTER MODE

These two bits define the mode of operation address counter 516, which determines the address for the write port of buffer 514. The three modes are: (1) "FIFO initialize" in which address counter 516 is preset to an initial value; (2) "FIFO hold" in which counter 516 is maintained at its present count; and, (3) "FIFO increment" in which counter 516 is incremented by one. These bits thus determine whether data present on data bus 518 passes into FIFO buffer 514.

BIT 27—END OF TRANSMISSION TO FIFO

When the stream processor 488 determines that the last word of a slot is present on data bus 518, this bit is set such that an EOT is combined with the last word as it is written into buffer 514.

BITS 28 THROUGH 35—PROGRAM ADDRESS

If the condition code select mode bit 0 equals 1 and the condition code passes, then the program continues at the instruction whose address is found in bits 28 through 35 of this instruction.

BITS 32 THROUGH 35—LOWER SLOT LENGTH COUNTER

When the lower slot length counter mode is set to "initialize", as defined by bits 23 and 24, the value to be loaded into the lower four bits of the slot length counter is defined by these bits.

BITS 33 THROUGH 35—FIFO ADDRESS POINTER

When the FIFO address pointer mode is set to "initialize", as defined by bits 5, 25 and 26, the value that the address is to be initialized to is determined by these bits.

Having described the micro-instruction format for the stream processor 488, next to be discussed is the sequence of Events involved in routing a frame of data through the logical receiver. Recall that data is arriving off the DATApipe at a 500-megahertz rate, i.e., a 32-bit word each 64 nanoseconds. The logical receiver must, in real-time, determine the routing instructions for the frame, based on the contents of the header and make the correct decision regarding writing the associated data to the decoupling memory.

In prior art systems, this requires a series of sequential logical decisions. It is not practical to perform the decision sequentially within a word transfer interval. A novel arrangement of circuitry in the logical receiver allows a very complex decision to be made upon each stream processor instruction cycle, i.e., each word transfer time. It is the ability of the logical receiver to operate in this mode which enables the DATApipe system to achieve the high data rates indicated earlier herein.

In explaining the operation, it will be assumed that the sequence of Events start from the time period in a guardband between slots when there is no carrier present. Stream processor 488 repeatedly tests carrier detect line 492 until the "carrier detect" signal is sensed. Line 494 is next repeatedly tested until the "sync detect" signal is sensed. Next the stream processor tests whether the frame header, i.e., bytes 0 through 13 of Table II, describes a frame addressed to this DATApipe adapter.

Event registers 528 and 526 are vital elements in the screening of the frame header, which will be described later in detail. For the moment, it is sufficient to recognize that line 500 provides an indication of whether this frame should be processed by the logical receiver. When the sync pattern is detected, flip-flop 522 is set in the manner previously described. Next, the first word of the header, bytes 0 through 3, are latched into latch 534. If byte 1 of the header contains a physical "TO" code which corresponds to one of the DATApipe adapter ports and bytes 0, 2 and 3 for this DATApipe also contain codes which are valid for a header addressed to this DATApipe adapter, flip-flop 522 will remain set. The contents of byte 13 will be captured in latch 536, via data path 538. The output of latch 536 provides an address to port select memory 540, via data path 542. Memory 504 converts the physical Flag byte code to a port code on lines 544, which corresponds to the specific DATApipe adapter memory port assigned.

If byte 1 contains a physical "TO" address corresponding to a different DATApipe adapter, flip-flop 522 will be reset and the stream processor will reject the frame. Similarly, header words 2 through 4, corresponding to bytes 4 through 13, are tested by means of the Event 1 register 528. If any field of the header does not conform to a valid specification for a frame addressed to this DATApipe adapter, then at the end-of-header time, line 500 will be 0, causing the stream processor to ignore the header. If at the end-of-header time flip-flop 524 is still set, it indicates that the header has been sent by the bus master indicating that this is the slot from which to derive the cycle mark. Specifically, it means that a unique code has been detected in byte 1, the physical "TO" address identifying the bus master, and bytes 10 and 11, which identify the slot number associated with the cycle mark. When this condition is sensed, stream processor 488 generates a cycle mark in the manner previously described.

Prior to the beginning of the header, address counter 516 was initialized and then held. As the header begins to appear on data path 518, address counter 516 is incremented so that the header is loaded into FIFO 514. Address counter 520 is placed in a hold mode during the pad and CRC word times so that this data is effectively kept out of multiplexor 548. Headers not destined for a particular node are nonetheless loaded into the FIFO buffer for that node, but later will be flushed and discarded. The counter is again allowed to increment to load the subsequent data words into the FIFO. Address counter 520 is initialized to point to the address containing the first word of the header, causing it to be placed on data bus 546 and to be subsequently written to the outward decoupling memory, via multiplexor 548 and data path 116 (FIG. 2). Address counter 520 is allowed to increment, provided it does no overrun address counter 516. If an overrun condition is imminent, address counter 520 is placed in a "hold" mode. Each time the address to counter 520 is incremented, the next word out of FIFO 514 is written to the outward decoupling memory, via the port defined by port select memory 540.

It can thus be seen that the stream processor provides high-speed, real-time orderly routing of data to the decoupling memory on the basis of information contained in the frame header and further, that only data destined for output channels associated with this DATApipe adapter is allowed to reach the decoupling memory.

Thus far the normal data path from the serial I/O to the decoupling memory has been described. However, there are two additional data paths. Data from the logical transmitter 96 on data path 140 (FIG. 2(a) is captured in latch 550 and passes to multiplexor 548, via data path 552. This path provides for movement of data from the inward decoupling memory directly to the outward decoupling memory without going over the DATApipe. Data from the high-speed micro data bus 144 is latched into latch 554. Two transfers over data bus 144 are required to form a 32-bit word in latch 334. Parity generator 556 provides byte parity on data path 558 to assemble a complete 32-bit word plus parity data path 560. This provides means to move data from the high-speed micro to the outward decoupling memory.

EVENT REGISTER—DETAILED DESCRIPTION

Logical Receiver Events can best be described as "real-time data identification". The Events currently examined are all associated with identification of the message, including checks to determine if the message is valid, checks to determine if the message belongs to this DATApipe adapter, and checks to determine if the message is a "Master slot". Two different Events can be tested at the same instant, and these are labeled "Event 1" and "Event 2".

Event 1 can be further divided into 16 different tests, one test at a time. Event 2 can be divided into two different tests, one test at a time. Event 2 will be used to detect the receipt of the Master slot (see bit 9 above). Event 1 will be used to verify that the message is destined for this adapter (correct "TO" address) to detect sync patterns and, in general, to verify the message before sending the data to decoupling memory.

Event processing is enabled by the logical receiver by setting combinations of instruction bits 15-22, as previously described. Event testing is accomplished by the use of a set of registers called Event Registers. As illustrated in FIG. 7, for each Event type (Event 1 and Event 2), there are four 4,096-bit Event registers 528 and 526. Each of the four registers are associated with four bytes of a FIFO register that is to be tested, i.e., byte 0 of the FIFO register to test is associated with Event Register 0, byte 1 of the FIFO register to test is associated with Event Register 1, byte 2 of the FIFO register to test is associated with Event Register 2, byte 3 of the FIFO register to test is associated with Event Register 3. Each byte of the data in the FIFO register provides the lower eight bits of a 12-bit address into each register. The upper four bits of the address, called the "page", are supplied by the logical receiver instruction that is being executed. This 12-bit address, then, will select a bit from an Event Register. The value in byte 0 plus the page number point to a bit in Event Register 0; the value in byte 1 plus the page number point to a bit in Event Register 1; the value in byte 2 plus the page number point to a bit in Event Register 2; the value in byte 3 plus the page number point to a bit in Event Register 3.

A 1 bit in the Event Register address location describes a "pass" or "don't care" condition and will always pass the test. A 0 bit in the Event Register address location means that the data obtained from the byte and the page does not pass the test. Thus, for a test to pass, all four bits obtained from the four registers must be 1's. If any of the bits are 0, the test (or Event) fails.

As an example, in the case of verifying the message "TO" address, which is found in word 0 of the message received, only byte 1 of the word is to be verified. Page 6 of Event 1 may be the page used to determine if the message is for this DATApipe adapter. Upon DATApipe adapter initialization, the high-speed microprocessor loaded page 6 (all four registers with locations 6XX (hex)) with the following data (assuming this DATApipe adapter number is 3C):

In Event Register 0, locations 600 through 6FF are loaded with 1 (don't care).

In Event Register 1, locations 600 through 63B are loaded with 0 (fail), location 63C is loaded with a 1 (pass), and locations 63D through 6FF are loaded with 0 (fail).

In Event Register 2, locations 600 through 6FF are loaded with 1 (don't care).

In Event Register 3, locations 600 through 6FF are loaded with 1 (don't care).

If a message arrived with word 0 of the message equalling "023C EDCF", then this word would pass Event 1. If in Event Register 1, location 617 were changed to a 1, then this DATApipe adapter would also accept messages for DATApipe adapter number 17 also. It must be noted that most of the five words of each message received must pass an Event test, using a different page of the Event Registers for each word tested. If the entire message passes all Events tested, then the message is probably sent to decoupling memory (depending upon the logical receiver instructions).

The Event 2 registers 526 are dedicated to the test for cycle mark generation. This allows each header to be concurrently examined for both a valid data header and cycle mark codes. Event 2 Register 526 contains the information regarding the succession of bus masters. Each page contains codes which define a unique "FROM" field and slot number. The high-speed micro provides the value code for Event 2 Register 526 which corresponds to the next bus master in succession. It does this by manipulating bits 13 through 15 on the data bus 144. Reconfiguration can thus be accomplished by the stream processor 488 by setting instruction bit 18, which changes the Event 2 Register page code so that cycle marks will immediately be generated relative to the new bus master.

OUTWARD MULTIPLEXOR

Figure 8:
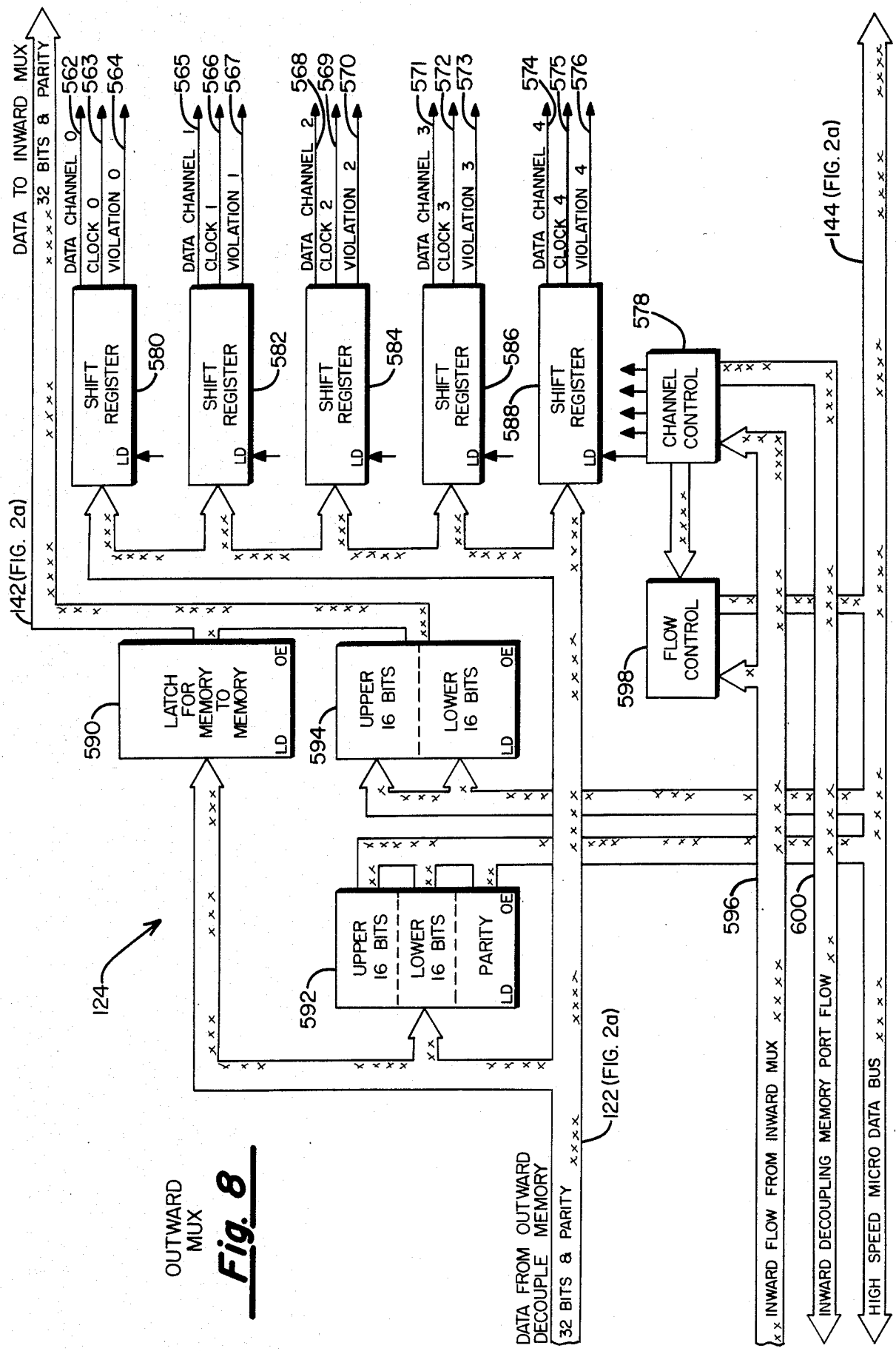
FIG. 8 is a detailed block diagram of the Outward Mulitplexer portion of the DATApipe adapter of FIG. 2.

FIG. 8 shows a detailed block diagram of outward multiplexer 124 of FIG. 2(a). In normal operation, data flows on data bus 122 from the outward decoupling memory 118. Data flows out of the multiplexer on serial data channels 0 through 4 (lines 562 through 576). Each channel is comprised of a data line, clock line and violation line. Channel 4 signals are fed back to the control microprocessor 138 while channel 0 through 3 are outputs to I/O processors connected to the DATApipe adapter. Data from the decoupling memory is interleaved per the port assignments of Table I. Circuitry 578 provides timing signals such that each of the shift registers 580 through 588 are loaded on a periodic rotational basis to provide continuous serial data.

During the memory-to-memory decoupling memory cycle, decoupling memory cycles 03 and $OD_{16}$, the data from the outward decoupling memory 118 is captured in latch 590. This data is subsequently placed on bus 142 and routed to the inward multiplexer and, eventually, is written into the inward decoupling memory.

During the memory-to-micro cycle (cycles 07 and $11_{16}$), the data from the outward decoupling memory is latched in register 592. The 36-bit word is conveyed to the high-speed microprocessor via the 16-bit data bus 144 in three segments, the upper 16 bits, the lower 16 bits and the four parity bits. The high-speed microprocessor can also load data, via the data bus 144, into register 594 in two segments, the upper and lower 16 bits. This data is subsequently placed on data bus 142 and also routed to the inward multiplexer (FIG. 2(a).

As was previously described, the DATApipe adapter and the I/O processor interchange Flow information to prevent overrun of their respective memory buffers. The status of the Flow bit for each channel is sensed in the inward multiplexer and is communicated, via inward flow from inward mux bus 596. When Flow is turned off for a specific channel, the parallel mode of its associated outward mux shift register is suspended and the memory request for that channel to the outward decoupling memory is inhibited, thus suspending all data transfer. When Flow again is turned on, the memory transfer resumes. Flow control circuit 598 and channel control circuit 578 assure that Flow is stopped on a block boundary without any lost or added bits.

SLOT PROCESSOR

FIG. 9 shows a detailed diagram of the slot processor 114 of FIG. 2(a). The slot processor has a dual function. The first is to establish system timing which will synchronize the transmission of data from this DATApipe adapter with the overall pipe cycle timing of the DATApipe system. The second is to provide signals to the logical transmitter identifying the beginning of each slot for transmission and word marks to identify the boundary of each new word.

The operation of the slot processor is coordinated by the high-speed microprocessor communicating over data bus 144. All data paths marked "to micro" with an asterisk (*) are data inputs to multiplexer and provide feedback to the high-speed microprocessor. Registers 602, 604, 606 and 608 are loaded by the high-speed microprocessor to provide operating parameters for the slot processor. The pipe cycle count register 602 is loaded with a count which corresponds to the total length of the pipe cycle, each count being equivalent to two data bits, i.e., assuming the data rate is 500 megabits and a total pipe length of 100,000 data bits, a pipe cycle counter value would be 50,000. The main pipe cycle length counter 610 is loaded with the contents of register 602 whenever its load input is active, via data path 612. This counter is continuously decremented by the four nanosecond system clock on line 614. The output of counter 610 is presented to the terminal count detect circuit 616, via data path 618. When a terminal count value of one is detected, circuit 616 generates the load signal on line 628 for counter 610. Alternatively, cycle mark signal 620, originating from logical receiver 112, can also generate the load signal.

The occurrence of a cycle mark prior to the terminal count is indicative that the system clock is running slow. Conversely, the occurrence of a cycle mark occurring after the terminal count detect is indicative of the system clock running fast. The terminal count detect circuit thus functions in a manner similar to the phase detector of a phase locked loop to determine the relative speed of the local system clock with that of the DATApipe adapter master or reference clock. When the system is within specified limits of synchronization, the cycle mark will occur within programmably established counts either side of the terminal count. The terminal count detect circuit also generates a load signal on line 622 to load the cycle length remainder counter 624 with the contents of register 602, via data path 612. This is an up/down counter with the direction of count controlled by circuit 626. It is also continuously clocked by the eight nanoseconds system clock 614. Upon being loaded, it initially decrements. Counting is controlled such that at the end of a cycle, the value of the counter is representative of the absolute value of the count error, i.e., the remainder count.

The outputs of counter 624 are presented to terminal count detect circuit 628, via data path 630. When the count direction is down, the terminal count value will be zero. When the counter goes through zero, the direction of counting is reversed and the terminal count value becomes $FFFFFFFF_H$. When a cycle mark occurs, the clock enable signal of counter 624 is disabled, via line 632, thus freezing the remainder count in this counter. This value is then latched into the cycle length remainder register 634.

Range limit register 604 establishes the upper value on this remainder count which can be tolerated by the system. If the value of the remainder count in register 634 exceeds the value in register 604, comparator 636 generates a signal on line 638 which generates an interrupt to the high-speed microprocessor, indicative that the remainder count is greater than the range limit. When interrupted, the microprocessor determines the value of the remainder register 634 via data path 640 and multiplexer 642. It thus determines whether the system clock is either fast or slow via the remainder value.

With this information, the high-speed microprocessor computes a new value for the voltage control oscillator digital offset which is loaded into VCXO offset register 644. This output appears on data path 646 to control a digital-to-analog converter which provides the analog control voltage to the voltage controlled oscillator. In this manner, the system clock signal 614 is maintained within specification limits to be in synchronization with the DATApipe master clock.

In the absence of a cycle mark, the system will essentially freewheel or coast without any change in the VCXO. A count representative of the maximum number of consecutive cycle marks which can be tolerably missed is loaded in the free-run limit register 648 by the high-speed micro via data bus 144. Each cycle mark loads the count in register 648 into decrement counter 650. Each missd cycle mark decrements counter 650 so that if the free-run limit is exceeded, high-speed micro is interrupted via line 652. The ability to both tolerate and sense missed cycle marks is an essential feature to be able to dynamically reassign the bus reference.

Having now established synchronization in frequency, the remainder of this slot processor circuitry is to establish phase synchronism.

Upon system initialization, slot memory 654 is loaded from the high-speed microprocessor with the length of each of the plurality of slots in the DATApipe system and the address of each word corresponding to a specific slot number. The slot number address is provided via data bus 144, multiplexer 656, data path 658, slot-number counter 660 and data path 662 while the data input is provided directly from HSM data bus 144. Recall that the total offset from the start of a pipe cycle to the beginning of the first slot is the sum of the number of preceding slots, plus the fractional length represented by the slot offset. The slot offset number is loaded into register 608 while the fractional slot offset length is loaded into register 606 from the high-speed microprocessor. Initially, slot number counter 660 is set to the offset value terms of slots. The length of slot N appears at the output of data output of the slot memory 654 on data path 664. It is loaded into slot length counter 666 via multiplexer 668 and data path 670. Counter 666 is continuously decremented by the system clock. When the count reaches zero, line 672 goes active to increment the slot number counter 660. The length of the next slot, N+ 1, is then loaded into slot length counter 666. This process continues until the occurrence of a cycle mark.

At this time, slot length counter 666 and slot number counter 660 are resynchronized to the pipe cycle by virtue of being loaded from their offset registers 606 and 608. When the value in slot length counter 666 is decremented to zero, slot number counter 660 again increments, identifying the slot currently seen on the pipe by this DATApipe adapter's transmitter. As each slot is timed by the slot length counter 666 and the next slot number is loaded into slot number counter 660, a slot mark pulse is sent to the logical transmitter indicating the end of the current slot and the start of the next slot.

The value of the slot number is latched into the next slot number register, i.e., register 680, via data path 662, and is transmitted to the logical transmitter module, via data path 682.

Note that the value of slot length stored in slot memory 654 can be different for each slot and is also independent of the actual length of data transmitted during that slot time. This provides a novel feature for the system in that the slot length can be computed to be a variable length corresponding to the length of the data packet to be transmitted during that slot time plus another variable which is the guard band between the end of the data packet and the beginning of the next. Since the positional uncertainty of the data is a function of the position from which it originates in the DATApipe pipe cycle, this feature allows both the length of each slot and the guard band between each slot to be optimally set to most efficiently utilize the bandwidth of the DATApipe pipe cycle.

HIGH-SPEED MICROPROCESSOR

Figure 10B:
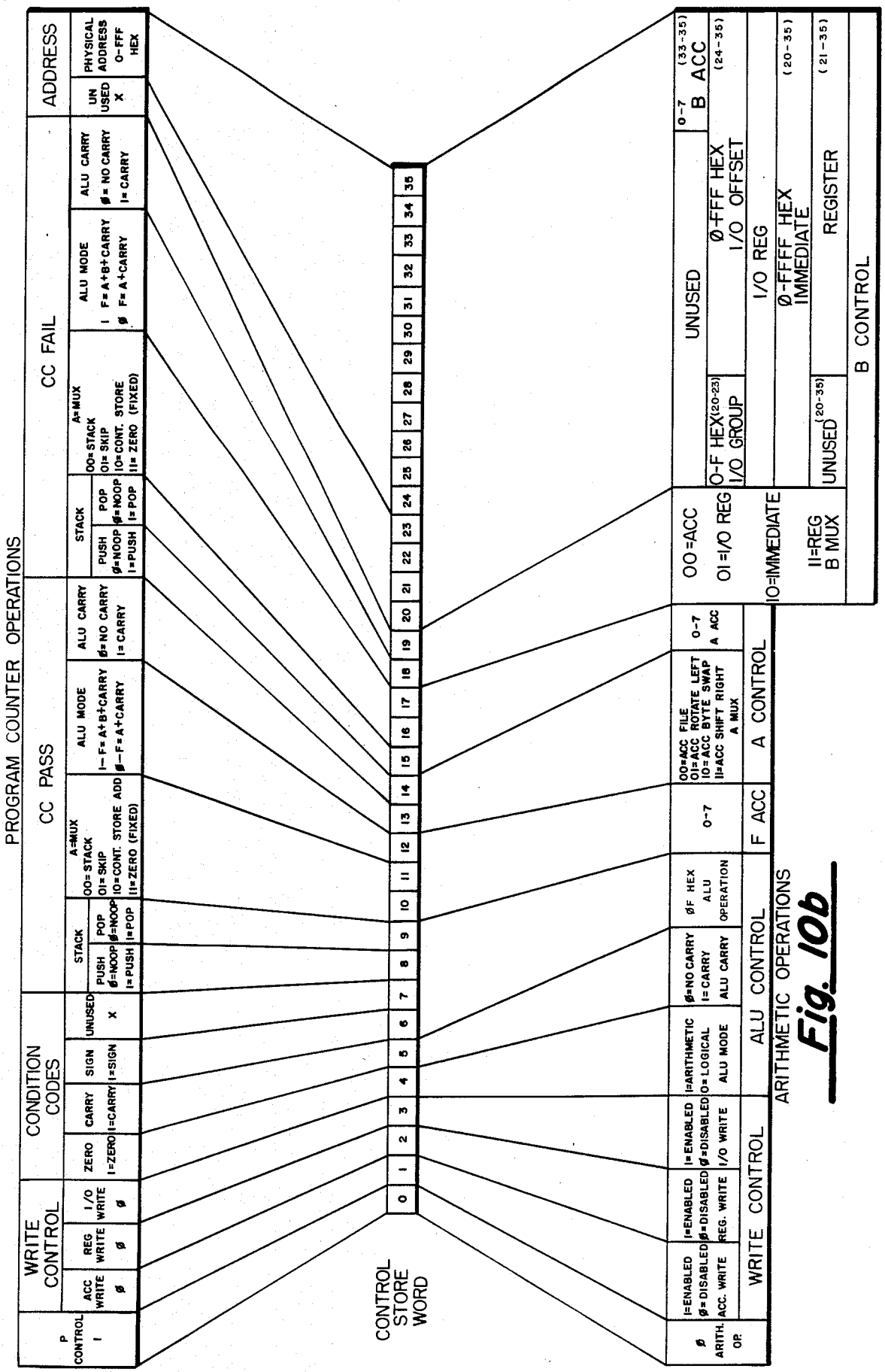
FIG. 10(b) shows the decode of the control store word of the high-speed microprocessor.
Figure 10C:
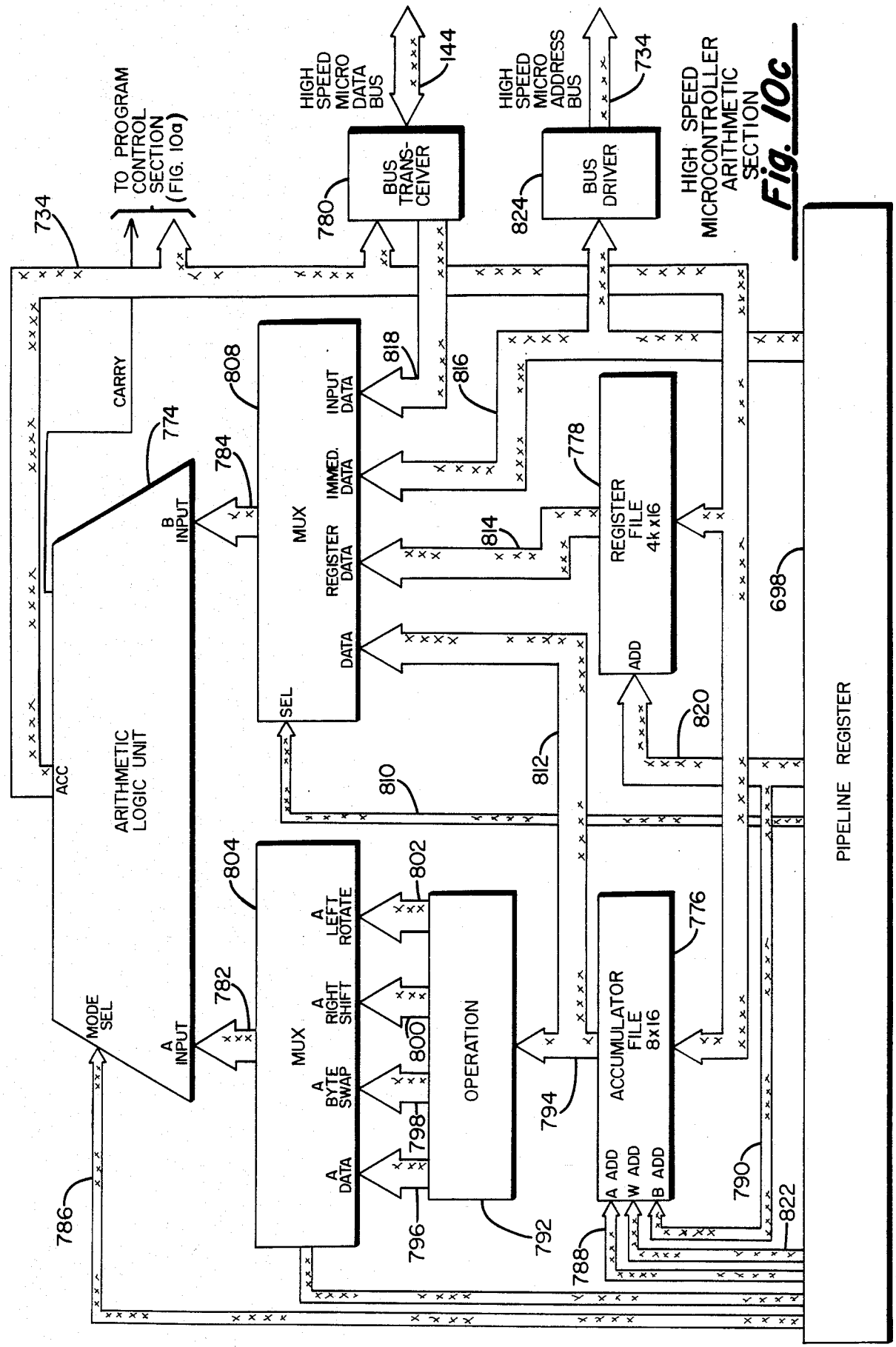
FIG. 10(c) is a detailed block diagram of the arithmetic section of the high-speed microprocessor of FIG. 2.

FIGS. 10(a), 10(b) and 10(c) show detailed block diagrams of the program control logic, program control store and arithmetic logic, respectively, of the high-speed microprocessor 120 of FIG. 2. This is a special-purpose, high-speed microprogrammable controller which has been uniquely designed to handle the demanding tasks associated with DATApipe adapter high-speed data movement. The program is contained in control store 696, which is a 4096 word by 36-bit memory. Each 32-nanoseconds, a new instruction is read from control store 696 and latched into pipeline register 698, via data path 700. The state is bit 0 determines whether the instruction will be interpreted as a program control instruction of an arithmetic instruction. FIG. 10(b) shows the instruction word format for the microprocessor instructions. The following is an explanation of the various alpha/numeric designations in FIG. 10(b) and their interpretation.

I/O Input/Output—One of a set of up to 64K 16-bit registers available for input/output. The register address is broken up into 16 groups of 4K registers each.

CC Condition Codes—A group of bits which are set as the result of a previous operation which may be utilized by the current program counter (P) instruction to control execution flow. The condition codes in this microprocessor are for arithmetic operations: zero, sign and carry.

| FIELD | BITS | FUNCTION |
| --- | --- | --- |
| P CONTROL | 0 | Defines the type of instruction as either a P control instruction or an arithmetic instruction. The arithmetic instructions, by definition, imply P = P + 1. VALUES 1 = P operation 0 = Arithmetic operation (P = P + 1) |
| WRITE ENABLE | 1-3 | Defines which devices the output of an arithmetic ALU operation will be written to. Writes must not be enabled for P control instructions. SUBFIELDS: |
| ACC WRITE | 1 | Defines that an accumulator will be written to. Note: which accumulator is specified in F ACC field. VALUES 1 = Write enabled 0 = Write disabled |
| REG WRITE | 2 | Defines that a register will be written to. Note: which register is specified in the B REG field. |

| | | -continued |
|---|---|---|
| | | VALUES |
| | | 1 = Write enabled |
| | | 0 = Write disabled |
| I/O WRITE | 3 | Defines that an I/O register will be written to. Note: which I/O register is specified in the I/O REG field. |
| | | VALUES |
| | | 1 = Write enabled |
| | | 0 = Write disabled |
| | | P CONTROL FORMAT |
| CONDITION CODES | 4–7 | Defines condition code which is to be tested by the instruction. Note: the CC PASS field is used when the CONDITION CODE selected is also set (VALUE 1) in the hardware, the CC FAIL field is used otherwise. |
| | | SUBFIELD: |
| ZERO CODE | 4 | Defines the condition that the previous ALU operation resulted in a zero output. |
| | | VALUES |
| | | 1 = Previous ALU operation was 0 |
| | | 0 = Previous ALU operation wasn't 0. |
| CARRY CODE | 5 | Defines the condition that the previous ALU operation resulted in a carry or a borrow. |
| | | VALUES |
| | | 1 = Previous ALU operation resulted in a carry or borrow |
| | | 0 = Previous ALU operation resulted in no carry or borrow. |
| SIGN CODE | 6 | Defines the condition that the previous ALU operation resulted in the most significant data bit being set (VALUE 1). |
| | | VALUES |
| | | 1 = Previous ALU operation resulted in most significant bit set |
| | | 0 = Previous ALU operation resulted in most significant bit clear. |
| SPARE | 7 | Unused condition code |
| CC PASS | 8–13 | Defines what to do when the condition code tested for in the CONDITION CODE field is set. This field controls stack operations, addressing mode, and source for the location of the next instruction to execute. |
| | | SUBFIELDS: |
| STACK | 8–9 | Defines the operation of the stack. The stack may be push'd, pop'd, or no operation'd. |
| | | SUBFIELDS: |
| PUSH | 8 | Defines whether or not to push the current P counter onto the stack. |
| | | VALUES |
| | | 0 = No operation |
| | | 1 = Push current P counter on stack |
| POP | 9 | Defines whether or not to pop the stack. Note: This field does not specify what to do with a value from the stack. |
| | | VALUES |
| | | 0 = No operation |
| | | 1 = Pop current stack pointer. |
| A MUX | 10–11 | Defines the source input which will be allowed through a MUX for input to the A channel of the ALU. |
| | | 00 = Stack |
| | | 01 = Skip register |
| | | 10 = Control store field ADDRESS |
| | | 11 = Zero (fixed value) |
| ALU MODE | 12 | Defines the mode in which the ALU operates. Note: Only two of a possible 32 ALU functions are utilized. |
| | | VALUES |
| | | 0 = output equals the A channel input plus the ALU CARRY. |
| | | 1 = output equals the A channel input plus the B channel input (always P) plus the ALU CARRY. |
| ALU CARRY | 13 | Defines the carry bit into the ALU. This bit is the least significant bit and is utilized in ALU functions. |
| | | VALUES |
| | | 1 = carry is set into ALU |
| | | 0 = carry is clear into ALU |
| CC FAIL | 14–19 | Defines what to do when the condition code |

-continued

| | | |
|---|---|---|
| | | tested for in the CONDITION CODE field is clear. This field controls stack operations, addressing mode, and source for the location of the next instruction to execute.<br>SUBFIELDS:<br>SAME AS CC PASS SUBFIELDS WITH BIT FIELDS + 5. |
| ADDR | 20–35 | Defines the absolute address to load into the P register. This value is the address of the next instruction to be executed if this field is selected by the A MUX subfield of the CC PASS or CC FAIL fields.<br>SUBFIELDS: |
| UNUSED | 20–23 | Reserved for future extension of address range. |
| ADDRESS | 24–35 | Defines the 12-bit physical address.<br>VALUES<br>0 = FFF Hex<br>ARITHMETIC FORMAT |
| ALU CONTROL | 4–9 | Defines the operation of the ALU. Up to 23 operations may be performed (some useless).<br>SUBFIELDS: |
| ALU MODE | 4 | Defines the mode of the ALU: logical or arithmetic.<br>VALUES<br>0 = logical mode<br>1 = arithmetic mode |
| ALU CARRY | 5 | Defines whether a carry in should be provided to the ALU as the least significant bit to an arithmetic operation.<br>VALUES<br>1 = carry supplied<br>0 = carry not supplied. |
| ALU OPERATION | 6–9 | Defines the ALU operation based upon the value of this field and the mode select of logical or arithmetic.<br>VALUES |

| OP | MODE | FUNCTION |
|---|---|---|
| F | 0 | F = -NOT- A |
| E | 0 | F = -NOT- (A -OR- B) |
| D | 0 | F = -NOT- A -AND- B |
| C | 0 | F = 0 |
| B | 0 | F = -NOT- (A -AND- B) |
| A | 0 | F = -NOT- B |
| 9 | 0 | F = A -XOR- B |
| 8 | 0 | F = A -AND- -NOT- B |
| 7 | 0 | F = -NOT- A -OR- B |
| 6 | 0 | F = -NOT- (A -XOR- B) |
| 5 | 0 | F = B |
| 4 | 0 | F = B 40F = A -AND- B |
| 3 | 0 | F = 1 |
| 2 | 0 | F = A -OR- -NOT- B |
| 1 | 0 | F = A -OR- B |
| 0 | 0 | F = A |
| 0 | 1 | F = A + C |
| 1 | 1 | F = (A -OR- B) + C |
| 2 | 1 | F = (A -OR- -NOT- B) + C |
| 3 | 1 | F = -1 + C |
| 4 | 1 | F = A + (A -AND- -NOT- B) + C |
| 5 | 1 | F = A -OR- B + A -AND- -NOT- B + C |
| 6 | 1 | F = A - B - 1 + C |
| 7 | 1 | F = A -AND- -NOT- B - 1 + C |
| 8 | 1 | F = A + A -AND- B + C |
| 9 | 1 | F = A + B + C |
| A | 1 | F = A -OR- -NOT- B + A -AND- B + C |
| B | 1 | F = A -AND- B - 1 + C |
| C | 1 | F = A + A + C |
| D | 1 | F = A -OR- B + A + C |
| E | 1 | F = A -OR- -NOT- B + A + C |
| F | 1 | F = A - 1 + C |

| | | |
|---|---|---|
| F ACC | 10–12 | Defines the address of the accumulator to be written to. Note: Active if ACC WRITE subfield set.<br>VALUES<br>0–7 |
| A CONTROL | 13–17 | Defines the A channel input to the ALU.<br>SUBFIELDS: |
| A MUX CONTROL | 13–14 | Defines which of N inputs will be allowed through to the output of the MUX. The output is provided as the A channel input to the ALU. |

| | | -continued |
|---|---|---|
| | | VALUES |
| | | 00 = accumulator file |
| | | 01 = accumulator file rotate left |
| | | 10 = accumulator file byte swapped |
| | | 11 = accumulator file shift right - shift is arithmetic |
| A ACC | 15-17 | Defines which accumulator to use on the A channel of the ALU. |
| | | VALUES |
| | | 0-7 |
| B CONTROL | 18-35 | Defines the B channel input to the ALU. |
| | | SUBFIELDS: |
| B MUX CONTROL | 18-19 | Defines which of N inputs will be allowed through to the output of the MUX. The output is provided as the B channel input to the ALU. |
| | | VALUES |
| | | 00 = accumulator file |
| | | 01 = I/O register |
| | | 10 = immediate value |
| | | 11 = register file |
| | | - OVERLAYED SUBFIELDS SELECT BY B MUX CONTROL VALUE - |
| IMMEDIATE | 20-35 | Defines an immediate value which may be utilized in arithmetic operations. |
| | | VALUES |
| | | 0 - FFFF Hex |
| B ACC | 33-35 | Defines which accumulator will be input to the ALU. |
| | | VALUES |
| | | 0-7 |
| B REG | 24-35 | Defines which register will be input to the ALU. Note that this value is ignored in instructions following the loading of the address address (see I/O section). |
| | | VALUES |
| | | 0 - FFF Hex |
| B I/O | 20-35 | Defines which I/O register will be input to the ALU or receive the result of the ALU. |
| | | VALUES |
| | | 0 - FFFF Hex |
| | | -Note: I/O address split into 4-bit groups plus 12-bit offset. |

The address of the next instruction is developed in the accumulator of arithmetic logic unit 702 and provided to the control store 696 and program address register 704 via data path 706. Typically, instructions are executed in sequential order, i.e., the address of the next instruction is the address of the previous instruction contained in program register 704 plus 1. This is accomplished when the P+1 select line 708 is active, causing mode control 710 to generate a carry-in signal on line 712 and multiplexor 714 to select the "ZERO" input 716 to present a zero value to the "A" input of ALU 702, via data path 718. Mode select line 720 is set to cause an add with carry. The summation of the contents of the "B" input, i.e., program register 704, plus the carry plus zero results in the P+1 output at the accululator.

The remainder of the program circuitry supports the various forms of program branching. In a program branch, there are four values possible for the branch address. All four of these possibilities are provided as inputs to "pass" multiplexor 722 and fail multiplexor 724. The address may be the output of stack memory 716, via data path 728. This is useful for providing a return from subroutine branch. The address source may also be skip register 730, via data path 732. Skip register 730 is loaded with the results of an arithmetic operation, via data path 734 and, thus, provides for a computed indexed branch. The address source may also be the address field of the micro-instruction via data path 736. This is useful in providing an immediate branch capability. Finally, the address may be forced to a value of zero, via data path 738 by forming P+1 with the carry negative (no branch).

The address selected by "pass" multiplexor 722 is determined by the Pass A mux select field 749. Similarly, the Fail A mux select line 742 determines which branch option is selected by "fail" multiplexor 724. Thus, outputs 744 and 746 represent two branch alternatives, one to be used in the event of a "pass" and the other to be used in the event of a "fail". In the event of an unconditional branch, these two values will be the same.

Conditional branching is controlled by condition test logic 748. The accumulator and carry output of the arithmetic section ALU resulting from the previous arithmetic operation are tested for various conditions. If that condition is found present, line 750 is activated to select the multiplexor 752 such that output 754 is the results of the pass multiplexor 722. Alternatively, if the test fails, the output 754 will be the results of the fail multiplexor 724. Specifically, if the zero-test line 756 is activated and the value of accumulator output 734 is zero, the test passes. If line 758 indicates a carry and carry test line 760 is activated, the test also passes. If the most significant bit of accumulator output 734 is one and the sign-test line 762 is activated, the test also passes. For any branch condition, line 708 is deactivated and the ALU mode is selected via line 720 such that the accumulator output equals the A input. Thus, the output of multiplexor 742 becomes becomes the next address on data path 706. Subroutine branch capability is provided by stack memory 726 and stack address pointer 764. Stack address pointer may be set to an initial value by the results of an arithmetic operation, via data path 734. The output of the stack address pointer provides an address to stack memory 726, via data path 766, which defines the top of the stack. A subroutine branch causes the contents of program register 704 to be written into stack memory 726, via data path 768. Mode control 710 generates a Push command on line 770, which increments the stack address pointer to establish a new address for the top of the stack. In the event of nested subroutine branches, the return addresses are thus "stacked" in stack memory 726. A return from subroutine branch causes a Pop command to be issued on line 772, via mode control 710, causing the return address to be placed on stack memory output 728. This address is routed through multiplexors 722 or 724 and multiplexors 752 and 714 through the ALU to become the next program address.

Conventional microprocessors provide only a single-branch option. That is, the branch is taken if the conditional test passes. If the conditional test fails, the program address is P+1, i.e., no branch taken. A novel feature of the microprocessor used in the present invention is the ability to provide a two-way branch, one branch value if the condition passes and another if the condition fails. Thus, a two-way branch can be accomplished in a single-instruction cycle which would have otherwise required two separate one-way branch instructions.

Next to be considered is the arithmetic section of the microprocessor shown in FIG. 10c. Pipeline register 698 is the same pipeline register shown in FIG. 10a. Arithmetic operations are accomplished by the 16-bit arithmetic logic unit 774.

The results of an arithmetic operation are present on 16-bit data bus 734. This value may be written into the 8-word accumulator file 776, the 4096 word register file 778, sent to program control section as described earlier, or transmitted on the high-speed micro data bus 144, via bus transceiver 780. The output of ALU 774 is an arithmetic combination of the A input 782 and B input 784 with the arithmetic mode determined by mode select 786. The source of the A operand is the accumulator file 776. The specific accumulator selected is determined by either the A address field 788 or the B address field 790.

Operation logic 792 generates four types of logical translations of the input 794. Output 796 is the unmodified data. Output 798 interchanges the upper or lower bytes. Output 800 is the input value shifted one bit to the right and output 802 is the input value rotated one bit to the left. Multiplexor 804 selects one of these four inputs based on the mux select code 806 and provides that as an A input to the ALU, via data path 782. Multiplexor 808 provides one of four inputs to the B input of the ALU 774 via data path 784 based on the value of mux select 810. The data inputs for ALU 774 may thus be the output of accumulator file 776, via data path 812, the output of register file 778, via data path 814, the data field of pipeline register 698, via data path 816, or the high-speed micro data bus 144, via bus transceiver 780 and data path 818. If register 778 is selected, the address field of pipeline register 698 provides the register file address, via data path 820. Alternatively, a portion of this field may define the A operand from accumulator file 776, via B address 790. The results of the arithmetic operation may be written into register file 778, via data path 734, with the address specified by the address on data path 820. Similarly, the results of the arithmetic operation may be written into one of the eight accumulators of accumulator file 776, based on the write address field 822. For data transfers involving high-speed micro data bus 144, the bus address is determined by the immediate data field of pipeline register 814, via data path 816 and bus driver 824. The decoding of high-speed micro address bus 734 is per Table V.

TABLE V

| | |
|---|---|
| FXXX | Software or Bus Reset |
| EXXX | HSM - Skip Register |
| DXXX | Logical Receiver |
| CXXX | Logical Transmitter |
| BXXX | Outward Decoupling Memory |
| AXXX | Inward Decoupling Memory |
| 9XXX | Outward Mux |
| 8XXX | Inward Mux |
| 7XXX | Slot Processor |

X = Don't Care

OPERATION—HIGH-SPEED MICROPROCESSOR

The basic job of the DATApipe High-speed Microprocessor 120 (hereinafter called HSM) is to keep data flowing from the I/O Processors (IOPs) to other DATApipe Adapters (DPAs) on the network and to other IOPs attached to the same adapter (See FIG. 1). Data moves in two directions at the same time, from the IOPs to the DPAs (called the INWARD direction), and from the DPAs to the IOPs (called the OUTWARD direction). This is done by assigning Stack Entries (hereinafter called SEs) which describe a buffer area in decoupling memory, to linked lists (or threads) which are processed by the hardware to actually move the data from the IOPs or DATApipe bus into the Decoupling Memory (DM) or move the data from the DM to the IOPs or DATApipe bus. Most of what the HSM does is to keep track of these linked lists (hereafter called threads), by moving "full" SEs to their destination thread and by moving "empty" buffers back to a thread to gather more data.

The following steps describe the logic flow of control program within the HSM.

(1) Initialize all the HSM registers to zero, read all revision levels of hardware boards, and call subroutine PRS to initialize SEs, threads, and hardware pointers.

(2) Enter the main processing loop described by steps 3–19 below.

(3) Call routine RFO to remove "full" SEs from the OUTWARD DM threads.

(4) Call routine ECO to verify the OUTWARD DM thread structure.

(5) Call routine REO to remove "empty" SEs from the OUTWARD DM threads.

(6) Call routine ECO to verify the OUTWARD DM thread structure.

(7) Call routine FDO to fill the OUTWARD DM DATApipe receive thread with enough SEs to ensure a continuous flow.

(8) Call routine ECO to verify the OUTWARD DM thread structure.

(9) Call routine RDY to start any Ready-to-Go threads if the active thread is empty. (See Note 1 below).
(10) Call routine RFI to remove "full" SEs from the INWARD DM threads.
(11) Call routine ECI to verify the INWARD DM thread structure.
(12) Call routine REI to remove "empty" SEs from the INWARD DM threads.
(13) Call routine ECI to verify the INWARD DM structure.
(14) Call routine RDY to start any Ready-to-Go threads if the active thread is empty.
(15) Call routine MDS to check if it is time for a Memory-to-Memory direction change. (See Note 2 below.)
(16) Call routine STATPASS to increment the number of times the main processing loop has been processed.
(17) Call routine PCI to process any messages from the Control Processor.
(18) Call routine TSC to ensure the Datapipe slot cycle is still in synchronization with the "Slot Master". (See Note 3 below.)
(19) Go to Step 3 and continue the main processing loop.

Each stack entry has a thread pointer to the next Stack Entry to be executed when all the data within the buffer pointed to by this SE has been sent (or received). In order to keep a thread continuous, new SEs are added to a thread by updating this thread pointer in the last SE on the thread. However, due to hardware design, in order to update the thread pointer, it is necessary to update the buffer address and word count at the same time. The hardware changes both the address and word count each 32-bit word that is processed; thus if the stack pointer were changed on the SE that was being processed, the data sent to the IOP (or DATApipe bus) would be incorrect due to a modified length and address.

To prevent this type of data corruption, the HSM keeps track of the Stack Entry numbers of the last next-to-last SEs on every thread. If the hardware is processing the data for either of these two SEs, the HSM builds a temporary thread called the Ready-to-Go thread, which will be ready to process when the current active thread completes; this Ready-to-Go thread then becomes the active thread.

Data moving from one IOP to another IOP on the same DATApipe Adapter moves on a Memory-to-Memory thread from the INWARD DM to the OUTWARD DM. Additionally, data that is received from the DATApipe that is to be "looped-back" to the sending DPA moves on a Memory-to-Memory thread from the OUTWARD DM to the INWARD DM. Only one direction at a time is possible since both directions use the same hardware thread. Only a single bit shows memory direction.

Several times a second, the HSM must change the direction of the Memory-to-Memory transfer in order to move the data that has arrived. This is done by allowing the SEs currently on the Memory-to-Memory thread to be completed, switching the data direction, and adding the waiting Memory-to-Memory SEs to the Memory-to-Memory thread.

The following sections describe the logic flow of each of the subroutines called by the HSM main processing loop. The chart below shows the relationship between all subroutines within HSM.

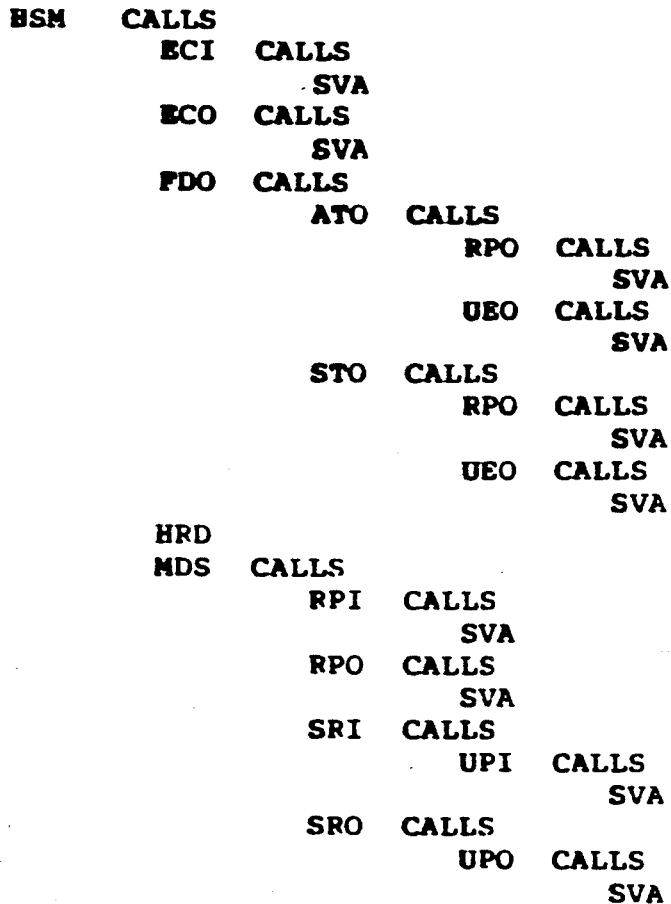

```
                UPI   CALLS
                        SVA
                UPO   CALLS
                        SVA
PCI   CALLS
        ATI   CALLS
                RPI   CALLS
                        SVA
                UEI   CALLS
                        SVA
        IRI   CALLS
                ATI   CALLS
                        RPI   CALLS
                                SVA
                        UEI   CALLS
                                SVA
                SRI   CALLS
                        UPI   CALLS
                                SVA
        RMI   CALLS
                RPI   CALLS
                        SVA
                SVA
        SRP   CALLS
                ATO   CALLS
                        RPO   CALLS
                                SVA
                        UEO   CALLS
                                SVA
                IWO   CALLS
                        ATO   CALLS
                                RPO   CALLS
                                        SVA
                                UEO   CALLS
                                        SVA
                        SRO   CALLS
                                UPO   CALLS
                                        SVA
                REO   CALLS
                        ATO   CALLS
                                RPO   CALLS
                                        SVA
                                UEO   CALLS
                                        SVA
                        GPO   CALLS
                                RPO   CALLS
                                        SVA
                                SVA
                RPO   CALLS
                        SVA
                SRO   CALLS
                        UPO   CALLS
                                SVA
                STO   CALLS
                        RPO   CALLS
                                SVA
```

```
                                        UEO  CALLS
                                                SVA

SVA
                            WHO  CALLS
                                    RPO  CALLS
                                            SVA
                                    SVA
PRS  CALLS
        ATI  CALLS
                RPI  CALLS
                        SVA
                UEI  CALLS
                                            SVA
                ATO  CALLS
                        RPO  CALLS
                                SVA
                        UEO  CALLS
                                SVA
                BAI  CALLS
                        SVA
                BAO  CALLS
                        SVA
                SRI  CALLS
                        UPI  CALLS
                                SVA
                SRO  CALLS
                        UPO  CALLS
                                SVA
                UEI  CALLS
                        SVA
                UEO  CALLS
                        SVA
                UPI  CALLS
                        SVA
                UPO  CALLS
                        SVA
        RDY  CALLS
                FLO
                SRI  CALLS
                        UPI  CALLS
                                SVA
                SRO  CALLS
                        UPO  CALLS
                                SVA
        REI  CALLS
                ATI  CALLS
                        RPI  CALLS
                                SVA
                        UEI  CALLS
                                SVA
                GPI  CALLS
                        ATI  CALLS
                                RPI  CALLS
                                        SVA
                                UEI  CALLS
                                        SVA
```

```
                        RPI  CALLS
                                SVA
                        STATIDIS
                        STATIRPE
                        SVA
REO  CALLS
        ATO  CALLS
                        RPO  CALLS
                                SVA
                        UEO  CALLS
                                SVA
        GPO  CALLS
                        RPO  CALLS
                                SVA
                        SVA
RFI  CALLS
        ATI  CALLS
                        RPI  CALLS
                                SVA
                        UEI  CALLS
                                SVA
        DPI  CALLS
                ATI  CALLS
                        RPI  CALLS
                                SVA
                        UEI  CALLS
                                SVA
                RMI  CALLS
                        RPI  CALLS
                                SVA
                        SVA
                STATIILC
                STATIFRM
                STATITOL
                STATITOR
        GPI  CALLS
                ATI  CALLS
                        RPI  CALLS
                                SVA
                        UEI  CALLS
                                SVA
                RPI  CALLS
                        SVA
                STATIDIS
                STATIRPE
                SVA
        IRI  CALLS
                ATI  CALLS
                        RPI  CALLS
                                SVA
                        UEI  CALLS
                                SVA
                SRI  CALLS
                        UPI  CALLS
                                SVA
```

```
                SLA  CALLS
                    ATI  CALLS
                            RPI  CALLS
                                    SVA
                            UEI  CALLS
                                    SVA
RPO  CALLS
    ATO  CALLS
            RPO  CALLS
                    SVA
            UEO  CALLS
                    SVA
    DPO  CALLS
            ATO  CALLS
                    RPO  CALLS
                            SVA
                    UEO  CALLS
                            SVA
            RMO  CALLS
                    RPO  CALLS
                            SVA
            SVA
        STATOOFF
        STATOTOL
    GPO  CALLS
            RPO  CALLS
                    SVA
    IRO  CALLS
            ATO  CALLS
                    RPO  CALLS
                            SVA
                    UEO  CALLS
                            SVA
            SRO  CALLS
                    UPO  CALLS
                            SVA
    IWO  CALLS
            ATO  CALLS
                    RPO  CALLS
                            SVA
                    UEO  CALLS
                            SVA
            SRO  CALLS
                    UPO  CALLS
                            SVA
    RMO  CALLS
            RPO  CALLS
                    SVA
            SVA
    WMO  CALLS
            RPO  CALLS
                    SVA
            SVA
SRI  CALLS
    UPI  CALLS
            SVA
```

SRO CALLS
UPO CALLS
SVA

STATPASS
TSC
SVA

SUBROUTINE ECI

Subroutine ECI will verify the HSM Stack Entry thread structure for the INWARD DM board to ensure all threads are intact, correct, and all stack Entries (SEs) are accounted for. Any error in the thread structure means data may be lost or duplicated, and that there is either a logic error in the HSM firmware or in the DATApipe Adapter hardware.

This subroutine involves the following sequence:
(1) The main array holding the forward pointers (IS-NEXT) is copied to a "scratch" area to be verified.
(2) The pointers on the active threads (0-9, thread 8 and 9 are software generated) show the first entry on the active thread. The array ISNEXT points to the next SE on the thread. As each SE is located, a bit is set signifying that the SE is on a list. If a SE is seen to already have the bit set, then it means the SE is on at least two different threads—a FATAL ERROR condition.
(3) The pointer to the SEs on the thread that contains messages for the HSM is then used. This pointer is the first entry on this thread. The array ISNEXT points to the next SE on the thread. As each SE is located, a bit is set signifying that the SE is on a list. If an SE is seen to already have the bit set, then it means the SE is on at least two different threads—a FATAL ERROR condition.
(4) The pointers on the SEs on the Ready-to-Go threads are then used. These pointers are the first entry on each thread. The array ISNEXT points to the next SE on the thread. As each SE is located, a bit is set signifying that the SE is on a list. If an SE is seen to already have the bit set, then it means the SEs are on at least two different threads—a FATAL ERROR condition.
(5) The ISNEXT array holding all the Stack Entries is then checked to ensure that every SE has got the bit set stating that it is is on a thread. If an SE is seen not to have the bit set, then it means the SE is NOT on any threads—a FATAL ERROR condition.
(6) All the printers described in steps (2)-(4) are checked to see if there are any pointers that are the same. The pointers are checked against all other pointers used by the HSM. If two pointers are the same, then some SEs are on at least two different threads—a FATAL ERROR condition.
(7) If steps (2) through (6) find no errors, then control is RETURNED to the Main Processing Loop. If errors are detected, then the HSM executes a STOP instruction which is detected by the Control Processor.

SUBROUTINE ECO

Subroutine ECO will verify the HSM Stack Entry thread structure for the OUTWARD DM board to ensure all threads are intact, correct, and all SEs are accounted for. Any error in the thread structure means data may be lost or duplicated, and that there is either a logic error in the HSM firmware or the DPA hardware.

This subroutine involves the following sequence of operations:
(1) The main array holding the forward pointers (OS-NEXT) is copied to a "scratch" area to be verified.
(2) The pointers to the active threads (0-9, threads 8 and 9 are software generated) show the first entry on the active thread. The array OSNEXT points to the next SE on the thread. As each SE is located, a bit is set signifying that the SE is on a list. If a SE is seen to already have the bit set, then it means the SE is on at least two different threads—a FATAL ERROR condition.
(3) The pointer to the SEs on the thread that contains messages for the HSM is then used. This pointer is the first entry on this thread. The array OSNEXT points to the next SE on the thread. The array OSNEXT points to the next SE on the thread. As each SE is located, a bit is set signifying that the SE is on a list. If an SE is seen to already have the bit set, then it means the SE is on at least two different threads—a FATAL ERROR condition.
(4) The pointers to the SEs on the Ready-to-Go threads are then used. These pointers are the first entry on each thread. The array OSNEXT points to the next SE on the thread. As each SE is located, a bit is set signifying that the SE is on a list. If an SE is seen to already have the bit set, then it means the SE is on at least two different threads—a FATAL ERROR condition.
(5) The OSNEXT array holding all the Stack Entries is then checked to ensure that every SE has got the bit set stating that it is on a thread. If a SE is seen not to have the bit set, then it means the SE is NOT on any threads—a FATAL ERROR condition.
(6) All the pointers described in steps (2)-(4) are checked to see if there are any pointers that are the same. The pointers are checked against all other pointers used by the HSM. If two pointers are the same, then some SEs are on at least two different threads—a FATAL ERROR condition.
(7) If steps (2) through (6) find no errors, then control is RETURNED to the Main Processing Loop. If errors are detected, then the HSM executes a STOP instruction which is detected by the Control Processor.

SUBROUTINE FDO

Subroutine FDO will ensure that the OUTWARD DM DATApipe thread (7) is supplied with enough "empty" Stack Entries to ensure that there is always a buffer available to receive data from the DATApipe. This is done by "stealing" unprocessed SEs from the OUTWARD DM threads destined for the IOPs. If an IOP stops accepting data for some reason, unprocessed SEs will be placed onto its thread and in time all SEs could wind up on its thread, never to be processed and effectively "shutting down" reception by this DATApipe Adapter. "Enough" SEs are currently defined to be ⅛ of the total number of SEs available.

(1) If the DATApipe is not operational or is disabled by the operator, then Control is returned to the Main Processing loop.

(2) If the DATApipe thread (7) has enough SEs on its thread to provide sufficient buffers, then Control is returned to the Main Processing Loop.

(3) Array PORTPRIO contains a priority list in reverse order (lowest listed first) of which threads to steal SEs from first. If the lowest priority thread has more SEs on it than a predefined minimum (provided at startup time by the Control Processor), then the last SE on the thread is removed via subroutine STO and added to the DATApipe thread.

(4) If the lowest priority thread has no more SEs that can be stolen, then the next thread in the priority list is examined using steps (2) and (3).

(5) When all threads have been examined, or if enough SEs have been stolen, (checked in Step (2) above), then Control is returned to the Main Processing loop.

SUBROUTINE MDS

Subroutine MDS will determine if the Memory-to-Memory transfer direction must change, and if so, will initiate and monitor the direction change. See Note 2 above for more details on memory direction.

This subroutine involves the following sequence of operations:

(1) Determine the current memory direction. If the direction is OUTWARD to INWARD (direction=0) then go to step 21. If the direction is INWARD to OUTWARD (direction=1), then go to step 18. If the direction is "in transition" OUTWARD to INWARD (direction=2), then the HSM is in the process of changing direction and must allow the SEs already on the Memory-to-Memory thread to complete before switching directions to INWARD to OUTWARD, then go to step 10. If the direction is "in transition" INWARD to OUTWARD (direction=3), then the HSM is in the process of changing direction and must allow the SEs already on the Memory-to-Memory thread to complete before switching directions to OUTWARD to INWARD, then go to step 2.

(2) "IN TRANSITION" INWARD to OUTWARD. If the active thread 1 and the Ready-to-Go thread 1 on the INWARD DM are both empty, and the OUTWARD DM thread 1 which is receiving the data is also empty, then "transition" is complete, and go to step 3, else control returns to the Main Processing loop.

(3) Disable Memory-to-Memory transfers.

(4) On the INWARD DM side, move the thread 9 pointers to thread 1. Thread 9 pointers hold the receive SEs when not in use. Call subroutine UPI to update the hardware pointer.

(5) On the OUTWARD DM side, move the thread 1 pointers to thread 9, and move thread 8 pointers to thread 1. Reset the thread 8 pointers to zero. Thread 8 pointers hold the SEs to transmit until the Memory-to-Memory direction changes. Call subroutine UPO to update the hardware pointer.

(6) Change the hardware transfer direction to go OUTWARD to INWARD.

(7) Call routine SRI to start thread 1 Receiving.

(8) Re-enable memory-to-memory transfers and reset loop count that determines next direction switch.

(9) Return control to the Main Processing loop.

(10) "IN TRANSITION" OUTWARD to INWARD. If the active thread 1 and the Ready-to-Go thread 1 on the OUTWARD DM are both empty, and the INWARD DM thread 1 which is receiving the data is also empty, then "transition" is complete, and go to step 11, else control returns to the Main Processing loop.

(11) Disable Memory-to-Memory transfers.

(12) On the OUTWARD DM side, move the thread 9 pointers to thread 1. Thread 9 pointers hold the receive SEs when not in use. Call subroutine UPO to update the hardware pointer.

(13) On the INWARD DM side, move the thread 1 pointers to thread 9, and move thread 8 pointers to thread 1. Reset the thread 8 pointers to zero. Thread 8 pointers hold the SEs to transmit until the Memory-to-Memory direction changes. Call subroutine UPI to update the hardware pointer.

(14) Change the hardware transfer direction to go INWARD to OUTWARD.

(15) Call routine SRO to start thread 1 Receiving.

(16) Re-enable Memory-to-Memory transfers and reset loop count that determines next direction switch.

(17) Return control the Main Processing loop.

(18) DIRECTION IS INWARD to OUTWARD. If there is no data to send from the OUTWARD DM or if there is data and the number of SEs on the OUTWARD DM has not yet reached a minimum number or the loop count that determines switch time has not yet reached a maximum number, then return control to the Main Processing loop.

(19) Else it is time to switch Memory-to-Memory transfer directions, so set the direction type to "in transition" INWARD to OUTWARD (direction=3).

(20) Return control to the Main Processing loop.

(21) DIRECTION IS OUTWARD to INWARD. If there is no data to send from the INWARD DM or if there is data and the number of SEs on the INWARD DM has not yet reached a minimum number or the loop count that determines switch time has not yet reached a maximum number, then return control to the Main Processing loop.

(22) Else it is time to switch Memory-to-Memory transfer directions, so set the direction type to "in transition" OUTWARD to INWARD (direction=2).

(23) Return control to the Main Processing loop.

SUBROUTINE PCI

Subroutine PCI will process all messages sent to the HSM for the Control Processor. The HSM will only allow its local Control Processor to sent messages to it. Every message received generates a reply message from the HSM back to the Control Processor, even if the message type is not one of those defined, which are:

(a) Initialization message with control parameters.

(b) Set HSM flag register.

(c) Read HSM registers, Stack pointers and Decoupling memory.

(d) Write into HSM registers, Stack pointers and Decoupling memory.

(e) Turn IOP channels and the DATApipe channel on or off.

(1) If there is no message from the Control Processor, then return control to the Main Processing loop.

(2) Isolate one SE at a time from the list of SEs to process so that the HSM is free to read and write any memory requested by the Control Processor. If this were not done, it would be necessary to abnormally terminate the HSM-to-Memory thread (=0) in order to read up Decoupling Memory or to send back a reply once the command was processed.

(3) Using subroutine IRI and RMI read the message into HSM registers.

(4) Decode the command and process it according to the request code. If the request code is illegal, then just send an empty reply message by going to step (8).

(5) If the request is to read Decoupling Memory, then use IRI/RMI to read INWARD DM, or IRO/RMO to read OUTWARD DM.

(6) If the request is to read the Stack Entry pointers, use routines RMI and RMO to read up both the INWARD and OUTWARD Pointers.

(7) If the request is to write Decoupling memory, then use IWI/WMI to write INWARD DM, or IWO/WMO to write OUTWARD DM.

(8) Call routine SRP to send a reply back to the Control Processor.

(9) If the request was an initialization message, then reinitialize the HSM tables again by returning to initialization code prior to the Main Processing Loop.

(10) If not an initialization request, then put the SE back onto the Control Processor thread using routine ATI, get the next SE in the list, and go to step (2).

(11) When all SEs are processed, return control to the Main Processing loop.

SUBROUTINE PRS (AND INITIALIZATION)

Subroutine PRS is called initially by the HSM with default values to set up Stack Entries, threads, and hardware pointers in order to communicate first with the Control Processor. The Control Processor will then send it installation parameters defining the slot lengths, port priorities, etc. Subroutine PRS is then called a second time to reinitialize the SEs, build threads and pointers according to the new values.

The sequence of events is as follows:

(1) Subroutine PRS first zeroes the HSM registers, disables the INWARD and OUTWARD I/O ports, and resets all error conditions. The act of zeroing all of the registers automatically sets certain default values to zero such as Memory-to-Memory transmit direction which becomes OUTWARD to INWARD.

(2) The INWARD DM board and pointers are set up first. Subroutine BAI is called to initialize the "Bandwidth Allocation" table (also called the "Lookup table").

(3) Based upon the length of a slot buffer, HSM registers are set describing the first word of each buffer in Decoupling Memory. The length of each buffer also determines how many Stack entries are to be used—the larger the slot buffer, the fewer number of SEs need to describe DM.

(4) Subroutine UPI is called to zero out all of the INWARD Stack pointers.

(5) Based on a table which assigns Stack entries to specific ports (or threads) based upon the lower three bits of the SE number, Stack entries are built and written to the hardware by subroutine ATI.

(6) A table is built that references port numbers to I/O channel numbers for use by subroutine DPI (Determine Path Destination).

(7) Finally, if it is determined from the revision level of the Logical transmitter that it is a dummy board and not the operational board, then the DATApipe thread is turned off.

(8) The OUTWARD DM board and pointers are then set up. Subroutine BAO is called to initialize the "Bandwidth Allocation" table (also called the "Lookup table").

(9) Based upon the length of a slot buffer, HSM registers are set describing the first word of each buffer in Decoupling Memory. The length of each buffer also determines how many Stack entries are to be used—the larger the slot buffer, the fewer number of SEs needed to describe DM.

(10) Subroutine UPO is called to zero out all of the OUTWARD Stack pointers.

(11) Based on a table which assigns Stack entires to specific ports (or threads) based upon the lower three bits of the SE number, Stack entries are built and written to the hardware by subroutine ATO.

(12) A table is built that references port numbers to I/O channel numbers for use by subroutine DPO (Determine Path Destination).

(13) Control is returned to the Main code which enters the Main Processing Loop.

SUBROUTINE RDY

Subroutine RDY will re-enable the data flow on any channels which have been shut down and are now ready again and will start any Ready-to-Go threads for both the INWARD and OUTWARD DM boards. See Note 1: above.

(1) For all threads (0–7) call subroutine FLO to restart the data flow if the flow has been shut off.

(2) For all threads (0–7) call subroutine SRI to start the Ready-to-Go threads on the INWARD DM board if the active SE thread is complete and there are entries on the Ready-to-Go list.

(3) For all threads (0–7) call subroutine SRO to start the Ready-to-Go threads on the OUTWARD DM board if the active SE thread is complete and there are entries on the Ready-to-Go thread.

SUBROUTINE REI

Subroutine REI will remove "empty" stack entries from the INWARD DM transmit thread and add the Stack Entries to the correct receive threads on the INWARD DM. The transmit threads are the DATApipe thread (7) and the Memory-to-Memory thread (1). The receive threads are the IOPs (thread numbers 2, 3, 4, 5, and 6) and the Memory-to-Memory thread (1).

(1) Subroutine GPI is called to gather all the "empty" SEs from thread 7.

(2) If the Memory-to-Memory direction is from the INWARD DM to the OUTWARD DM, then subroutine GPI is called to gather all the "empty" SEs from thread 1.

(3) At this point REI has a single list of empty SEs that must be reassigned back to the IOP thread from which the data initially came (from threads 2, 3, 4, 5, 6, and sometimes thread 1). Each SE will be added to one of those threads. A temporary list of SEs for each thread will be created.

(4) The lower 3 bits of each SE number serve as an index into a table which describes the thread onto which the empty SE is to be reassigned. The SE is initially assigned to a "temporary logical" thread.

(5) The entire list of SEs collected by subroutine GPI is processed onto these temporary lists.

(6) For each of the temporary lists generated, subroutine ATI is called to add these SEs to the actual INWARD threads or to the Memory-to-Memory thread.

(7) If the Memory-to-Memory direction is still INWARD to OUTWARD (i.e., the data movement is toward the OUTWARD direction and the SEs on the Memory-to-Memory thread are TRANSMITTING data), then another SE list is created to hold those SEs until the Memory-to-Memory direction changes to the "receiving" or OUTWARD DM to INWARD DM direction.

(8) Control is RETURNED to the Main Processing Loop.

SUBROUTINE REO

Subroutine REO will remove "empty" stack entries from the OUTWARD DM transmit threads and add these SEs back onto the correct receive threads from which they came. The transmit threads are IOPs (thread numbers 2, 3, 4, 5, and 6) and the Memory-to-Memory thread (1). The receive threads are the DATApipe thread (7) and the Memory-to-Memory thread (1).

(1) Subroutine GPO is called to gather all the "empty" SEs from threads 2, 3, 4, 5, and 6.

(2) If the Memory-to-Memory direction is from the OUTWARD DM to the INWARD DM, then subroutine GPO is also called to gather all the "empty" SEs from thread 1.

(3) At this point, REO has a single list of SEs to be replaced onto either the DATApipe thread or to the Memory-to-Memory thread. Each SE will be added to one of the two temporary threads. A temporary list of SEs for each thread will be created.

(4) The lower 3 bits of each SE number serve as an index into a table which describes that thread onto which the empty SE is to be reassigned. The SE is initially assigned to a "temporary logical" thread.

(5) The entire list of SEs collected by subroutine GPO is processed onto these temporary lists.

(6) For each of the temporary lists generated, subroutine ATO is called to add these SEs to the actual INWARD threads or to the Memory-to-Memory thread.

(7) If the Memory-to-Memory direction is still OUTWARD to INWARD, i.e., the data movement is toward the INWARD direction and SEs on the Memory-to-Memory thread are TRANSMITTING data, then another SE list is created to hold those SEs until the Memory-to-Memory direction changes to the "receiving" or INWARD DM to OUTWARD DM direction.

(8) Control is RETURNED to the Main Processing Loop.

SUBROUTINE RFO

Subroutine RFO will remove full stack entries from the OUTWARD DM receive threads and add these full buffers to the correct transmit threads on the OUTWARD DM. The receive threads are the DATApipe thread (7) and the Memory-to-Memory thread (1). The transmit threads are the IOPs (thread numbers 2, 3, 4, 5 and 6) and the Memory-to-Memory thread (1).

(1) Subroutine GPO is called to gather all the "full" SEs from the thread 7.

(2) If the Memory-to-Memory direction is from the INWARD DM to the OUTWARD DM, then subroutine GPO is called to gather all the "full" SEs from thread 1.

(3) At this pointer, RFO has a single list of SEs containing data destined for one of the IOPs or if a loopback to a remote DPA, the destination is the Memory-to-Memory thread to be transmitted from the INWARD DM. Each SE will be added to one of those threads. A temporary list of SEs for each thread will be created.

(4) Subroutine IRO is called to initialize the HSM to read the first two words of each message which contain the data routing information.

(5) Subroutine DPO is called to read each SE and determine to which thread each SE is to be assigned. If any SE has illegal routine information, or the destination IOP is turned off, the data is discarded and the SEA is reassigned to its original receive list.

(6) If any SE contains a message that is to be looped back to a remote DATApipe Adapter, then the SE is assigned to yet another temporary list to be processed later.

(7) The list of SEs is processed and several of the temporary SE lists of SEs that are to be assigned to the OUTWARD IOPs are generated.

(8) The list of SEs that is to be looped back to another DPA is now processed. First subroutine IRO is called to reinitialize the HSM to again read the first two words of the message containing routing information.

(9) Subroutine RMO is called for each SE to actually read the routing information.

(10) The "TO" DATApipe Adapter number is changed to be the same as the "FROM" DATApipe Adapter number and subroutines IWO and WMO are called to write the new routing information back to the data buffer.

(11) The SE is then added to the Memory-to-Memory temporary list.

(12) Steps (8) through (11) are called for each SE containing loop-back data.

(13) For each of the temporary lists generated, subroutine ATO is called to add these SEs to the actual threads for the OUTWARD IOPs or to the Memory-to-Memory thread.

(14) If the Memory-to-Memory direction is still INWARD to OUTWARD (i.e., the data movement is toward the OUTWARD direction and SEs on the Memory-to-Memory thread are RECEIVING data), then another SE list is created to hold these SEs destined for the INWARD DM until the Memory-to-Memory direction changes to the "transmit" or OUTWARD DM to INWARD DM direction.

(15) Control is RETURNED to the Main Processing Loop.

SUBROUTINE RFI

Subroutine RFI will remove full stack entries from the INWARD DM receive threads and add these full buffers to the correct transmit threads on the INWARD DM. The receive threads are IOPs (thread numbers 2, 3, 4, 5, and 6) and the Memory-to-Memory thread (1). The transmit threads are the DATApipe thread (7) and the Memory-to-Memory thread (1).

(1) Subroutine GPI is called to gather all the "full" SEs from threads 2, 3, 4, 5, and 6.

(2) If the Memory-to-Memory direction is from the OUTWARD DM to the INWARD DM, then subroutine GPI is also called to gather all the "full" SEs from thread 1.

(3) At this point RFI has a single list of SEs containing data destined for the DATApipe thread or to a local IOP, in which case the destination is the Memory-to-Memory thread to move the data to the OUTWARD DM and then to the IOP. Each SE will be added to one of the two temporary threads. A temporary list of SEs for each thread will be created.

(4) Subroutine IRI is called to initialize the HSM to read the first two words of each message which contain the data routing information.

(5) Subroutine DPI is called to reach each SE and determine to which thread each SE is to be assigned. If any SE has illegal routine information, the data is discarded and the SE is reassigned to its original receive list.

(6) If any SE contains a message to the HSM from the Control Processor, then the SE is assigned to yet another temporary list to be processed later by subroutine PCI.

(7) The list of SEs is processed and the temporary SE lists are generated.

(8) If the Memory-to-Memory direction is still OUTWARD to INWARD (i.e., the data movement is toward the INWARD direction and SEs on the Memory-to-Memory thread are RECEIVING data), then another SE list is created to hold those SEs destined for the OUTWARD DM until the Memory-to-Memory direction changes to the "transmit" or INWARD DM to OUTWARD DM direction.

(9) Subroutine ATI is called to add the temporary Memory-to-Memory SE list to the actual physical threads on the INWARD DM.

(10) If there are any SEs on the temporary DATApipe thread, subroutine SLA is called to assign the SEs to the DATApipe slots.

(11) Control is RETURNED to the Main Processing Loop.

SUBROUTINE TSC

Subroutine TSC will "train" or adjust the DATApipe slot processor clock to remain in time synchronization with the Master DPA.

Having described the logic flow of each subroutine and having defined with great particularity the functional characteristics of these subroutines, persons skilled in the art should be able to write the program of instructions to implement each of the subroutines and, hence, it would only needlessly complicate this specification to present the machine code or assembly language listings herein.

STREAM PROCESSOR

FIG. 11 shows a detailed block diagram of the stream processor described in the logical transmitter 96 and logical receiver 112. The structure of the stream processor for both applications is the same, differing only in the instruction format as previously described. The stream processor is a special-purpose high-speed micro controller which generates a sequence of data and control signals on output fields 850 in response to a program contained in control store 852 and the instantaneous state of the input skip conditions on lines 854. The operation of the stream processor is similar but more simple than the operation previously presented for the high-speed microprocessor program control section. For each instruction cycle, arithmetic logic unit 856 generates a program address on data path 858. That address is read from control store 852 and captured in pipeline register 860 via data path 862. On each cycle, the address generated on data path 858 is also captured in program address register 864. For the next instruction cycle, there are three possibilities for the program address: (1) the contents of program address register 864 unmodified; (2) the contents of program address register 854 incremented by one; and (3) the address field of pipeline register 860. The particular address generated is determined by program address control 866 which selects the arithmetic mode of arithmetic logic unit 856 via data path 868.

Up to eight inputs, skip conditions, can be sensed via the program address control 866 to cause a conditional branch in the program. The particular condition to be sensed is determined by the condition code field 870 of pipeline register 860. If the input condition specified by the condition code is present, the test is considered to have passed. If it is not, it is considered to have failed. There are two possible responses to a pass condition, the program may branch through the address field by applying pipeline register 860 or the mix sequential address P+1 may be selected. There are two possible alternatives for the fail condition: (1) the program address plus 1 may be selected; or (2) the program address register unmodified may be selected.

CONTROL PROCESSOR AND CONTROL PROCESSOR MEMORY

The control processor and control processor memory subsystem used in the implementation of the present invention is a 16-bit microprocessor system constructed around the Motorola 68010 16-bit microprocessor. Such microprocessor systems are well known and details of how this microprocessor may be connected to various memory and peripheral devices and how it may be programmed is contained in the publication 16 *Bit Microprocessors*, W. A. Triebel and S. Singh (Copyright 1985 by Prentice Hall Publishers). The control processor subsystem contains a mixture of RAM, EEPROM and PROM memory. The EEPROM memory is used to contain system parameters for initialization of the DATApipe adapter. The PROM memory is used for program store. The RAM memory is used for dynamic storage requirements. The 50 megabit serial port is interfaced by means of a Direct Memory Access (DMA) interface to the ram memory. All other I/O ports are via the synchronous peripheral control bus provided by the 68010 microprocessor.

Figure 12:
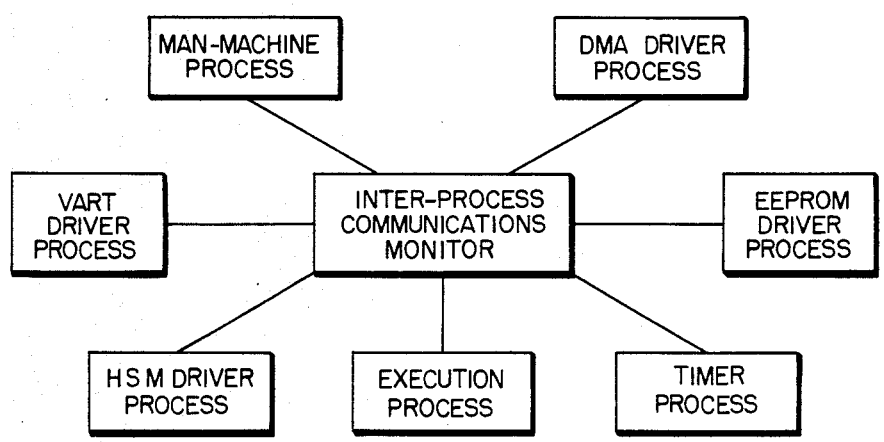
FIG. 12 illustrates the firmware organization of the control processor used in the DATApipe adapter of FIG. 2.

As illustrated in FIG. 12, the 68000 control processor is operated in a multi-tasking mode with a program hereafter referred to as the "inter-process communication monitor" or "monitor program" providing tasking control to various sub-programs or processes which execute simultaneously under control of the monitor. The monitor also provides for inter-process communication.

The various concurrent processes cooperate to accomplish the following top-level functions of the control processor:

(1) Control of the local high-speed micro;
(2) Control of slot allocation/deallocation;
(3) Control of adapter's diagnostics;
(4) Control of the adapter's statistics;
(5) Control of the inter-adapter voice circuits.

A detailed description of the individual processes which accomplish these functions is as follows:

MAN-MACHINE PROCESS

Description: The MAN-MACHINE process processes commands.

MAN-MACHINE is first responsible for startup of all other processes and the orderly startup of the DATApipe adapter. MAN-MACHINE will then go into a message processing mode.

The MAN-MACHINE process processes commands from a local operator, a remote operator, or netword requests received over the DATApipe bus. Following are the types of commands processed by the MAN-MACHINE process:

Diagnostics—various types of data loopbacks and turning channels online or offline.

Debug—general debug functions directed at the control processor and the high speed micro.

Profile—allows for configuration of the EEprom.

Statistics—set up recording frequency and handle printing.

Slots—control of allocation/deallocation of DATApipe slots.

Remote connect—allow ASCII conversation with anyone on the network.

Incoming ASCII messages are sent to a parser to formulate the command entered. If no internal wait states are necessary, in order to process the request, the command is processed immediately by MAN-MACHINE. If an internal wait state is necessary, the MAN-MACHINE process creates an EXECUTION process to handle the command, and sends the request onto it. This frees up MAN-MACHINE for other tasks.

EXECUTION PROCESS(S)

The EXECUTION process(s) handles internal wait state commands.

The EXECUTION process is created by MAN-MACHINE to process any command requiring an internal wait state during command processing. This allows for multiple pieces of straight line code to be executed with internal wait states such that multiple copies of the EXECUTION process may be created and controlled by the MAN-MACHINE process.

DMA DRIVER PROCESS

The DMA driver process provides the following capabilities:

1. Process or distribute input messages to read statistics, send a message via the DMA controller, to show a timeout.

2. Provide low level software support for all hardware DMA activities.

3. The DMA driver supports DMA operations to the high speed micro, the voice maintenance port, and the sync port (TDB). The higher level support for the high speed micro and the voice port are in separate modules called from DMA.

Phyically, the DMA driver consists of three processes—the initiation process, the interrupt service process, and the completion process.

The initiation process initializes some data base and then waits for input requests. The input messages may request transmission to a DMA port, turn voice traffic on or off, or may be a timeout. The voice and transmission requests are forwarded to other modules for processing.

The interrupt service module must poll for input or output termination from one of four channels (eventually six). The DMA operations are set up to operate in a chained operation so the only interrupts are on linked list completion. Almost all conditions are passed on to the completion process.

The completion process examines all ports for activity. Completed input is analyzed by the input routine for the appropriate DMA channel and may be forwarded to the MAN-MACHINE process for execution. On transmission completion, buffers are released.

EEPROM DRIVER PROCESS

The EEPROM driver process provides the following capabilities:

1. Process input messages to read EEPROM. Verify access and EEPROM checksum of data.

2. Process input messages to write EEPROM. Verify access, write data and update checksum, and verify new checksum.

3. Provide for sequential access from single user via multiple messages.

Physically, the EEPROM driver consists of two processes—the initiation process and the interrupt service process. The initiation process accepts input messages to read or write EEPROM. A read operation is performed immediately and involves reading EEPROM memory and verifying the EEPROM checksum. A write operation involves initiating a clock interrupt and allowing the interrupt service process to perform the write. After the interrupt service process completes, the checksum is verified.

The interrupt service routine is responsible for writing to the EEPROM memory. The interrupt is generated by a clock on a 10 ms cycle (68B40 chip). In order to update EEPROM, the location desired to be changed must be written and the write enable must stay active for 10 ms. In addition, to change from one value to another, an FF hex must be written first. That is, all changes in EEPROM memory are either from a value to FF hex or from FF hex to a value. The interrupt service routine skips over locations which do not require a change.

UART DRIVER PROCESS

The UART driver process provides the UART terminal driver.

Functionally, the UART driver provides the following capabilities:

1. Service four 68681 DUART chips; eight full duplex ports.

2. On input from the UART, accept input characters and echo. Provide character editing capabilities. On <CR>, send completed message to the MAN-MACHINE process.

3. On output to the UART, accept messages from anywhere to print to the output UART. Allow <control-s>/<control-q> control of output.

4. Provide logic to make a logical connection from one port to another. The commands to initiate and terminate such connection are escape sequences input from a terminal.

5. UART ports are enabled/disabled via input messages from the MAN-MACHINE process.

Physically, the UART driver consists of three processes—the initiation process (UART_start), the interrupt service process (UART_int), and the termination process (UART_done).

The initiation process accepts input messages to process. The input messages may specify a port to enable/disable or a message to write to an output port.

The enable/disable message specifies the port number, port type, and baud rate. The processing of this message involves data base manipulations. The write message specifies a port type and a pointer to the message to print. The processing of this message involves queueing a pointer which will be picked up by the interrupt service process to transmit to the UART port.

The interrupt service process services interrupts from the UART's. Because only one autovector is used for all UART ports, a scan is made of all possible interrupts. Input interrupts are stored in a buffer unless it is a <CR>, an escape sequence, or an editing key. In the case of a <CR>, a signal is sent to the completion process to process the input message. Output interrupts result in input characters being echoed, a connected port's input characters being echoed, or output buffers being displayed. Upon completion of an output buffer, a signal is sent to the completion process.

The completion process handles both complete input buffers and complete output buffers. Input buffers are reformatted and sent to MAN-MACHINE as an input message. Output buffers are released.

HSM DRIVER PROCESS

The HSM driver process provides an interrupt service process.

The HSM driver process module has an interrupt service process which awaits an interrupt from the high speed micro. The interrupt may imply either a stack overflow or a stop state of the high speed micro. The interrupt process signals a completion process to send a message to the MAN-MACHINE process. The interrupt is left disabled to prevent continuous interrupt problems. It is up to MAN-MACHINE process to reenable the interrupt when needed.

TIMER PROCESS

The TIMER process provides a real time clock.

This process accepts requests to set timers. Upon the expiration of the timer, the orginating process is notified.

The TIMER process accepts input as inter-process requests which specify a time interval in ticks from the current time. At the expiration of the timer interval, the message is returned to the sender. The timer process also accepts requests to cancel active timers.

Again, given the level of detail concerning the manner of programming the control processor, it is deemed unnecessary to set out the program listings. Those skilled in the art will be able to develop software to implement each of these processes.

Thus it can be seen that there is provided by this invention an extremely high speed communication facility capable of a throughput of 500 megabits per second in a full duplex mode. The system will serve as a backbone network, interconnecting a variety of hierarchically lower networks. At the heart of the system is an intelligent node termed a DATApipe adapter which is capable of transmitting and receiving data from other such adapters via a communication medium such as fiber optic cable. Each DATApipe adapter includes a plurality of channels capable of receiving and transmitting data to I/O processors which, in turn, may be associated with other networks or computing devices including supercomputers. The I/O processor packages data into fixed sized messages with a relatively small fixed sized header, the header being utilized by the DATApipe adapter for routing the data. Communication between DATApipe adapters over the transmission medium, e.g., fiber optic cable, is on a time-division multiplexing basis. Upon installation of the system, system parameters are established to specify the number of slots in a pipe cycle, the length of each slot, and the assignment of slots to the plural DATApipe adapters and transmission can take place from a given DATApipe adapter only when its slot is passing along the transmission medium. The receiving DATApipe adapter reserves buffers to a receiving port at various priority levels.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. In a data communications system of the type including a communications medium, a plurality of geographically distributed nodes, modem means operatively coupling said nodes to said medium for permitting any one of said nodes to transmit messages to any other of said nodes in the system, said messages including a header block, a data block and a trailer block, any one of said nodes in said system being a conditionally designated bus reference for the purpose of synchronizing the transmission of said messages, the improvement comprising:
    (a) means including said modem means for receiving a single signal bit stream representative of said message, there being a synchronization pattern of bits embedded in said header block defining a timing reference relative to a composite pipe cycle, a pipe cycle being a time interval comprising a plurality of slots, groups of said plurality of slots being assignable to said plurality of nodes;
    (b) synchronization pattern detecting means in each of said nodes for detecting said synchronization pattern; and
    (c) timing means in each of said nodes coupled to said bit pattern detecting means for establishing a valid time interval within said pipe cycle corresponding to the group of said plurality of slots assigned to a particular one of said plurality of nodes for transmission of said messages onto said medium from said particular node on a non-interfering basis with messages being transmitted over said medium from other of said nodes, said valid time interval (slots) being contiguously transmitted from separate nodes independent of the propagation delay of said communication medium and the transmission rate of said messages.

2. The data communications system as in claim 1 wherein said modem means includes means for separating clock information from said single serial bit stream, and means for transmitting said serial bit stream, bit-by-bit, to said nodes in synchronization with said clock information.

3. The data communications system as in claim 2 wherein each of said nodes includes serial-to-parallel converter means for framing said serial data stream into bit-parallel words of predetermined length, said serial-to-parallel converter being controlled by said clock information to create word boundaries for said bit-parallel words.

4. The data communications system as in claim 3 and further including means for appending a plurality of parity bits to each of said bit parallel words, and means for detecting errors in transmission of said synchronization pattern of bits embedded in said header block.

5. The data communications system as in claim 1 wherein said medium comprises an optical fiber.

6. The data communications system as in claim 1 wherein said timing means includes:
   (a) a first register for storing a count value corresponding to the total length of said pipe cycle;
   (b) counter means for periodically receiving said count value from said first register means;
   (c) means in said nodes for decrementing said counter means at a fixed clock rate; and
   (d) means detecting when the contents of said counter means reaches a predetermined value and producing a control signal for reloading said counter means with the contents of said first register means whereby pipe cycle marks of a predetermined time spacing are repetitively generated.

7. The communications system as in claim 6 and further including:
   (a) means for detecting any difference in time between the pipe cycle marks repetitively generated in a node and pipe cycle marks from said bus reference node;
   (b) means for determining whether said time difference exceeds a predetermined range value; and
   (c) means for adjusting said fixed clock rate until said time difference is within said predetermined range value.

8. The communications system as in claim 7 wherein said means in said nodes for establishing said fixed clock rate comprises:
   (a) a stable voltage controlled oscillator; and
   (b) digital-to-analog converter means coupled to said voltage-controlled oscillator, said digital-to-analog converter receiving its input from said means for adjusting said fixed clock rate.

9. The communications system as in claim 8 wherein said means for adjusting said fixed clock rate comprises:
   (a) a microprocessor including memory means for storing a plurality of interrupt routines;
   (b) means responsive to said means for determining whether said time difference exceeds said predetermined range for generating an interrupt signal for said microprocessor; and
   (c) means coupling said microprocessor to said digital-to-analog converter.

10. A data communications system comprising:
    (a) a communications medium;
    (b) a plurality of geographically distributed nodes;
    (c) modem means operatively coupling said nodes to said medium for permitting any one of said modes to transmit messages to any other of said nodes in the system, one of said nodes in said system being conditionally designated as a bus reference, said bus reference providing timing information synchronizing the transmission of said messages between said nodes in predetermined slots within an overall pipe cycle, a pipe cycle being a time interval including a plurality of said slots with groups of said slots being individually assignable to said plurality of nodes;
    (d) each of said nodes including:
       (i) multiplexor means coupled to receive input digital data messages in serial bit stream form on a plurality of ports;
       (ii) decoupling memory means coupled to said multiplexer means for temporarily storing said data messages at discrete addressable locations therein;
       (iii) logical transmitter means coupled to said decoupling memory means, said logical transmitter means including means for sensing the presences of the groups of said slots assigned to that node for controlling the times that the data messages are applied to said communications medium; and
       (iv) memory control means coupled to said decoupling memory means for managing the allocation of buffer regions in said decoupling memory for storing messages arriving from each of said plurality of ports and reading out said messages under control of said logical transmitter means.

11. The communications systems as in claim 10 wherein said memory control means comprises:
    (a) stack pointer memory means for storing stack pointer words for each of said plurality of ports, each stack pointer word having an address field and a control field;
    (b) port address generating means for conditionally enabling transfer of message words into and out of said decoupling memory from a multiplicity of ports in a specified sequence, said port address generating means providing an address to said stack pointer memory;
    (c) stack memory means for storing for each of said ports a threaded list of stack entry words which define said buffer regions in said decoupling memory, each stack entry word comprising an address field containing the current sequential address for said decoupling memory, a length field defining the remaining number of words in a given buffer region of said decoupling memory, and a thread field defining the address of a subsequent one of said stack entry words;
    (d) means responsive to a read of one of said stack entry words from said stack memory for incrementing said address field and decrementing said length field of said one of said stack entry words;
    (e) means for sensing a predetermined value of said length field of said one of said stack entry words; and
    (f) means responsive to said sensing means for transferring the current thread field into its respective stack pointer word such that said current thread field becomes the stack pointer address field, whereby message words are transferred into and out of their respective buffer regions in decoupling memory in a predetermined sequential order.

12. Apparatus as in claim 11 and further including microprocessor means coupled to said memory control means and to said port address generating means for periodically updating said address, length and thread fields of said stack pointer words such that a continuous pool of available buffer regions are defined in said decoupling memory means as messages are read out therefrom to said logical transmitter means.

13. The communications system as in claim 10 and further including slot processor means coupled in controlling relation to said logical transmitter means, said slot processor means including:
    (a) slot memory means for storing words defining the length of each of a plurality of slots at addressable locations therein;

(b) slot number generating means coupled to said slot memory means for reading out slot length values therefrom;
(c) means for converting said slot length values read from said slot memory means to corresponding sequential time intervals delimited by slot marks;
(d) means for presenting said slot numbers and slot marks to said logical transmitter means; and
(e) means for detecting whether the received slot number is assigned to a given one of said plurality of nodes and for sending an enable signal to said memory control means for accessing message words from said decoupling memory for transmission over said transmission media from said given node during the time interval of the current slot number.

14. A data communication system including:
(a) a communications medium;
(b) a plurality of nodes geographically distributed along said medium, said nodes interfacing at least one input/out processor device to said medium, said input/out processor devices communicating with said nodes in word serial form, said words comprising data bits and control bits, one of said control bits being a flow bit;
(c) means in said nodes and in said input/output processor for regulating the transfer of said words between buffer memories contained in said nodes and input/out processor devices, including:
  (i) first control means in said nodes for establishing the state of said flow bit of each outgoing serial word transmitted to said input/out processor device conditional upon the ability of said buffer memory in said node to accept additional incoming words;
  (ii) second control means in said input/out processor devices for establishing the state of said flow bit of each outgoing serial word transmitted to said node conditioned upon the ability of said buffer memory in said input/out processor devices to accept additional incoming words; and
  (iii) third control means in both said nodes and in said input/out processor devices for suspending the transmission of outgoing serial words from said nodes and input/out processor devices conditionally upon the state of said flow bits of incoming serial words to said nodes and input/out processor devices.

15. In a data communication system of the type including a communications medium, at least one node, means coupling said node to said medium for permitting said node to transmit messages over said medium, the improvement comprising:

(a) buffer memory means contained in said node for at least temporarily storing message words at addressable block locations therein;
(b) input/output processor means coupled to said node for transmitting messages to and receiving messages from said buffer memory means in said node;
(c) flow control means in said node for providing a flow signal to said input/output processor means which, when in a first state, indicates the availability in said buffer memory means of a sufficient number of said addressable block locations to store more than a single block of message words being sent from said input/output processor means and when in a second state indicates to said input/output processor means the availability in said buffer memory means of not more than a single addressable block location in which to store only a predetermined number of data words transmitted from said input/output processor means which are less than the number of words comprising a single block.

16. The data communication system as in claim 15 and further including:
(a) further buffer memory means contained in each of said input/output processor means for at least temporarily storing message words at addressable block locations therein;
(b) flow control means in said input/output processor means for providing a flow signal to said node to which said input/output processor means is connected which, when in a first state, indicates the availability in said further buffer memory means of a sufficient number of said addressable block locations to store more than a single block of message words being sent from said node and, when in a second state, indicates to said node the availability in said further buffer memory means of not more than a single addressable block location in which to store only a predetermined number of message words transmitted from said node which are less than the number of words comprising a single block.

17. The data communication system as in claim 16 and further including flow signal responsive means in said node and in said input/output processor means for inhibiting further transmission of said message words between said node and said input/output processor means following the entry of said message words into said single addressable block location upon detection of said flow signal being in said second state.

* * * * *

UNITED STATES PATENT AND TRADEMARK OFFICE
CERTIFICATE OF CORRECTION

PATENT NO. : 4,748,617
DATED : May 31, 1988
INVENTOR(S) : Kenneth G. Drewlo, et al It is certified that error appears in the above-identified patent and that said Letters Patent is hereby corrected as shown below:

Title Page, Column 1, [75] should read:

Inventor: Kenneth G. Drewlo, Maple Grove, Minn. and
Stanley A. Moeschl, Eden Prairie, Minn.

Signed and Sealed this

Eighth Day of November, 1988

*Attest:*

DONALD J. QUIGG

*Attesting Officer*     *Commissioner of Patents and Trademarks*